(12) United States Patent
Carbonaro et al.

(10) Patent No.: US 6,336,157 B1
(45) Date of Patent: Jan. 1, 2002

(54) DETERMINISTIC ERROR NOTIFICATION AND EVENT REORDERING MECHANISM PROVIDE A HOST PROCESSOR TO ACCESS COMPLETE STATE INFORMATION OF AN INTERFACE CONTROLLER FOR EFFICIENT ERROR RECOVERY

(75) Inventors: Catherine H Carbonaro, Rocklin; Matthew P Wakeley, Roseville; Joseph H Steinmetz, Rocklin, all of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/183,864

(22) Filed: Oct. 30, 1998

(51) Int. Cl.⁷ .................................................. G06F 3/00
(52) U.S. Cl. ............................ 710/59; 710/58; 710/5; 710/7
(58) Field of Search ....................... 711/122; 710/107, 710/39, 5, 6, 19, 15, 48, 59, 58, 7; 712/43

(56) References Cited

U.S. PATENT DOCUMENTS

| 5,754,887 A | * | 5/1998 | Damron et al. ................ 710/39 |
| 5,930,483 A | * | 7/1999 | Cummings et al. .......... 710/107 |
| 6,041,401 A | * | 3/2000 | Ramsey et al. ................ 712/43 |
| 6,101,576 A | * | 8/2000 | Kobayashi et al. .......... 711/122 |

* cited by examiner

Primary Examiner—Le Hien Luu

(57) ABSTRACT

An interface controller used within communications network ports that can be deterministically shut down by a host processor within a communication node that includes the communications network port and that can shut itself down in an ordered and deterministic manner in response to detection of certain error conditions. The interface controller purges any commands and information stored within internal caches, carries forward any currently executed operations to reasonable halting points, and finally provides complete control of data structures shared by the interface controller and the host processor to the host processor.

11 Claims, 58 Drawing Sheets

| INITIATOR | | | TARGET | |
|---|---|---|---|---|
| STATE | EVENTS | | EVENTS | STATE |
| BUS FREE 614 | | | | BUS FREE |
| ARBITRATION 616 | ASSERT BSY AND D7 ASSERT SEL | | | ARBITRATION |
| SELECTION 618 | ASSERT DX AND ATN | | | SELECTION |
| SELECTION 620 | DROP BSY DROP SEL | | ASSERT BSY | |
| MESSAGE OUT 622 | 625 — | IDENTIFY<br>DISCONNECT PRIVILEDGE — LUN — 623 — 624 → | | MESSAGE OUT |
| MESSAGE OUT | | QUEUE TAG MESSAGE<br>SIMPLE QUEUE TAG — QUEUE TAG — 626 — 627 → | | MESSAGE OUT |
| COMMAND 628 | 630 — | READ OR WRITE<br>OPCODE (READ OR WRITE) — 632<br>FLAGS<br>LOGICAL BLOCK NO. — 636<br>DATA LENGTH — 638 → | | COMMAND |
| MESSAGE IN 640 | | DISCONNECT — 642 ← | | MESSAGE IN |
| BUS FREE 644 | | | DROP BSY | BUS FREE |

| INITIATOR | | | TARGET |
|---|---|---|---|
| STATE | | | STATE |
| BUS FREE 646 | | | BUS FREE |
| ARBITRATION 648 | | ASSERT BSY AND DX ASSERT SEL AND I/O | ARBITRATION |
| RESELECTION 650 | | ASSERT DX AND ATN DROP SEL | RESELECTION |
| MESSAGE IN 652 | | IDENTIFY LUN ~654 ← | MESSAGE IN |
| MESSAGE IN | | QUEUE TAG MESSAGE SIMPLE QUEUE TAG / QUEUE TAG ~656 ← | MESSAGE IN |
| DATA IN (READ) OUT (WRITE) 658 | ACK | DATA REQ ... WRITE → READ ← | DATA IN (READ) OUT (WRITE) |
| OPTIONAL DISCONNECT/ RECONNECT 660 | MESSAGE IN | SAVE POINTERS ← | MESSAGE IN |
| | MESSAGE IN | DISCONNECT ← | MESSAGE IN |
| | BUS FREE | | BUS FREE |
| | ARBITRATION | | ARBITRATION |
| | RESELECTION | | RESELECTION |
| | MESSAGE IN | IDENTIFY ← | MESSAGE IN |
| | MESSAGE IN | QUEUE TAG MESSAGE ← | MESSAGE IN |
| DATA | ACK | DATA REQ ... WRITE → READ ← | DATA |
| MESSAGE IN 662 | | DISCONNECT ← | MESSAGE IN |
| BUS FREE 664 | | DROP BSY | BUS FREE |

FIG.6B

| INITIATOR STATE | | | TARGET STATE |
|---|---|---|---|
| BUS FREE 666 | | | BUS FREE |
| ARBITRATION 668 | | ASSERT BSY AND DX ASSERT SEL AND I/O | ARBITRATION |
| RESELECTION 670 | | ASSERT DX AND ATN DROP SEL | RESELECTION |
| MESSAGE IN 672 | | IDENTIFY<br>\| LUN \|~674 | MESSAGE IN |
| MESSAGE IN | | QUEUE TAG MESSAGE<br>\| SIMPLE QUEUE TAG \| QUEUE TAG \|~676 | MESSAGE IN |
| STATUS 678 | | \| 00h \|~680 | STATUS |
| MESSAGE IN 682 | | COMMAND COMPLETE<br>\| 00h \|~684 | MESSAGE IN |
| BUS FREE 686 | | DROP BSY | BUS FREE |

FIG.6C

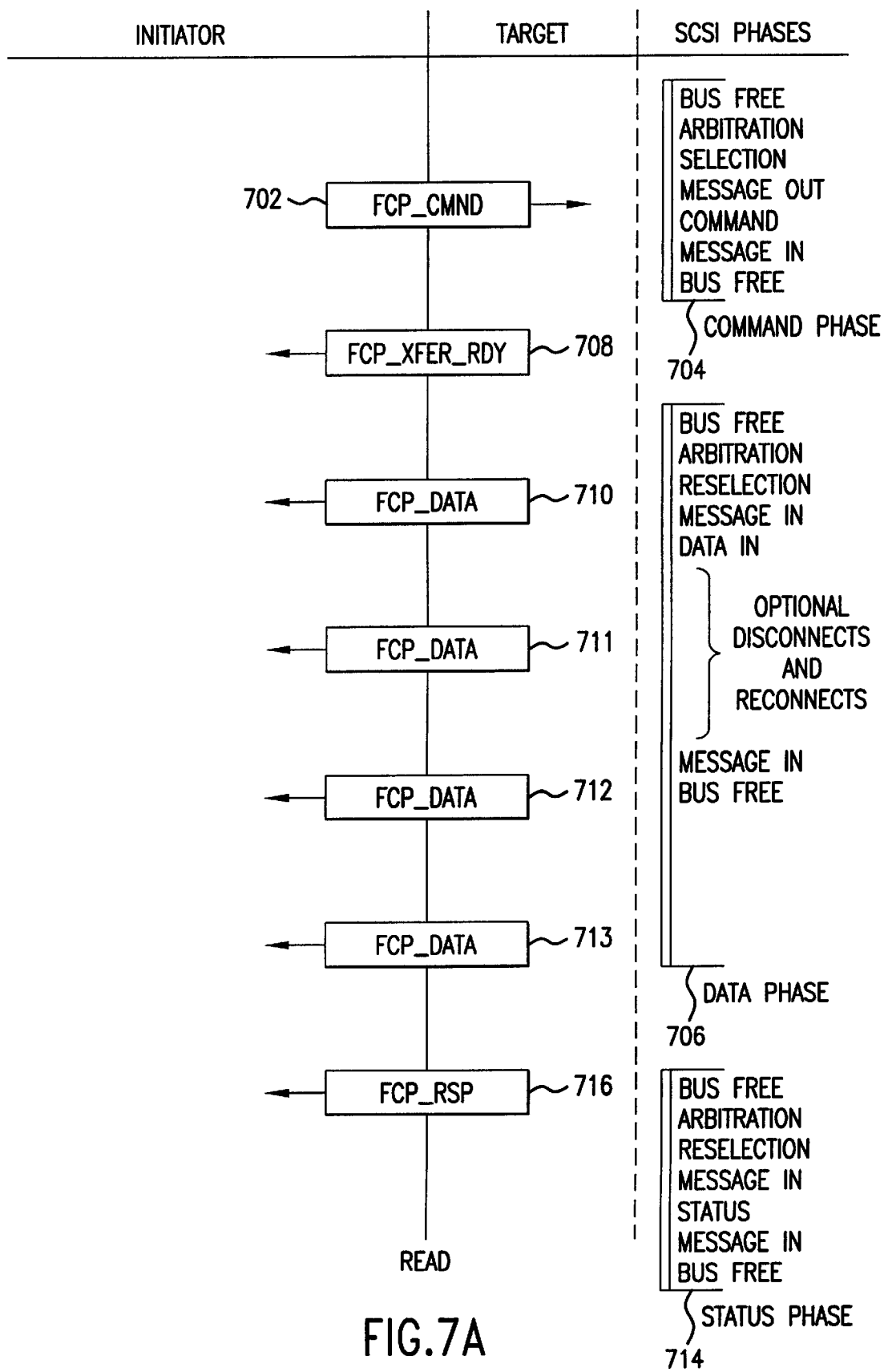

| DATA LAYOUT | DATA FIELD 2002 (LI-ID) 16 BIT CODE | DATA FIELD 2003 (LI-FL) 16 BIT FLAGS | DATA FIELD 2004 |
|---|---|---|---|
| | | | 8 BYTE PORT NAME |
| 2006 (LISM) | Ø x 1101 | — | 16 BYTE AL-PA BIT MAP |
| 2008 (LIFA) | Ø x 1102 | — | 16 BYTE AL-PA BIT MAP |
| 2010 (LIPA) | Ø x 1103 | — | 16 BYTE AL-PA BIT MAP |
| 2012 (LIHA) | Ø x 1104 | — | 16 BYTE AL-PA BIT MAP |
| 2014 (LISA) | Ø x 1105 | BIT 8 SET | |
| 2016 (LIRP) | Ø x 1106 | — | 128 BYTE AL-PA POSITION MAP |
| 2018 (LILP) | Ø x 1107 | — | 128 BYTE AL-PA POSITION MAP |

FIG. 20

7.22 TachLite Control Register

I/O Upper Byte
Address Offset:   0x88

Memory Byte
Address Offset:   0x188

Size:             32 Bits

Access Privilege: PCI Memory (Read-Write); PCI I/O (Read-Write)

Reset State:      0x00000000

Description:      Resets or controls the operation of portions of TachLite.

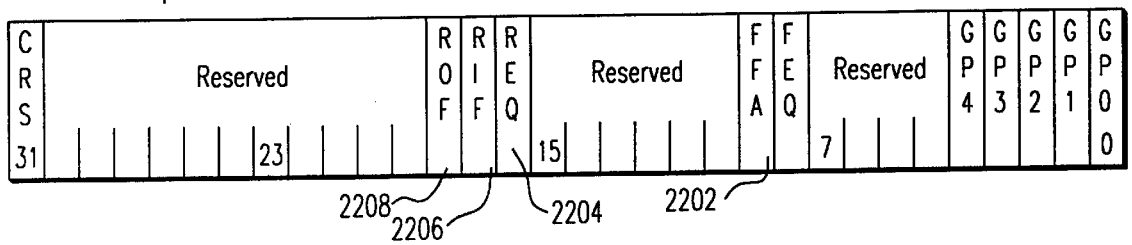

| Bit(s) | Symbol | Name | Description |
|---|---|---|---|
| 31 | CRS | Core Reset | Set to 1 to reset the core of TachLite; must only be used to reset TachLite without affecting the loop. This reset does not affect the PCI or Frame Manager interfaces.<br>• This bit must remain set for at least 0.3 microseconds to ensure successful reset propagation.<br>• The Frame Manager must be in the Offline or Host Control states before initiating this reset. Performing a core reset while the Frame Manager is in any other state has unpredictable results.<br>• There must be no DMA active on the PCI or External Memory busses when initiating this reset. This can be accomplished by "freezing" all the assists and queues.<br>• Must be cleared to 0 after setting this bit to 1 to restore normal operation. |
| 30..19 | Reserved | Reserved | Must be cleared to 0. |
| 18 | ROF | Resume Outbound FCP Assists | Set to 1 to resume the processing of outbound data queued on the SCSI Linked List.<br>This bit is automatically cleared to 0. |
| 17 | RIF | Resume inbound FCP Assists | Set to 1 to resume Inbound FCP assists, including the processing of inbound frames and adding entries to the SCSI Linked List.<br>This bit is automatically cleared to 0. |
| 16 | REQ | Resume ERQ | Set to 1 to resume the procesing of ERQ entries, starting at the entry pointed to by the ERQ Consumer Index.<br>This bit is automatically cleared to 0. |

Table 7-7 TachLite Control Register

FIG.22A

| Bit(s) | Symbol | Name | Description |
|---|---|---|---|
| 15..10 | Reserved | Reserved | Must be cleared to 0. |
| 9 | FFA | Freeze FCP Assists | The FFA bit is set to 1 to perform the following:<br>• Suspend the processing of Inbound frames, including adding entries to the Linked List.<br>• Suspend the sending of outbound data queued up on the SCSI Linked List.<br>• Freeze the ERQ.<br>• Flush the SEST cache.<br>This bit MUST be cleared to 0 when resuming (setting any of the REQ, ROF or RIF bits) normal operation. |
| 8 | FEQ | Freeze ERQ | Set to 1 to suspend activities that access the Exchange Request Queue, including both fetching ERQ entries and updating the ERQ Consumer Index.<br>Must be cleared to 0 when resuming (setting the REQ bit) normal operation. |
| 7..5 | Reserved | Reserved | Must be cleared to 0. |
| 4 | GP4 | General Purpose Control 4 | Controls the external general purpose output pin GPO4. When this bit is set to 1, the pin is driven high. When this bit is cleared to 0, the pin is driven low. See "11.6.1 General Purpose I/O Pins" on page 246 for details. |
| 3 | GP3 | General Purpose Control 3 | Controls the external general purpose bidirectional pin GPIO3. When this bit is set to 1, the pin is driven low. When this bit is cleared to 0, the pin is allowed to float. See "11.6.1 General Purpose I/O Pins" on page 246 for details. |
| 2 | GP2 | General Purpose Control 2 | Controls the external general purpose bidirectional pin GPIO2. When this bit is set to 1, the pin is driven low. When this bit is cleared to 0, the pin is allowed to float. See "11.6.1 General Purpose I/O Pins" on page 246 for details. |
| 1 | GP1 | General Purpose Control 1 | Controls the external general purpose bidirectional pin GPIO1. When this bit is set to 1, the pin is driven low. When this bit is cleared to 0, the pin is allowed to float. See "11.6.1 General Purpose I/O Pins" on page 246 for details. |
| 0 | GP0 | General Purpose Control 0 | Controls the external general purpose bidirectional pin GPIO0. When this bit is set to 1, the pin is driven low. When this bit is cleared to 0, the pin is allowed to float. See "11.6.1 General Purpose I/O Pins" on page 246 for details. |

Table 7-7 TachLite Control Register (Continued)

FIG.22B

7.23 TachLite Status Register

I/O Upper Byte
Address Offset:   0x8C

Memory Byte
Address Offset:   0x18C

Size:   32 Bits

Access Privilege:   PCI Memory (Read-Only); PCI I/O (Read-Only)

Reset State:   0xF0000xxx (Reset state of bits 9..5 is dependent on chip revision and 4..0 is dependent on GP14/GP10 signals).

Description:   Stores error information and operational status of TachLite.

| S F F | I M F | O F E | I F E | Reserved | O F F | I F F | E Q F | Stop_Cnt | O P E | I P E | REVID | G P 4 | G P 3 | G P 2 | G P 1 | G P 0 |
|---|---|---|---|---|---|---|---|---|---|---|---|---|---|---|---|---|
| 31 | | | | 23 | | | | 15 | | | 7 | | | | | 0 |

| Bit(s) | Symbol | Name | Description |
|---|---|---|---|
| 31 | SFF | SFO Full | Set to 1 when there are no available entries in the SFQ to put inbound frames into. |
| 30 | IMF | IMQ Full | Set to 1 when there are no available entries in the IMQ to put completion messages into. |
| 29 | OFE | Outbound FIFO Empty | Set to 1 to indicate that the outbound frame FIFO is empty. |
| 28 | IFE | Inbound FIFO Empty | Set to 1 to indicate that the inbound frame FIFO is empty. |
| 27..19 | Reserved | Reserved | |
| 18 | OFF | Outbound FCP Assists Frozen | Set to 1 to indicate that the processing of outbound SEST entries on the SCSI Linked List has been suspended. This condition continues until the ROF (Resume Outbound FCP Assists) bit is set to 1 in the TachLite Control Register. The Off bit is cleared to 0 once FCP outbound operations have resumed. |
| 17 | IFF | Inbound FCP Assists Frozen | Set to 1 to indicate that no inbound frames are being processed and that the SEST is not being accessed. This condition will continue until the RIF (Resume Inbound FCP Assists) bit is set to 1 in the TachLite Control Register. The IFF bit is cleared to 0 once inbound FCP operations have resumed. |
| 16 | EQF | ERQ Frozen | Set to 1 to indicate that the ERQ is not being accessed, and will not be accessed until the REQ (Resume ERQ) bit in the TachLite Control Register is set to 1. The EQF bit is cleared to 0 once ERQ operations have resumed. |

FIG.23A

| Bit(s) | Symbol | Name | Description |
|---|---|---|---|
| 15..12 | Stop_Cnt | Outbound Flow Control Stop Count | The number of times the outbound DMA flow was stopped because the outbound data FIFO was full. This field counts up and sticks at 0xF and is cleared by a read of this register. When this field increments quickly over a short period of time, this indicates that the Outbound Threshold register is programmed improperly. |
| 11 | OPE | Outbound Parity Error | Set to 1 to indicate that TachLite has detected an internal parity error in the outbound data path. Parity errors can only be cleared with a chip reset. |
| 10 | IPE | Inbound Parity Error | Set to 1 to indicate that TachLite has detected an internal parity error in the inbound data path. Parity errors can only be cleared with a chip reset. |
| 9..5 | REVID | Device Revision ID | Corresponds to the lower 5 bits of the PCI REVID register, which is located in PCI Configuration space. See "6.6 PCI Revision Register" on page 96 for a detailed description of the REVID field. |
| 4 | GP4 | General Purpose Input 4 | Senses the state of the general purpose input pin GPI4. See "11.6.1 General Purpose I/O Pins" on page 246. |
| 3 | GP3 | General Purpose I/O 3 | Senses the state of the general purpose bidirectional pin GPIO3. See "11.6.1 General Purpose I/O Pins" on page 246. |
| 2 | GP2 | General Purpose I/O 2 | Senses the state of the general purpose bidirectional pin GPIO2. See "11.6.1 General Purpose I/O Pins" on page 246. |
| 1 | GP1 | General Purpose I/O 1 | Senses the state of the general purpose bidirectional pin GPIO1. See "11.6.1 General Purpose I/O Pins" on page 246. |
| 0 | GP0 | General Purpose I/O 0 | Senses the state of the general purpose bidirectional pin GPIO0. See "11.6.1 General Purpose I/O Pins" on page 246. |

Table 7-8 TachLite Status Register (Continued)

FIG.23B

7.27 Frame Manager Status Register

| | |
|---|---|
| I/O Upper Byte Address Offset: | 0xC8 |
| Memory Byte Address Offset: | 0x1C8 |
| Size: | 32 Bits |
| Access Privilege: | PCI Memory (Read-Write); PCI I/O (Read-Write) |
| Reset State: | 0x10000080 |
| Description: | Indicates the current status and state of the Frame Manager. This register must be read by the host in response to receiving a Frame Manager Completion Message. |

Whenever any of the bits listed under "interrupting status" become set, a Frame Manager Completion Message is sent to the host. No further Frame Manager Completion Messages are sent until after the host reads the Frame Manager Status register. No further Frame Manager Completion Messages are sent for any bit(s) the host does not clear during the write back.

To clear the interrupting condition, the host writes a 1 to the bit position of the bit it wishes to clear. If a new interrupting bit becomes set before the host has written to the Frame Manager Status register in response to a previous Frame Manager Completion Message, no new Frame Manager Completion Messages are sent. However, if these new bits are still set after the write, a new Frame Manager Completion Message is sent.

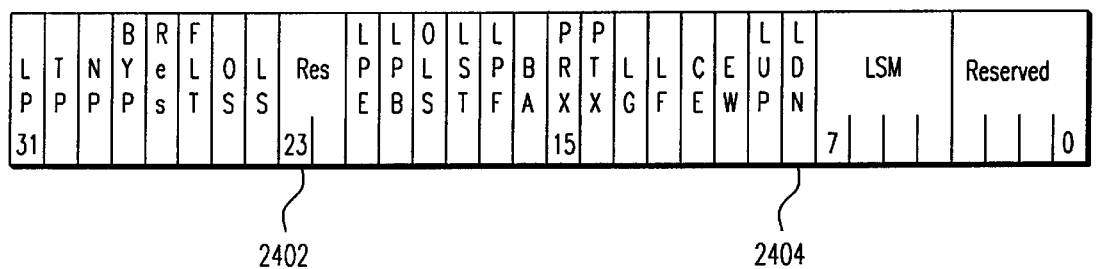

FIG.24A

| Bit(s) | Symbol | Name | Description |
|---|---|---|---|
| Link Status | | | |
| 31 | LP | Loop | Set to 1 to indicate that a loop circuit has been established. |
| 30 | TP | Transmit Parity Error | Set to 1 when the Outbound Parity Error (OPE) bit is set in the TachLite Status register. It indicates that TachLite has detected an internal parity error on the outbound data path. This bit can only be cleared by a reset. |
| 29 | NP | Non-Participating | Set to 1 to indicate that the Frame Manager did not acquire an AL_PA during loop initialization and is not participating in the loop. |
| 28 | BYP | Node Bypassed | Set to 1 to indicate that this node is bypassed, which happens when the Frame Manager is Offline or a Loop Port Bypass (LPB) primitive sequence was received. When the BYP bit is set, the BYPASSED_L signal is driven low. This bit is set after a reset. |
| 27 | Res | Reserved | Must be cleared to 0. |
| 26 | FLT | Link Fault | Set to 1 when the TX_FAULT signal is asserted, which usually indicates a problem with the transmit laser. |
| 25 | OS | Out of Synchronization | Set to 1 to indicate that the Frame Manager has lost synchronization with the incoming data stream. |
| 24 | LS | Loss of Signal | Set to 1 when the RX_LOS signal is asserted, indicating that no signal is being received from the remote port. This bit is also set when the received frequency is significantly greater than the transmit frequency. |

FIG.24B

| Interrupting Status | | | |
|---|---|---|---|
| 23.22 | Res | Reserved | Must be cleared to 0. |
| 21 | LPE | Loop Port Enable (LPE) Primitive Sequence Received | Set to 1 to indicate that a LPE primitive sequence was received. This bit is set and an interrupt is generated only if TachLite is already bypassed. For a stream of LPE primitives received, this bit is set on the first one only. |
| 20 | LPB | Loop Port Bypass (LPB) Primitive Sequence Received | Set to 1 to indicate that a LPB primitive sequence was received. In the Offline state, this bit is ignored. For a stream of LPB primitives received, this bit is set on the first one only. |
| 19 | OLS | OLS/NOS Received: | Set to 1 to indicate that an OLS or NOS was received. |
| 18 | LST | Loop State Time-out | Set to 1 to indicate that Frame Manager was in any of the following states for LP_TOV: ARB, OPEN, OPENED, XMIT CLS, or RX CLS. |
| 17 | LPF | LIPf | Set to 1 to indicate a LIPf is received. A LIPf refers to a Primitive Sequence of the form LIP(F8,xx). This bit is also set to 1 when any LIP is received while in the Host Control state. |

Table 7-11 Frame Manager Status Register

FIG.24C

| Bit(s) | Symbol | Name | Description |
|---|---|---|---|
| 16 | BA | Bad AL_PA | Set to 1 to indicate that an OPEN was sent to an AL_PA that did not respond. |
| 15 | PRX | Primitive Received | Set to 1 to indicate that the Primitive in the Frame Manager Primitive Register was received while in the Host Control state. |
| 14 | PTX | Primitive Transmitted | Set to 1 to indicate that the Primitive in the Frame Manager Primitive Register has been transmitted (12 occurrences if the SQ bit of the Frame Manager Control Register is set). |
| 13 | LG | Login Required | Set to 1 to indicate that a Fabric was detected during loop initialization, indicating that the host needs to login with the Fabric. |
| 12 | LF | Link Failure | Set to 1 when any of the following conditions are detected: loss of synchronization (OS bit set) is detected for longer than RT_TOV; the TX_FAULT signal was asserted (FLT bit set); the RX_LOS signal was asserted (LS bit set); Loop initialization failed to received a LIP after two AL_Times; |
| 11 | CE | Credit Error | Set to 1 to indicate a BB_Credit=0 for ED_TOV error condition. |
| 10 | EW | Elastic Store Error | Set to 1 to indicate an error condition caused by an Elastic Store Overwrite or Over read. This indicates a timing difference between the receive and transmit clocks. |
| 9 | LUP | Link Up | Set to 1 to indicate that the link has transitioned from the O_I_PROTOCOL to the MONITORING state (L_Port mode). This bit does not indicate the current state of the link, only that a transition was made that caused this bit to be set. Check the Loop State field for the current state of the link. |
| 8 | LDN | Link Down | Set to 1 to indicate that the loop has transitioned to the INITIALIZING state. This bit does not indicate the current state of the link, only that a transition was made that caused this bit to be set. Check the Loop State Machine field for the current state of the link. |

Table 7-11 Frame Manager Status Register (Continued)

FIG.24D

| Bit(s) | Symbol | Name | Description |
|---|---|---|---|
| Frame Manager State | | | |
| 7..4 | LSM | Loop State Machine | Indicates the current FC-AL state of the Frame Manager.<br><br>State          Definition<br><br>0x0          Monitor<br>0x1          ARB<br>0X2          ARB Won<br>0x3          OPEN<br>0X4          Opened<br>0x5          Xmit CLS<br>0X6          Rx CLS<br>0X7          Xfer<br>0x8          Initialize<br>0x9          O_I Init Finish<br>0xA          O_I Protocol<br>0xB          O_I Lip Received<br>0xC          Host Control<br>0xD          Loop Fail<br>0xE          Offline<br>0xF          Reserved |
| 3..0 | Reserved | Reserved | |

Table 7-11 Frame Manager Status Register (Continued)

FIG.24E

Frame Manager Completion Message

A Frame Manager Completion Message is sent to the host when any of the bits listed under "interrupting status" become set in the Frame Manager Status register. See "7.27 Frame Manager Status Register" on page 144. No further Frame Manager Completion Messages are sent until after the host reads the Frame Manager Status register. No further Frame Manager Completion Messages are sent for any bit(s) the host does not clear during the write back.

To clear the interrupting condition, the host writes a 1 to the bit position of the bit it wishes to clear to the Frame Manager Status register. If a new interrupting bit becomes set before the host has written to the Frame Manager Status register in response to a previous Frame Manager Completion Message, no new Frame Manager Completion Message will be sent. However, if these new bits are still set after the write, a new Frame Manager Completion Message will be sent.

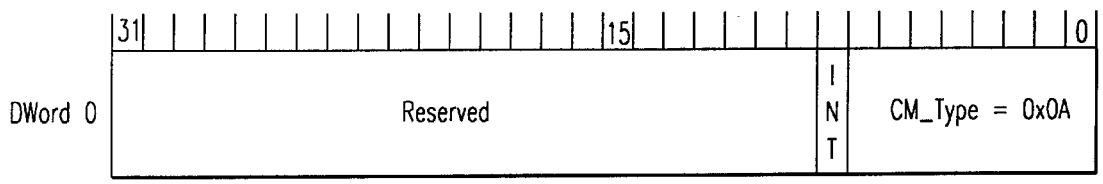

| DWord / Bit(s) | Symbol | Name | Description |
|---|---|---|---|
| 0/31..9 | Reserved | Reserved | |
| 0/8 | INT | Interrupt Generated | Always set to 1. |
| 0/7..0 | CM_Type | Completion Message Type | Frame Manager Completion Message: 0x0A |

TABLE 9-7 Frame Manager Completion Message

Outbound Completion Message

An Outbound Completion Message is sent to the host when any of the following conditions occur:

- The last phase of an FCP I/O request was the transmission of a sequence.
- An error occurred in the transmission of a sequence.

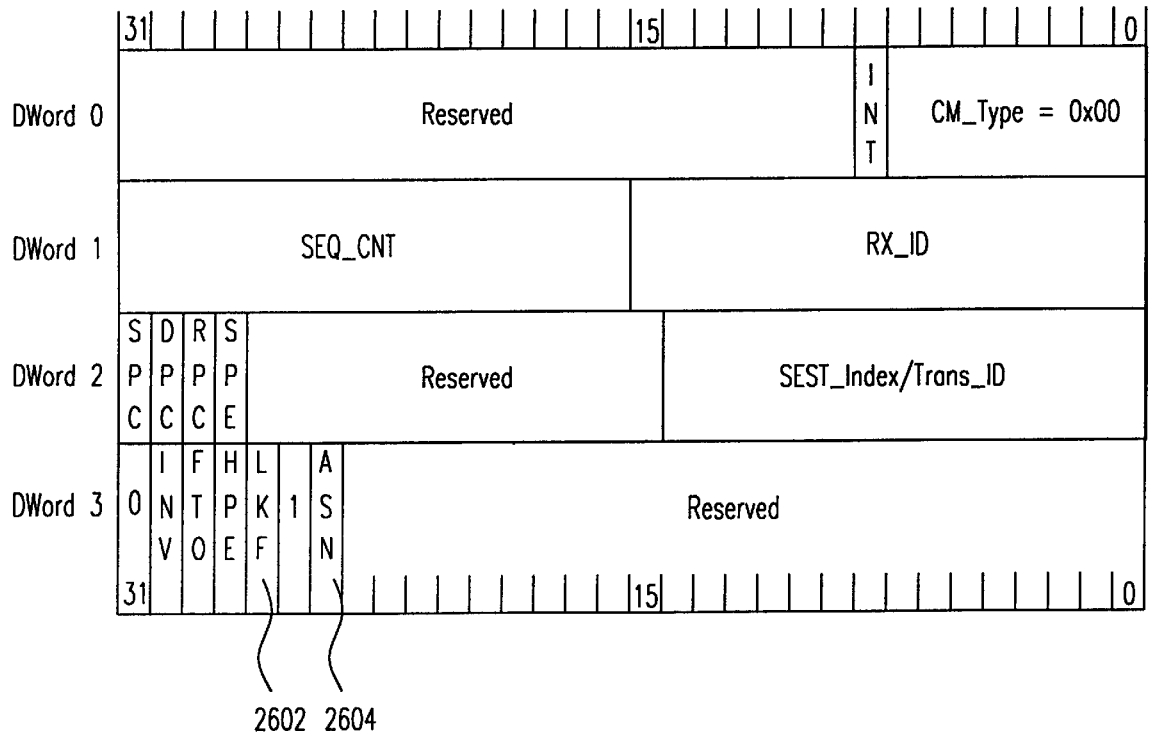

| DWord / Bit(s) | Symbol | Name | Description |
|---|---|---|---|
| 0/31..9 | Reserved | Reserved | |
| 0/8 | INT | Interrupt Generated | Set to 1 if an interrupt was requested for this completion message. |
| 0/7..0 | CM_Type | Completion Message Type | Outbound Completion Message: 0x00 |

TABLE 9-2 Outbound Completion Message

FIG.26A

| | | | |
|---|---|---|---|
| 1 / 31..16 | SEQ_CNT | Sequence Count | The Sequence Count of the last frame transmitted in the sequence. |
| 1/15..0 | RX_ID | Responder Exchange Identifier | The RX_ID assigned to this exchange. |
| 2/31 | SPC | SFS Phase Complete | Set to 1 to indicate that this completion message is for an SFS sent via the ERQ. The SPC, DPC, and RPC bits are mutually exclusive with respect to each other. |
| 2/30 | DPC | Data Phase Complete | Set to 1 to indicate that this completion message is for an FCP_DATA sequence. The SPC, DPC, and RPC bits are mutually exclusive with respect to each other.<br><br>☞ For a TRE I/O, the DPC bit may not accurately represent the state of the exchange if any of the error bits are set (i.e. FTO, HPE, LKF). |

TABLE 9-2  Outbound Completion Message

FIG.26B

| DWORD /BIT(s) | Symbol | Name | Description |
|---|---|---|---|
| 2/29 | RPC | Response Phase Complete | The RPC bit is set to 1 to indicate that this completion message is for an FCP_RSP sequence. The SPC, DPC, and RPC bits are mutually exclusive.<br><br>☞ For a TRE I/O, the RPC bit may not accurately represent the state of the exchange if any of the error bits are set (i.e. FTO, HPE, LKF). |
| 2/28 | SPE | SEST Programming Error | Set to 1 to indicate that a SEST programming error was detected. |
| 2/27..15 | Reserved | Reserved | This bit is always cleared to 0. |
| 2/14..0 | SEST_Index/ Trans_ID | SEST_Index/ Trans_ID | When the SPC bit is clear, this field contains the index to the SEST entry this completion message is for.<br>When the SPC bit is set, this field contains the Transaction ID. This is a copy of the Trans_ID field in the SFS request associated with this completion message.<br>See *8.12 I/O Request Block (IRB)* on page 188. |
| 3/31 | 0 | 0 | This bit is always cleared to 0. |
| 3/30 | INV | Invalid Entry | Set to 1 to indicate that the SEST entry is marked invalid because the VAL bit in the SEST entry is cleared to 0. INV is also set if an SPE occurs. When the INV bit is set, only the INT, CM_TYPE, and SEST_Index/Trans_ID fields are valid. |
| 3/29 | FTO | Frame Time Out | The FTO bit is set to 1 to indicate that a frame has exceeded the ED_TOV time in the Outbound FIFO. |

TABLE 9-2 Outbound Completion Message (Continued)

FIG.26C

| | | | |
|---|---|---|---|
| 3/28 | HPE | Host Programming Error | Set to 1 to indicate when one of the following occur:<br>• More data was requested to be transmitted than was available in the Gather List<br>• Hdr_Len (in SEST entries) <32 bytes<br>• RSP_Len (in SEST entries) <32 bytes<br>If the host receives a completion message with the HPE bit is set, it must close the loop by setting the CL bit in the Frame Manager Control register. |
| 3/27 | LKF | Link Failure | Set to 1 to indicate that a link failure was detected during the transmission of the indicated sequence. |
| 3/26 | 1 | 1 | This bit is always set to 1. |
| 3/25 | ASN | Abort Sequence Notification | Set to 1 to indicate that the sequence associated with this completion message has been aborted due to a previously existing sequence error. |
| 3/24..0 | Reserved | Reserved | |

TABLE 9-2 Outbound Completion Message (Continued)

FIG.26D

ERQ Frozen Completion Message

The ERQ Frozen Completion Message is sent to the host in response to setting FFA or FEQ bits in the TachLite Control register when the ERQ is in the frozen state, as defined by the EQF bit of the TachLite Status register.

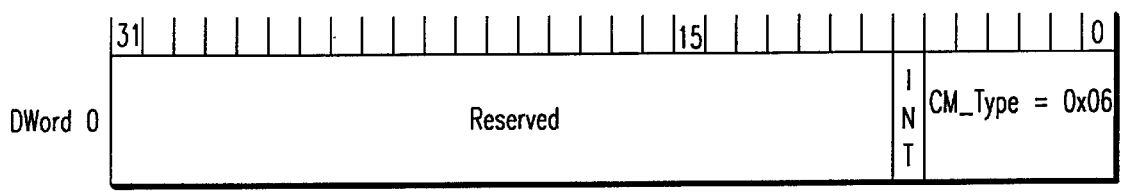

| DWord / Bit(s) | Symbol | Name | Description |
|---|---|---|---|
| 0/31..9 | Reserved | Reserved | |
| 0/8 | INT | Interrupt Generated | Always set to 1. |
| 0/7..0 | CM_Type | Completion Message Type | ERQ Frozen Completion Message: 0x06 |

TABLE 9-5 ERQ Frozen Completion Message

FCP Assists Frozen Completion Message

The FCP Assists Frozen Completion Message is sent to the host in response to setting FFA bit in the TachLite Control register when both the inbound and outbound FCP assists are in the frozen state, as defined by the OFF and IFF bits of the TachLite Status register.

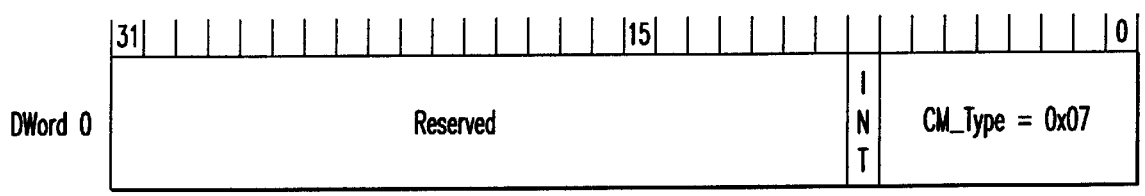

| DWord / Bit(s) | Symbol | Name | Description |
|---|---|---|---|
| 0/31..9 | Reserved | Reserved | |
| 0/8 | INT | Interrupt Generated | Always set to 1. |
| 0/7..0 | CM_Type | Completion Message Type | FCP Assists Frozen Completion Message: 0x07 |

Table 9-6 FCP Assists Frozen Completion Message

 A Link Failure causes the ERQ and FCP Assists to freeze, even if they were idle, and an Error Idle Completion Message is sent to the host.
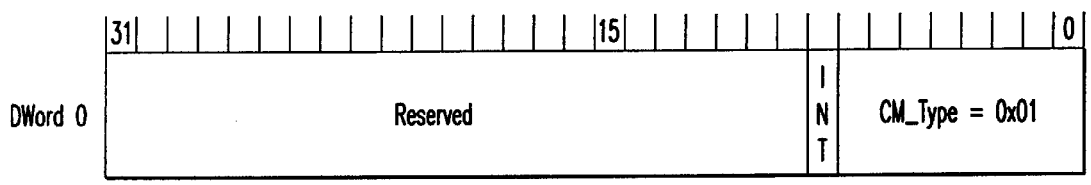
| DWord / Bit(s) | Symbol | Name | Description |
|---|---|---|---|
| 0/31..9 | Reserved | Reserved | |
| 0/8 | INT | Interrupt Generated | Always set to 1. |
| 0/7..0 | CM_Type | Completion Message Type | Error Idle Completion Message: 0x01 |
Table 9-3 Error Idle Completion Message
FIG. 29

DETERMINISTIC ERROR NOTIFICATION AND EVENT REORDERING MECHANISM PROVIDE A HOST PROCESSOR TO ACCESS COMPLETE STATE INFORMATION OF AN INTERFACE CONTROLLER FOR EFFICIENT ERROR RECOVERY

TECHNICAL FIELD

The present invention relates to the deterministic and ordered shutdown of interface controllers within communications network ports, and, in particular, to a method and system for a deterministic and ordered host processor-initiated shutdown of an interface controller and a deterministic and ordered interface controller-initiated shutdown upon detection of error conditions.

BACKGROUND OF THE INVENTION

The fibre channel ("FC") is an architecture and protocol for a data communications network for interconnecting a number of different combinations of computers and peripheral devices. The FC supports a variety of upper-level protocols, including the small computer systems interface ("SCSI") protocol. A computer or peripheral device is linked to the network through an FC port and copper wires or optical fibres. An FC port includes a transceiver and an interface controller, and the computer peripheral device in which the FC port is contained is called a "host." The FC port exchanges data with the host via a local data bus, such as a peripheral computer interface ("PCI") bus. The interface controller conducts lower-level protocol exchanges between the fibre channel and the computer or peripheral device in which the FC port resides.

An interface controller within an FC port serves essentially as a transducer between the serial receiver and transmitter components of the FC port and the host processor of the FC node in which the FC port is contained. The interface controller is concerned with, on the input side, assembling serially-encoded data received from the receiver component into ordered sets of bytes, assembling a majority of the ordered sets of bytes into FC frames, and passing the FC frames, along with status information, to the host processor within the context of larger collections of FC frames, called FC sequences and FC exchanges. On the output side, the interface controller accepts host memory buffer references and control information from the host processor and transforms them into FC frames within a context of FC sequences and FC exchanges, providing the FC frames to the transmitter component of the FC port for serial transmission to the FC. The interface controller communicates with the host processor through a set of host memory-based data structures and through a number of control registers accessible to both the interface controller and the host processor via a local bus, such as a PCI bus. At any given instant, the interface controller may be handling outgoing FC frames associated with different FC sequences, and may be also handling inbound FC frames from the FC associated with a number of FC sequences. The interface controller uses internal caches to cache information from the host memory-based data structures with which the interface controller communicates with the host processor. The interface controller plays an analogous function within an FC port as that played by a computer processor in a multi-tasking operating system environment. The interface control handles many different events concurrently with extremely dynamic patterns of state changes and information flow.

There are cases in which it is desirable, from the standpoint of the host processor, to stall or shutdown operation of the interface controller for a period of time. This is desirable for a number of reasons. For example, the host processor may wish to modify, reorder, or delete FC frames queued for transmission. The host processor may, in addition, need to substitute one data structure for another, or modify, reorder, or delete information contained within the data structures by which the host processor communicates with the interface controller. These host processor operations may be necessary for error processing, for implementing user-initiated abort requests, or for achieving priority-based transmission of FC frames. Because the internal state of the interface controller is complex and extremely dynamic, it is desirable to stall or shut down operation of the interface controller in a deterministic and ordered manner, so that operation of the interface controller can later be restored without undue interruption of ongoing transactions, lost and unaccounted for FC frames, and interruption of the network activities of other FC nodes interconnected by the FC.

Another case where interface controller shutdown may be required is when the interface controller detects certain error conditions, such as loss of connection to the FC. As with the host processor-initiated shutdown, shutdown of interface controller upon detection of error conditions should be accomplished in a deterministic and ordered manner.

Currently-available and previously-available interface controllers employ different methods for shutdown. In many interface controllers, shutdown results in a complete reset of the interface controller. This rather catastrophic method of shutdown may result in serious disruption of transactions that are in progress at the time of reset, may cause disruption to other FC nodes interconnected by the FC, and provide scant basis for the host processor to carry out any kind of recovery of interrupted transactions due to loss of context within the interface controller upon reset. In some interface controllers, a host processor depends upon receiving completion messages from the interface controller in order to monitor the activity of the interface controller to decide when to halt the interface controller. However, this method may still result in severe unanticipated disruption of ongoing transactions and may result in slow recovery times. Certain interface controllers include embedded processors that run error recovery firmware. This is, however, an expensive solution that can lead to performance problems. Finally, error recovery may be built into the hardware implementation of the interface controller, but this solution lacks flexibility. Error recovery methodologies may change as standards and markets evolve, and different types of applications may required different types of error handling, difficult or impossible to achieve in statically-defined hardware-implemented error recovery solutions.

A need has therefore been recognized by interface controller designers and manufacturers for a deterministic, non-destructive method for stalling, or shutting down, operation of interface controllers either by the host processor or by the interface controller in response to detection of error conditions by the interface controller. The desired method should make all shared data structures available to the host processor both for reading and for modification. Shutdown under the desired method is analogous to the shutdown of a computer processor within a multi-tasking operating system environment. Ongoing activities need to proceed to safe points at which they can be halted and sufficient information needs to be available for restart of the activities at a later time. It is desirable that this method not involve high-cost imbedded processors or low-flexibility, purely hardware solutions.

SUMMARY OF THE INVENTION

The present invention provides a network communications interface controller, operation of which can be deterministically stalled or halted by a host processor. In addition, the interface controller may deterministically stall or shutdown its own operation as a result of the detection of error conditions. The interface controller provides control registers by which a host processor can halt operation of the interface controller and restart operation of the interface controller. During shutdown, the interface controller stops receiving and sending data to the communications network, stops accepting tasks from the host processor, completes tasks for which control information has been cached in the interface controller, and notifies the host processor when the interface controller has reached a quiescent and non-operational state. Shared data structures and control registers through which the interface controller communicates with the host processor are then under complete control of the host processor. This allows the host processor to determine the state of the interface controller at the time that the operation was halted and to modify, rearrange, delete, and add information to shared data structures in order to modify the transactions that were being conducted by the interface controller at the time that operation of the interface controller was halted. The method and system of the present invention provide a lower-cost, deterministic, low-complexity hostprocessor-initiated and interface controller-initiated shutdown.

BRIEF DESCRIPTION OF THE DRAWING

FIGS. 6A–6C illustrate the SCSI protocol involved in the initiation and implementation of read and write I/O operations.

FIGS. 7A–7B illustrate a mapping of the FC Protocol to SCSI sequences exchanged between an initiator and target and the SCSI bus phases and states described in FIGS. 6A–6C.

FIG. 20 shows the data payload of FC frames transmitted by FC nodes in an arbitrated loop topology during each of the seven phases of loop initialization shown in FIG. 19.

FIGS. 22A–B, 23A–B, and 24A–E show detailed illustrations of the TL control register, status register, and frame monitor status register.

FIGS. 25, 26A–D and 27–29 show detailed illustrations of the frame anager completion message, the outbound completion message, the ERT queue rozen completion message, the FCP assist frozen completion message, and the error auto-completion message, but are sent from the TL to the host processor via the IMQ (902 in FIG. 9) at various stages of the deterministic and graceful shutdown of TL operation to be discussed below.

DETAILED DESCRIPTION OF THE INVENTION

Figure 1A:
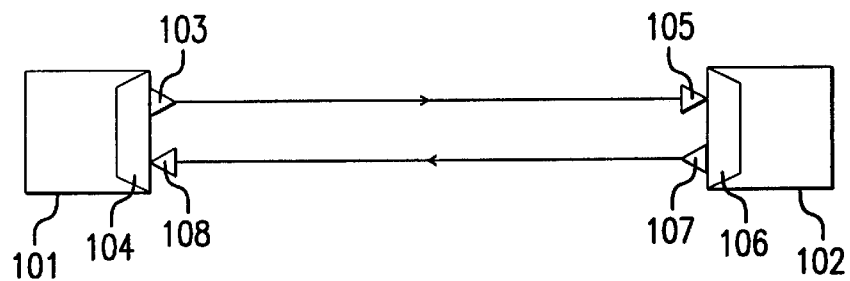
FIGS. 1A–1C shows the three different types of FC interconnection topologies.

The present invention will be described below in six subsections. The first three subsections provide greater detail about the fibre channel architecture and protocol, the SCSI architecture and protocol, and implementation of the SCSI protocol on top of the fibre channel protocol. The fourth subsection discusses the fibre channel arbitrated loop intialization process. The fifth subsection provides a general description of the present invention, and the sixth subsection provides a detailed pseudo-code implementation of the present invention.

Fibre Channel

The Fibre Channel ("FC") is defmed by, and described in, a number of ANSI Standards documents, including: (1) Fibre Channel Physical and Signaling Interface ("FC-PH"), ANSI X3.230-1994, ("FC-PH-2), ANSI X3.297-1997; (2) Fibre Channel-Arbitrated Loop ("FC-AL-2"), ANSI X3.272-1996; (3) Fibre Channel-Private Loop SCSI Direct Attached ("FC-PLDA"); (4) Fibre Channel-Fabric Loop Attachment ("FC-FLA"); (5) Fibre Channel Protocol for SCSI ("FCP"); (6) Fibre Channel Fabric Requirements ("FC-FG"), ANSI X3.289:1996; and (7) Fibre Channel 10-Bit Interface. These standards documents are under frequent revision. Additional Fibre Channel System Initiative ("FCSI") standards documents include: (1) Gigabaud Link Module Family ("GLM"), FCSI-301; (2) Common FC-PH Feature Sets Profiles, FCSI-101; and (3) SCSI Profile, FCSI-201. These documents may be found at the world wide web Internet page having the following address:

"http://www.fibrechannel.com"

The following description of the FC is meant to introduce and summarize certain of the information contained in these documents in order to facilitate discussion of the present invention. If a more detailed discussion of any of the topics introduced in the following description is desired, the above-mentioned documents may be consulted.

The FC is an architecture and protocol for data communications between FC nodes, generally computers, workstations, peripheral devices, and arrays or collections of peripheral devices, such as disk arrays, interconnected by one or more communications media. Communications media include shielded twisted pair connections, coaxial cable, and optical fibers. An FC node is connected to a communications medium via at least one FC port and FC link. An FC port is an FC host adapter or FC controller that shares a register and memory interface with the processing components of the FC node, and that implements, in hardware and firmware, the lower levels of the FC protocol. The FC node generally exchanges data and control information with the FC port using shared data structures in shared memory and using control registers in the FC port. The FC port includes serial transmitter and receiver components coupled to a communications medium via a link that comprises electrical wires or optical strands.

In the following discussion, "FC" is used as an adjective to refer to the general Fibre Channel architecture and protocol, and is used as a noun to refer to an instance of a Fibre Channel communications medium. Thus, an FC (architecture and protocol) port may receive an FC (architecture and protocol) sequence from the FC (communications medium).

Figure 1B:
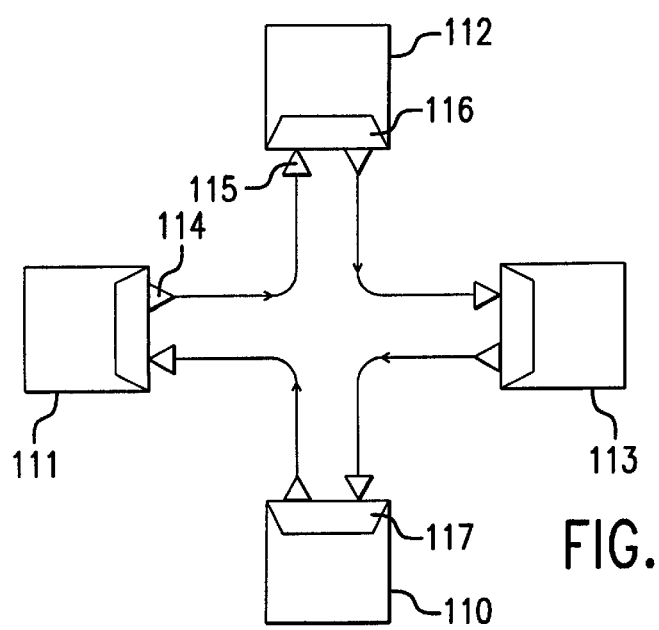
Figure 1C:
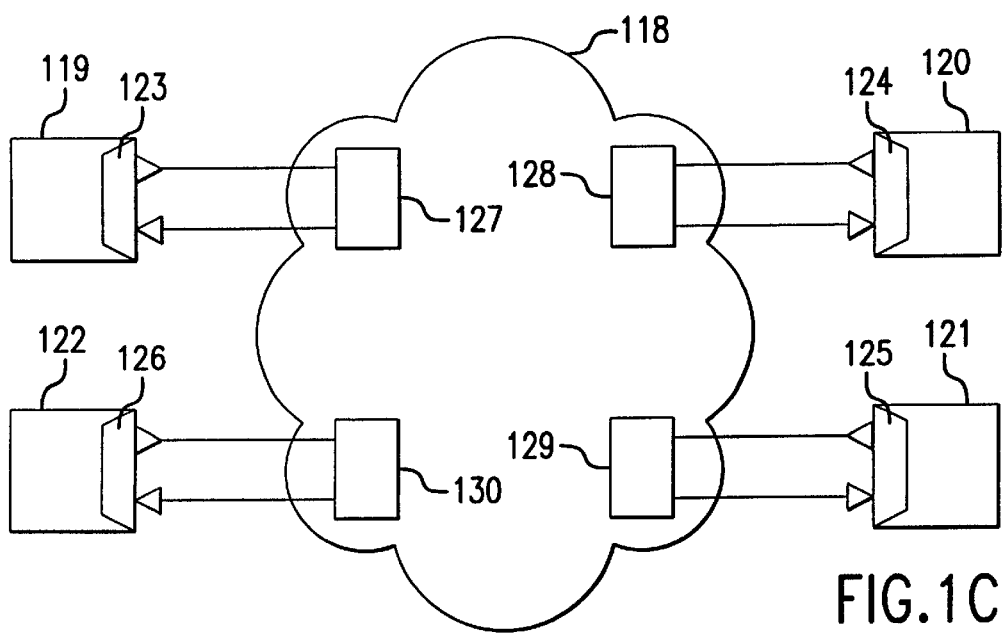

The FC architecture and protocol support three different types of interconnection topologies, shown in FIGS. 1A–1C. FIG. 1A shows the simplest of the three interconnected topologies, called the "point-to-point topology." In the point-to-point topology shown in FIG. 1A, a first node 101 is directly connected to a second node 102 by directly coupling the transmitter 103 of the FC port 104 of the first node 101 to the receiver 105 of the FC port 106 of the second node 102, and by directly connecting the transmitter 107 of the FC port 106 of the second node 102 to the receiver 108 of the FC port 104 of the first node 101. The ports 104 and 106 used in the point-to-point topology are called N_Ports.

FIG. 1B shows a somewhat more complex topology called the "FC arbitrated loop topology." FIG. 1B shows four nodes 110–113 interconnected within an arbitrated loop. Signals, consisting of electrical or optical binary data, are transferred from one node to the next node around the loop in a circular fashion. The transmitter of one node, such as transmitter 114 associated with node 111, is directly connected to the receiver of the next node in the loop, in the case of transmitter 114, with the receiver 115 associated with node 112. Two types of FC ports may be used to interconnect FC nodes within an arbitrated loop. The most common type of port used in arbitrated loops is called the "NL_Port." A special type of port, called the "FL_Port," may be used to interconnect an FC arbitrated loop with an FC fabric topology, to be described below. Only one FL_Port may be actively incorporated into an arbitrated loop topology. An FC arbitrated loop topology may include up to 127 active FC ports, and may include additional nonparticipating FC ports.

In the FC arbitrated loop topology, nodes contend for, or arbitrate for, control of the arbitrated loop. In general, the node with the lowest port address obtains control in the case that more than one node is contending for control. A fairness algorithm may be implemented by nodes to ensure that all nodes eventually receive control within a reasonable amount of time. When a node has acquired control of the loop, the node can open a channel to any other node within the arbitrated loop. In a half duplex channel, one node transmits and the other node receives data. In a full duplex channel, data may be transmitted by a first node and received by a second node at the same time that data is transmitted by the second node and received by the first node. For example, if, in the arbitrated loop of FIG. 1B, node 111 opens a full duplex channel with node 113, then data transmitted through that channel from node 111 to node 113 passes through NL_Port 116 of node 112, and data transmitted by node 113 to node 111 passes through NL_Port 117 of node 110.

FIG. 1C shows the most general and most complex FC topology, called an "FC fabric." The FC fabric is represented in FIG. 1C by the irregularly shaped central object 118 to which four FC nodes 119–122 are connected. The N Ports 123–126 within the FC nodes 119–122 are connected to F Ports 127–130 within the fabric 118. The fabric is a switched or cross-point switch topology similar in function to a telephone system. Data is routed by the fabric between F_Ports through switches or exchanges called "fabric elements." There may be many possible routes through the fabric between one F_Port and another F_Port. The routing of data and the addressing of nodes within the fabric associated with F_Ports are handled by the FC fabric, rather than by FC nodes or N Ports.

When optical fibers are employed, a single FC fabric can extend for ten kilometers. The FC can support interconnection of more than 16,000,000 FC nodes. A single FC host adapter can transmit and receive data at rates of up to 200 Mbytes per second. Much higher data exchange rates are planned for FC components in the near future.

Figure 2:
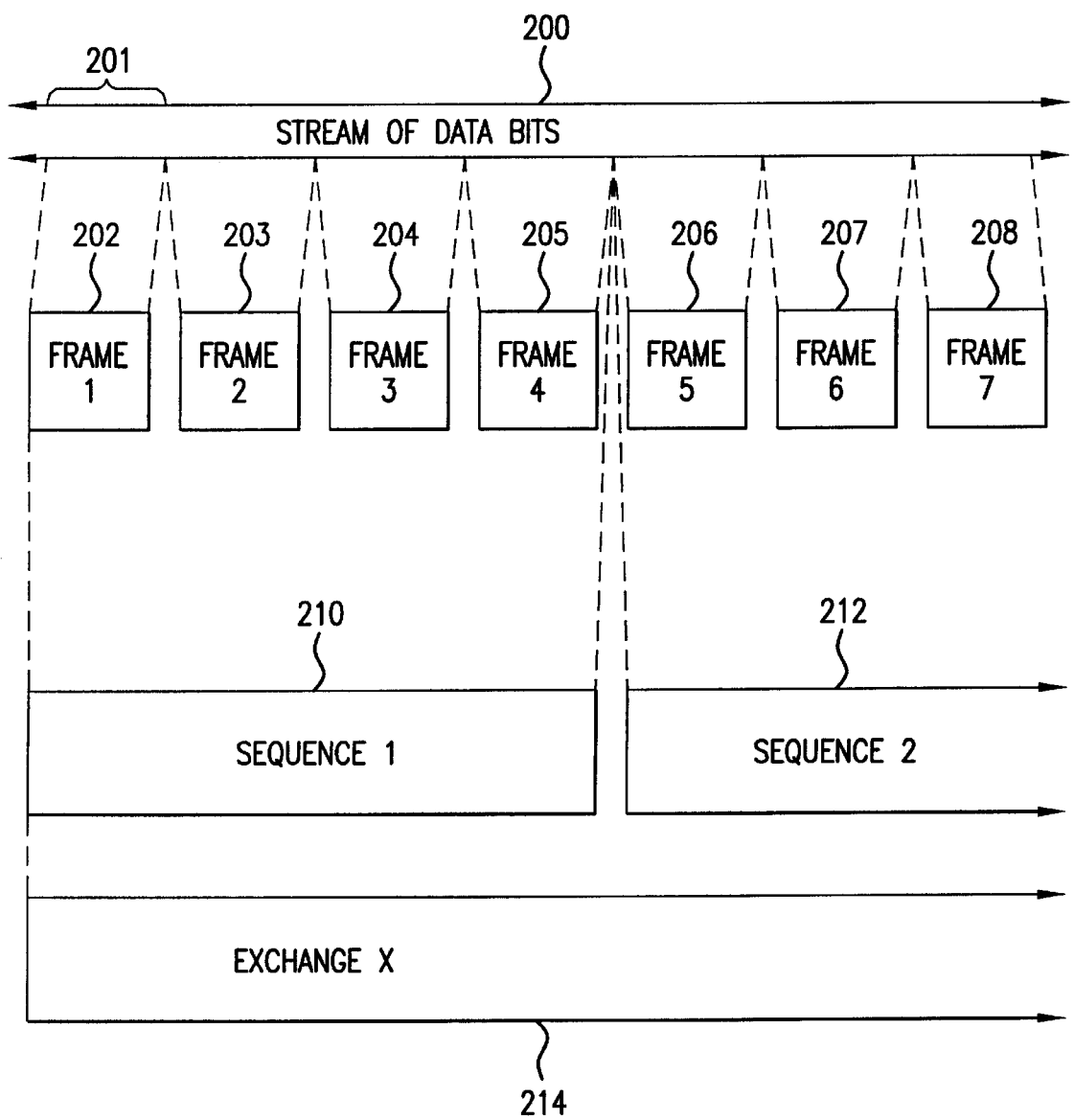
FIG. 2 illustrates a very simple hierarchy by which data is organized, in time, for transfer through an FC network.

The FC is a serial communications medium. Data is transferred one bit at a time at extremely high transfer rates. FIG. 2 illustrates a very simple hierarchy by which data is organized, in time, for transfer through an FC network. At the lowest conceptual level, the data can be considered to be a stream of data bits 200. The smallest unit of data, or grouping of data bits, supported by an FC network is a 10-bit character that is decoded by FC port as an 8-bit character. FC primitives are composed of 10-bit characters or bytes. Certain FC primitives are employed to carry control information exchanged between FC ports. The next level of data organization, a fundamental level with regard to the FC protocol, is a frame. Seven frames 202–208 are shown in FIG. 2. A frame may be composed of between 36 and 2,148 bytes of data, depending on the nature of the data included in the frame. The first FC frame, for example, corresponds to the data bits of the stream of data bits 200 encompassed by the horizontal bracket 201. The FC protocol specifies a next higher organizational level called the sequence. A first sequence 210 and a portion of a second sequence 212 are displayed in FIG. 2. The first sequence 210 is composed of frames one through four 202–205. The second sequence 212 is composed of frames five through seven 206–208 and additional frames that are not shown. The FC protocol specifies a third organizational level called the exchange. A portion of an exchange 214 is shown in FIG. 2. This exchange 214 is composed of at least the first sequence 210 and the second sequence 212 shown in FIG. 2. This exchange can alternatively be viewed as being composed of frames one through seven 202–208, and any additional frames contained in the second sequence 212 and in any additional sequences that compose the exchange 214.

The FC is a full duplex data transmission medium. Frames and sequences can be simultaneously passed in both directions between an originator, or initiator, and a responder, or target. An exchange comprises all sequences, and frames within the sequences, exchanged between an originator and a responder during a single I/O transaction, such as a read I/O transaction or a write I/O transaction. The FC protocol is designed to transfer data according to any number of higherlevel data exchange protocols, including the Internet protocol ("IP"), the Small Computer Systems Interface ("SCSI") protocol, the High Performance Parallel Interface ("HIPPI"), and the Intelligent Peripheral Interface ("IPI"). The SCSI bus architecture will be discussed in the following subsection, and much of the subsequent discussion in this and remaining subsections will focus on the SCSI protocol embedded within the FC protocol. The standard adaptation of SCSI protocol to fibre channel is subsequently referred to in this document as "FCP." Thus, the FC can support a master-slave type communications paradigm that is characteristic of the SCSI bus and other peripheral interconnection buses, as well as the relatively open and unstructured communication protocols such as those used to implement the Internet. The SCSI bus architecture concepts of an initiator and target are carried forward in the FCP, designed, as noted above, to encapsulate SCSI commands and data exchanges for transport through the FC.

Figure 3:
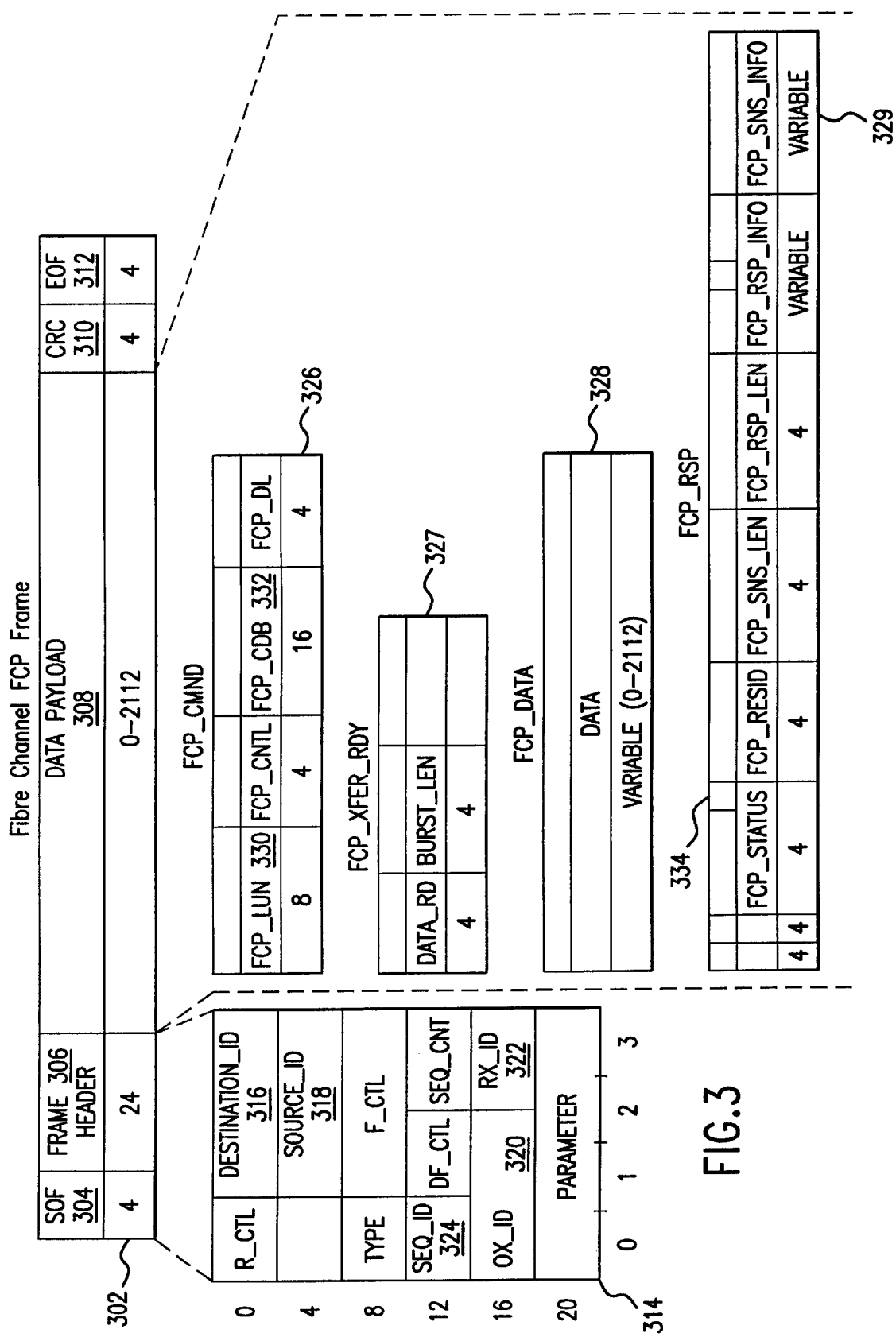
FIG. 3 shows the contents of a standard FC frame.

FIG. 3 shows the contents of a standard FC frame. The FC frame 302 comprises five high level sections 304, 306, 308, 310 and 312. The first high level section, called the start-of-frame deliminator 304, comprises 4 bytes that mark the beginning of the frame. The next high level section, called frame header 306, comprises 24 bytes that contain addressing information, sequence information, exchange information, and various control flags. A more detailed view of the frame header 314 is shown expanded from the FC frame 302 in FIG. 3. The destination identifier ("D_ID"), or DESTINATION_ID 316, is a 24-bit FC address indicating the destination FC port for the frame. The source identifier ("S_ID"), or SOURCE_ID 318, is a 24-bit address that indicates the FC port that transmitted the frame. The originator ID, or OX_ID 320, and the responder ID 322, or RX_ID, together compose a 32-bit exchange ID that identifies the exchange to which the frame belongs with respect to the originator, or initiator, and responder, or target, FC ports. The sequence ID, or SEQ_ID, 324 identifies the sequence to which the frame belongs.

The next high level section 308, called the data payload, contains the actual data packaged within the FC frame. The data payload contains data and encapsulating protocol information that is being transferred according to a higherlevel protocol, such as IP and SCSI. FIG. 3 shows four basic types of data payload layouts 326–329 used for data transfer according to the SCSI protocol. The first of these formats 326, called the FCP_CMND, is used to send a SCSI command from an initiator to a target. The FCP_LUN field 330 comprises an 8-byte address that may, in certain implementations, specify a particular SCSI-bus adapter, a target device associated with that SCSI-bus adapter, and a logical unit number ("LUN") corresponding to a logical device associated with the specified target SCSI device that together represent the target for the FCP_CMND. In other implementations, the FCP_LUN field 330 contains an index or reference number that can be used by the target PC host adapter to determine the SCSI-bus adapter, a target device associated with that SCSI-bus adapter, and a LUN corresponding to a logical device associated with the specified target SCSI device. An actual SCSI command, such as a SCSI read or write I/O command, is contained within the 16-byte field FCP_CDB 332.

The second type of data payload format 327 shown in FIG. 3 is called the FCP_XFER_RDY layout. This data payload format is used to transfer a SCSI proceed command from the target to the initiator when the target is prepared to begin receiving or sending data. The third type of data payload format 328 shown in FIG. 3 is the FCP_DATA format, used for transferring the actual data that is being read or written as a result of execution of a SCSI I/O transaction. The final data payload format 329 shown in FIG. 3 is called the FCP_RSP layout, used to transfer a SCSI status byte 334, as well as other FCP status information, from the target back to the initiator upon completion of the I/O transaction.

The SCSI Bus Architecture

A computer bus is a set of electrical signal lines through which computer commands and data are transmitted between processing, storage, and input/output ("I/O") components of a computer system. The SCSI I/O bus is the most widespread and popular computer bus for interconnecting mass storage devices, such as hard disks and CD-ROM drives, with the memory and processing components of computer systems. The SCSI bus architecture is defined in three major standards: SCSI-1, SCSI-2 and SCSI-3. The SCSI-1 and SCSI-2 standards are published in the American National Standards Institute ("ANSI") standards documents "X3.131-1986," and "X3.131-1994," respectively. The SCSI-3 standard is currently being developed by an ANSI committee. An overview of the SCSI bus architecture is provided by "The SCSI Bus and IDE Interface," Freidhelm Schmidt, Addison-Wesley Publishing Company, ISBN 0-201-17514-2, 1997 ("Schmidt").

Figure 4:
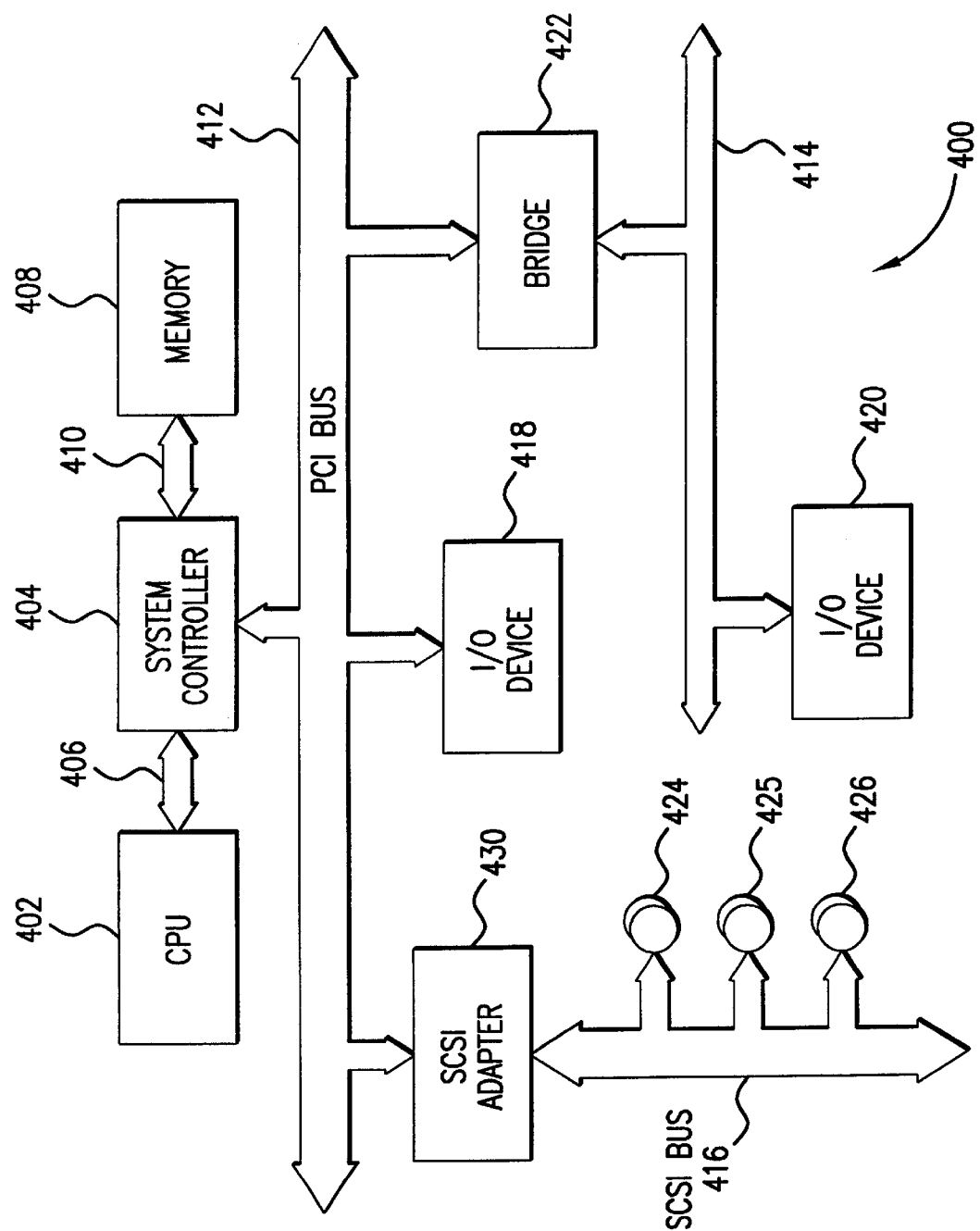
FIG. 4 is a block diagram of a common personal computer architecture including a SCSI bus.

FIG. 4 is a block diagram of a common personal computer ("PC") architecture including a SCSI bus. The PC 400 includes a central processing unit, or processor ("CPU") 402, linked to a system controller 404 by a high-speed CPU bus 406. The system controller is, in turn, linked to a system memory component 408 via a memory bus 410. The system controller 404 is, in addition, linked to various peripheral devices via a peripheral component interconnect ("PCI") bus 412 that is interconnected with a slower industry standard architecture ("ISA") bus 414 and a SCSI bus 416. The architecture of the PCI bus is described in "PCI System Architecture,"Shanley & Anderson, Mine Share, Inc., Addison-Wesley Publishing Company, ISBN 0-201-40993-3, 1995. The interconnected CPU bus 406, memory bus 410, PCI bus 412, and ISA bus 414 allow the CPU to exchange data and commands with the various processing and memory components and I/O devices included in the computer system. Generally, very high-speed and high bandwidth I/O devices, such as a video display device 418, are directly connected to the PCI bus. Slow I/O devices 420, such as a keyboard 420 and a pointing device (not shown), are connected directly to the ISA bus 414. The ISA bus is interconnected with the PCI bus through a bus bridge component 422. Mass storage devices, such as hard disks, floppy disk drives, CD-ROM drives, and tape drives 424–426 are connected to the SCSI bus 416. The SCSI bus is interconnected with the PCI bus 412 via a SCSI-bus adapter 430. The SCSI-bus adapter 430 includes a processor component, such as processor selected from the Symbios family of 53C8xx SCSI processors, and interfaces to the PCI bus 412 using standard PCI bus protocols. The SCSI-bus adapter 430 interfaces to the SCSI bus 416 using the SCSI bus protocol that will be described, in part, below. The SCSI-bus adapter 430 exchanges commands and data with SCSI controllers (not shown) that are generally embedded within each mass storage device 424–426, or SCSI device, connected to the SCSI bus. The SCSI controller is a hardware/firmware component that interprets and responds to SCSI commands received from a SCSI adapter via the SCSI bus and that implements the SCSI commands by interfacing with, and controlling, logical devices. A logical device may correspond to one or more physical devices, or to portions of one or more physical devices. Physical devices include data storage devices such as disk, tape and CD-ROM drives.

Two important types of commands, called I/O commands, direct the SCSI device to read data from a logical device and write data to a logical device. An I/O transaction is the exchange of data between two components of the computer system, generally initiated by a processing component, such as the CPU 402, that is implemented, in part, by a read I/O command or by a write I/O command. Thus, I/O transactions include read I/O transactions and write I/O transactions.

The SCSI bus 416 is a parallel bus that can simultaneously transport a number of data bits. The number of data bits that can be simultaneously transported by the SCSI bus is referred to as the width of the bus. Different types of SCSI buses have widths of 8, 16 and 32 bits. The 16 and 32-bit SCSI buses are referred to as wide SCSI buses.

As with all computer buses and processors, the SCSI bus is controlled by a clock that determines the speed of operations and data transfer on the bus. SCSI buses vary in clock speed. The combination of the width of a SCSI bus and the clock rate at which the SCSI bus operates determines the number of bytes that can be transported through the SCSI bus per second, or bandwidth of the SCSI bus. Different types of SCSI buses have bandwidths ranging from less than 2 megabytes ("Mbytes") per second up to 40 Mbytes per second, with increases to 80 Mbytes per second and possibly 160 Mbytes per second planned for the future. The increasing bandwidths may be accompanied by increasing limitations in the physical length of the SCSI bus.

Figure 5:
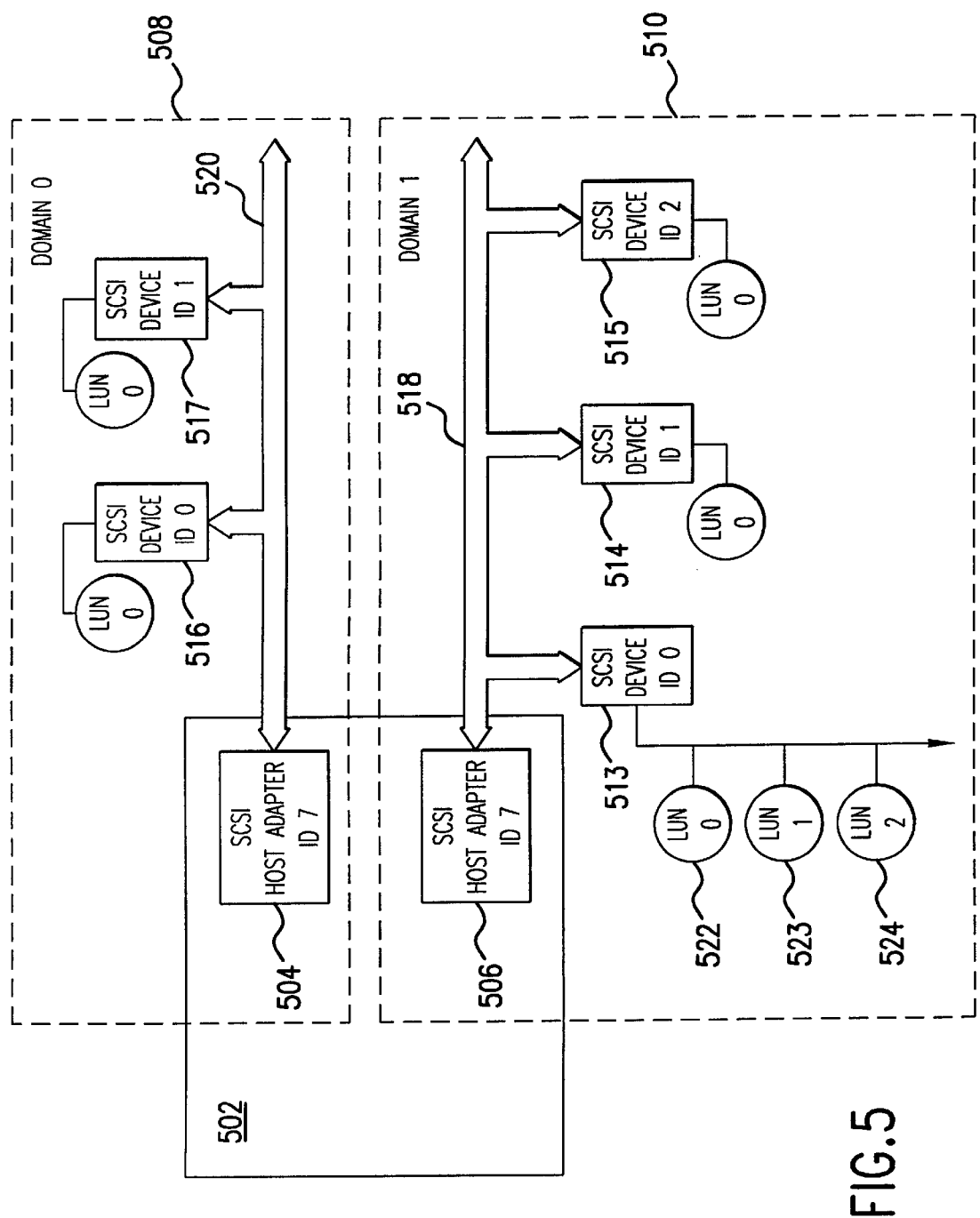
FIG. 5 illustrates the SCSI bus topology.

FIG. 5 illustrates the SCSI bus topology. A computer system 502, or other hardware system, may include one or more SCSI-bus adapters 504 and 506. The SCSI-bus adapter, the SCSI bus which the SCSI-bus adapter controls, and any peripheral devices attached to that SCSI bus together comprise a domain. SCSI-bus adapter 504 in FIG. 5 is associated with a first domain 508 and SCSI-bus adapter 506 is associated with a second domain 510. The most current SCSI-2 bus implementation allows fifteen different SCSI devices 513–515 and 516–517 to be attached to a single SCSI bus. In FIG. 5, SCSI devices 513–515 are attached to SCSI bus 518 controlled by SCSI-bus adapter 506, and SCSI devices 516–517 are attached to SCSI bus 520 controlled by SCSI-bus adapter 504. Each SCSI-bus adapter and SCSI device has a SCSI identification number, or SCSI_ID, that uniquely identifies the device or adapter in a particular SCSI bus. By convention, the SCSI-bus adapter has SCSI_ID 7, and the SCSI devices attached to the SCSI bus have SCSI_IDs ranging from 0 to 6 and from 8 to 15. A SCSI device, such as SCSI device 513, may interface with a number of logical devices, each logical device comprising portions of one or more physical devices. Each logical device is identified by a logical unit number ("LUN") that uniquely identifies the logical device with respect to the SCSI device that controls the logical device. For example, SCSI device 513 controls logical devices 522–524 having LUNs 0, 1, and 2, respectively. According to SCSI terminology, a device that initiates an I/O command on the SCSI bus is called an initiator, and a SCSI device that receives an I/O command over the SCSI bus that directs the SCSI device to execute an I/O operation is called a target.

In general, a SCSI-bus adapter, such as SCSI-bus adapters 504 and 506, initiates I/O operations by sending commands to target devices. The target devices 513–515 and 516–517 receive the I/O commands from the SCSI bus. The target devices 513–515 and 516–517 then implement the commands by interfacing with one or more logical devices that they control to either read data from the logical devices and return the data through the SCSI bus to the initiator or to write data received through the SCSI bus from the initiator to the logical devices. Finally, the target devices 513–515 and 516–517 respond to the initiator through the SCSI bus with status messages that indicate the success or failure of implementation of the commands.

FIGS. 6A–6C illustrate the SCSI protocol involved in the initiation and implementation of read and write I/O operations. Read and write I/O operations compose the bulk of I/O operations performed by SCSI devices. Efforts to maximize the efficiency of operation of a system of mass storage devices interconnected by a SCSI bus are most commonly directed toward maximizing the efficiency at which read and write I/O operations are performed. Thus, in the discussions to follow, the architectural features of various hardware devices will be discussed in terms of read and write operations.

FIG. 6A shows the sending of a read or write I/O command by a SCSI initiator, most commonly a SCSI-bus adapter, to a SCSI target, most commonly a SCSI controller embedded in a SCSI device associated with one or more logical devices. The sending of a read or write I/O command is called the command phase of a SCSI I/O operation. FIG. 6A is divided into initiator 602 and target 604 sections by a central vertical line 606. Both the initiator and the target sections include columns entitled "state" 606 and 608 that describe the state of the SCSI bus and columns entitled "events" 610 and 612 that describe the SCSI bus events associated with the initiator and the target, respectively. The bus states and bus events involved in the sending of the I/O command are ordered in time, descending from the top of FIG. 6A to the bottom of FIG. 6A. FIGS. 6B–6C also adhere to this above-described format.

The sending of an I/O command from an initiator SCSI-bus adapter to a target SCSI device, illustrated in FIG. 6A, initiates a read or write I/O operation by the target SCSI device. Referring to FIG. 4, the SCSI-bus adapter 430 initiates the I/O operation as part of an I/O transaction. Generally, the SCSI-bus adapter 430 receives a read or write command via the PCI bus 412, system controller 404, and CPU bus 406, from the CPU 402 directing the SCSI-bus adapter to perform either a read operation or a write operation. In a read operation, the CPU 402 directs the SCSI-bus adapter 430 to read data from a mass storage device 424–426 and transfer that data via the SCSI bus 416, PCI bus 412, system controller 404, and memory bus 410 to a location within the system memory 408. In a write operation, the CPU 402 directs the system controller 404 to transfer data from the system memory 408 via the memory bus 410, system controller 404, and PCI bus 412 to the SCSI-bus adapter 430, and directs the SCSI-bus adapter 430 to send the data via the SCSI bus 416 to a mass storage device 424–426 on which the data is written.

FIG. 6A starts with the SCSI bus in the BUS FREE state 614, indicating that there are no commands or data currently being transported on the SCSI device. The initiator, or SCSI-bus adapter, asserts the BSY, D7 and SEL signal lines of the SCSI bus in order to cause the bus to enter the ARBITRATION state 616. In this state, the initiator announces to all of the devices an intent to transmit a command on the SCSI bus. Arbitration is necessary because only one device may control operation of the SCSI bus at any instant in time. Assuming that the initiator gains control of the SCSI bus, the initiator then asserts the ATN signal line and the DX signal line corresponding to the target SCSI_ID in order to cause the SCSI bus to enter the SELECTION state 618. The initiator or target asserts and drops various SCSI signal lines in a particular sequence in order to effect a SCSI bus state change, such as the change of state from the ARBITRATION state 616 to the SELECTION state 618, described above. These sequences can be found in Schmidt and in the ANSI standards, and will therefore not be further described below.

When the target senses that the target has been selected by the initiator, the target assumes control 620 of the SCSI bus in order to complete the command phase of the I/O operation. The target then controls the SCSI signal lines in order to enter the MESSAGE OUT state 622. In a first event that occurs in the MESSAGE OUT state, the target receives from the initiator an IDENTIFY message 623. The IDENTIFY message 623 contains a LUN field 624 that identifies the LUN to which the command message that will follow is addressed. The IDENTIFY message 623 also contains a flag 625 that is generally set to indicate to the target that the target is authorized to disconnect from the SCSI bus during the target's implementation of the I/O command that will follow. The target then receives a QUEUE TAG message 626 that indicates to the target how the I/O command that will follow should be queued, as well as providing the target with a queue tag 627. The queue tag is a byte that identifies the I/O command. A SCSI-bus adapter can therefore concurrently manage 656 different I/O commands per LUN. The combination of the SCSI_of the initiator SCSI-bus adapter, the SCSI_of the target SCSI device, the target LUN, and the queue tag together comprise an I_T_L_Q nexus reference number that uniquely identifies the I/O operation corresponding to the I/O command that will follow within the SCSI bus. Next, the target device controls the SCSI bus signal lines in order to enter the COMMAND state 628. In the COMMAND state, the target solicits and receives from the initiator the I/O command 630. The I/O command 630 includes an opcode 632 that identifies the particular command to be executed, in this case a read command or a write command, a logical block number 636 that identifies the logical block of the logical device that will be the beginning point of the read or write operation specified by the command, and a data length 638 that specifies the number of blocks that will be read or written during execution of the command.

When the target has received and processed the I/O command, the target device controls the SCSI bus signal lines in order to enter the MESSAGE IN state 640 in which the target device generally sends a disconnect message 642 back to the initiator device. The target disconnects from the SCSI bus because, in general, the target will begin to interact with the logical device in order to prepare the logical device for the read or write operation specified by the command. The target may need to prepare buffers for receiving data, and, in the case of disk drives or CD-ROM drives, the target device may direct the logical device to seek to the appropriate block specified as the starting point for the read or write command. By disconnecting, the target device frees up the SCSI bus for transportation of additional messages, commands, or data between the SCSI-bus adapter and the target devices. In this way, a large number of different I/O operations can be concurrently multiplexed over the SCSI bus. Finally, the target device drops the BSY signal line in order to return the SCSI bus to the BUS FREE state 644.

The target device then prepares the logical device for the read or write operation. When the logical device is ready for reading or writing data, the data phase for the I/O operation ensues. FIG. 6B illustrates the data phase of a SCSI I/O operation. The SCSI bus is initially in the BUS FREE state 646. The target device, now ready to either return data in response to a read I/O command or accept data in response to a write I/O command, controls the SCSI bus signal lines in order to enter the ARBITRATION state 648. Assuming that the target device is successful in arbitrating for control of the SCSI bus, the target device controls the SCSI bus signal lines in order to enter the RESELECTION state 650. The RESELECTION state is similar to the SELECTION state, described in the above discussion of FIG. 6A, except that it is the target device that is making the selection of a SCSI-bus adapter with which to communicate in the RESELECTION state, rather than the SCSI-bus adapter selecting a target device in the SELECTION state.

Once the target device has selected the SCSI-bus adapter, the target device manipulates the SCSI bus signal lines in order to cause the SCSI bus to enter the MESSAGE IN state 652. In the MESSAGE IN state, the target device sends both an IDENTIFY message 654 and a QUEUE TAG message 656 to the SCSI-bus adapter. These messages are identical to the IDENTITY and QUEUE TAG messages sent by the initiator to the target device during transmission of the I/O command from the initiator to the target, illustrated in FIG. 6A. The initiator may use the I_T_L_Q nexus reference number, a combination of the SCSI_IDs of the initiator and target device, the target LUN, and the queue tag contained in the QUEUE TAG message, to identify the I/O transaction for which data will be subsequently sent from the target to the initiator, in the case of a read operation, or to which data will be subsequently transmitted by the initiator, in the case of a write operation. The I_T_L_Q nexus reference number is thus an I/O operation handle that can be used by the SCSI-bus adapter as an index into a table of outstanding I/O commands in order to locate the appropriate buffer for receiving data from the target device, in case of a read, or for transmitting data to the target device, in case of a write.

After sending the IDENTIFY and QUEUE TAG messages, the target device controls the SCSI signal lines in order to transition to a DATA state 658. In the case of a read I/O operation, the SCSI bus will transition to the DATA IN state. In the case of a write I/O operation, the SCSI bus will transition to a DATA OUT state. During the time that the SCSI bus is in the DATA state, the target device will transmit, during each SCSI bus clock cycle, a data unit having a size, in bits, equal to the width of the particular SCSI bus on which the data is being transmitted. In general, there is a SCSI bus signal line handshake involving the signal lines ACK and REQ as part of the transfer of each unit of data. In the case of a read I/O command, for example, the target device places the next data unit on the SCSI bus and asserts the REQ signal line. The initiator senses assertion of the REQ signal line, retrieves the transmitted data from the SCSI bus, and asserts the ACK signal line to acknowledge receipt of the data. This type of data transfer is called asynchronous transfer. The SCSI bus protocol also allows for the target device to transfer a certain number of data units prior to receiving the first acknowledgment from the initiator. In this transfer mode, called synchronous transfer, the latency between the sending of the first data unit and receipt of acknowledgment for that transmission is avoided. During data transmission, the target device can interrupt the data transmission by sending a SAVE POINTERS message followed by a DISCONNECT message to the initiator and then controlling the SCSI bus signal lines to enter the BUS FREE state. This allows the target device to pause in order to interact with the logical devices which the target device controls before receiving or transmitting further data. After disconnecting from the SCSI bus, the target device may then later again arbitrate for control of the SCSI bus and send additional IDENTIFY and QUEUE TAG messages to the initiator so that the initiator can resume data reception or transfer at the point that the initiator was interrupted. An example of disconnect and reconnect 660 are shown in FIG. 3B interrupting the DATA state 658. Finally, when all the data for the I/O operation has been transmitted, the target device controls the SCSI signal lines in order to enter the MESSAGE IN state 662, in which the target device sends a DISCONNECT message to the initiator, optionally preceded by a SAVE POINTERS message. After sending the DISCONNECT message, the target device drops the BSY signal line so the SCSI bus transitions to the BUS FREE state 664.

Following the transmission of the data for the I/O operation, as illustrated in FIG. 6B, the target device returns a status to the initiator during the status phase of the I/O operation. FIG. 6C illustrates the status phase of the I/O operation. As in FIGS. 6A–6B, the SCSI bus transitions from the BUS FREE state 666 to the ARBITRATION state 668, RESELECTION state 670, and MESSAGE IN state 672, as in FIG. 3B. Following transmission of an IDENTIFY message 674 and QUEUE TAG message 676 by the target to the initiator during the MESSAGE IN state 672, the target device controls the SCSI bus signal lines in order to enter the STATUS state 678. In the STATUS state 678, the target device sends a single status byte 684 to the initiator to indicate whether or not the I/O command was successfully completed. In FIG. 6C, the status byte 680 corresponding to a successful completion, indicated by a status code of 0, is shown being sent from the target device to the initiator. Following transmission of the status byte, the target device then controls the SCSI bus signal lines in order to enter the MESSAGE IN state 682, in which the target device sends a COMMAND COMPLETE message 684 to the initiator. At this point, the I/O operation has been completed. The target device then drops the BSY signal line so that the SCSI bus returns to the BUS FREE state 686. The SCSI-bus adapter can now finish its portion of the I/O command, free up any internal resources that were allocated in order to execute the command, and return a completion message or status back to the CPU via the PCI bus.

Mapping the SCSI Protocol onto FCP

Figure 7B:
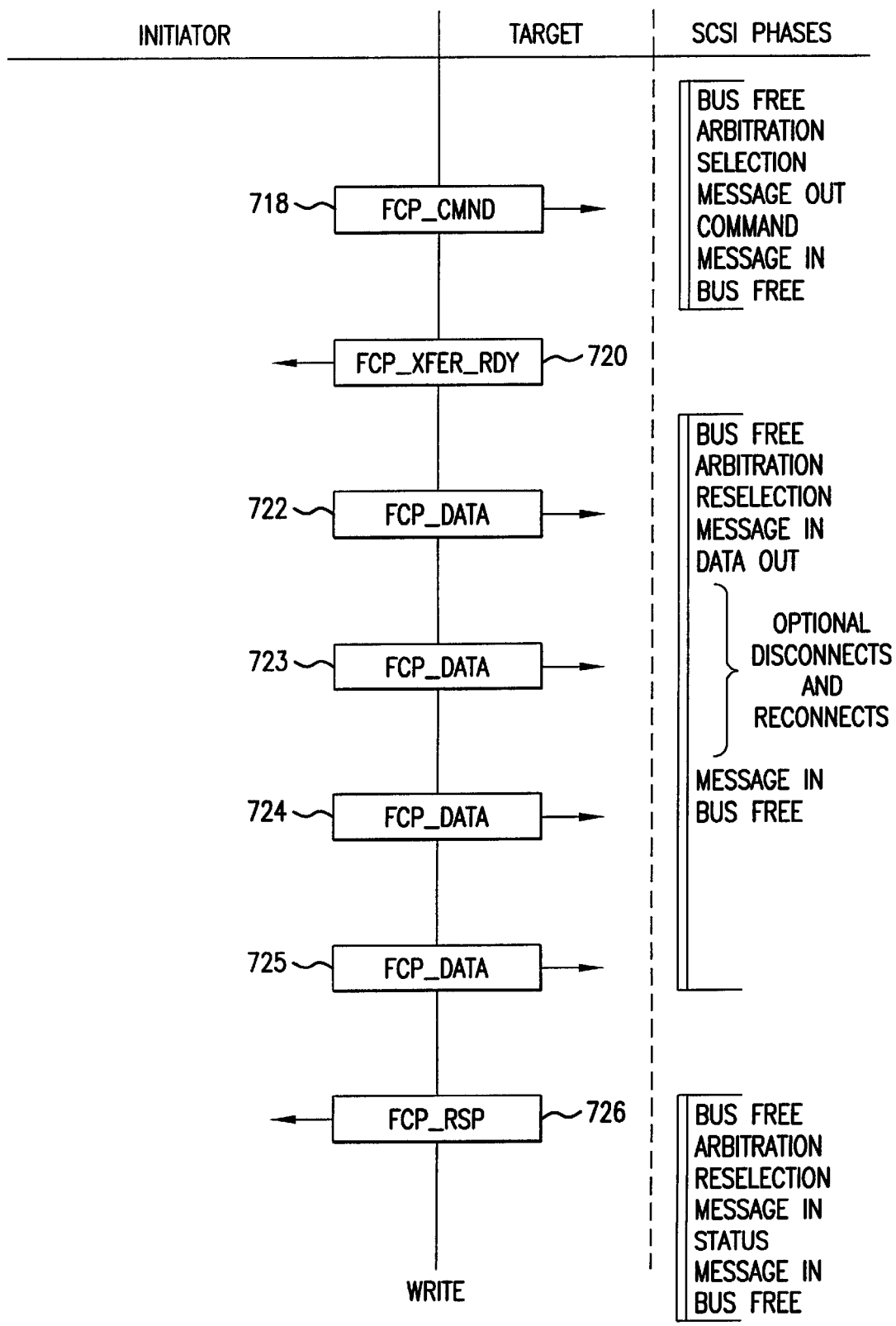

FIGS. 7A and 7B illustrate a mapping of FCP sequences exchanged between an initiator and target and the SCSI bus phases and states described in FIGS. 6A–6C. In FIGS. 7A–7B, the target SCSI adapter is assumed to be packaged together with a FCP host adapter, so that the target SCSI adapter can communicate with the initiator via the FC and with a target SCSI device via the SCSI bus. FIG. 7A shows a mapping between FCP sequences and SCSI phases and states for a read I/O transaction. The transaction is initiated when the initiator sends a single-frame FCP sequence containing a FCP_CMND data payload through the FC to a target SCSI adapter 702. When the target SCSI-bus adapter receives the FCP_CMND frame, the target SCSI-bus adapter proceeds through the SCSI states of the command phase 704 illustrated in FIG. 6A, including ARBITRATION, RESELECTION, MESSAGE OUT, COMMAND, and MESSAGE IN. At the conclusion of the command phase, as illustrated in FIG. 6A, the SCSI device that is the target of the I/O transaction disconnects from the SCSI bus in order to free up the SCSI bus while the target SCSI device prepares to execute the transaction. Later, the target SCSI device rearbitrates for SCSI bus control and begins the data phase of the I/O transaction 706. At this point, the SCSI-bus adapter may send a FCP_XFER_RDY single-frame sequence 708 back to the initiator to indicate that data transmission can now proceed. In the case of a read I/O transaction, the FCP_XFER_RDY single-frame sequence is optional. As the data phase continues, the target SCSI device begins to read data from a logical device and transmit that data over the SCSI bus to the target SCSI-bus adapter. The target SCSI-bus adapter then packages the data received from the target SCSI device into a number of FCP_DATA frames that together compose the third sequence of the exchange corresponding to the I/O read transaction, and transmits those FCP_DATA frames back to the initiator through the FC. When all the data has been transmitted, and the target SCSI device has given up control of the SCSI bus, the target SCSI device then again arbitrates for control of the SCSI bus to initiate the status phase of the I/O transaction 714. In this phase, the SCSI bus transitions from the BUS FREE state through the ARBITRATION, RESELECTION, MESSAGE IN, STATUS, MESSAGE IN and BUS FREE states, as illustrated in FIG. 3C, in order to send a SCSI status byte from the target SCSI device to the target SCSI-bus adapter. Upon receiving the status byte, the target SCSI-bus adapter packages the status byte into an FCP_RSP single-frame sequence 716 and transmits the FCP_RSP single-frame sequence back to the initiator through the FC. This completes the read I/O transaction.

In many computer systems, there may be additional internal computer buses, such as a PCI bus, between the target FC host adapter and the target SCSI-bus adapter. In other words, the FC host adapter and SCSI adapter may not be packaged together in a single target component. In the interest of simplicity, that additional interconnection is not shown in FIGS. 7A–B.

FIG. 7B shows, in similar fashion to FIG. 7A, a mapping between FCP sequences and SCSI bus phases and states during a write I/O transaction indicated by a FCP_CMND frame 718. FIG. 7B differs from FIG. 7A only in the fact that, during a write transaction, the FCP_DATA frames 722–725 are transmitted from the initiator to the target over the FC and the FCP_XFER_RDY single-frame sequence 720 sent from the target to the initiator 720 is not optional, as in the case of the read I/O transaction, but is instead mandatory. As in FIG. 7A, the write I/O transaction includes when the target returns an FCP_RSP single-frame sequence 726 to the initiator.

The TachLite FC Mass Storage Interface Controller and TachLite Interface

The TachLite FC Mass Storage Interface Controller ("TL") is a high-performance, low-cost, loop-based interface controller for use in the FC ports that interconnect peripheral devices and computers to an FC arbitrated loop. In this subsection, an overview of the functionality of, and interface to, the TL will be presented. A more detailed description of the TL is included in U.S. patent application Ser. No. 09/183,164, entitled "Fibre Channel Controller," assigned to the Hewlett Packard Company, and filed on Oct. 30, 1998, now pending, that is hereby incorporated by reference in its entirety.

Figure 8:
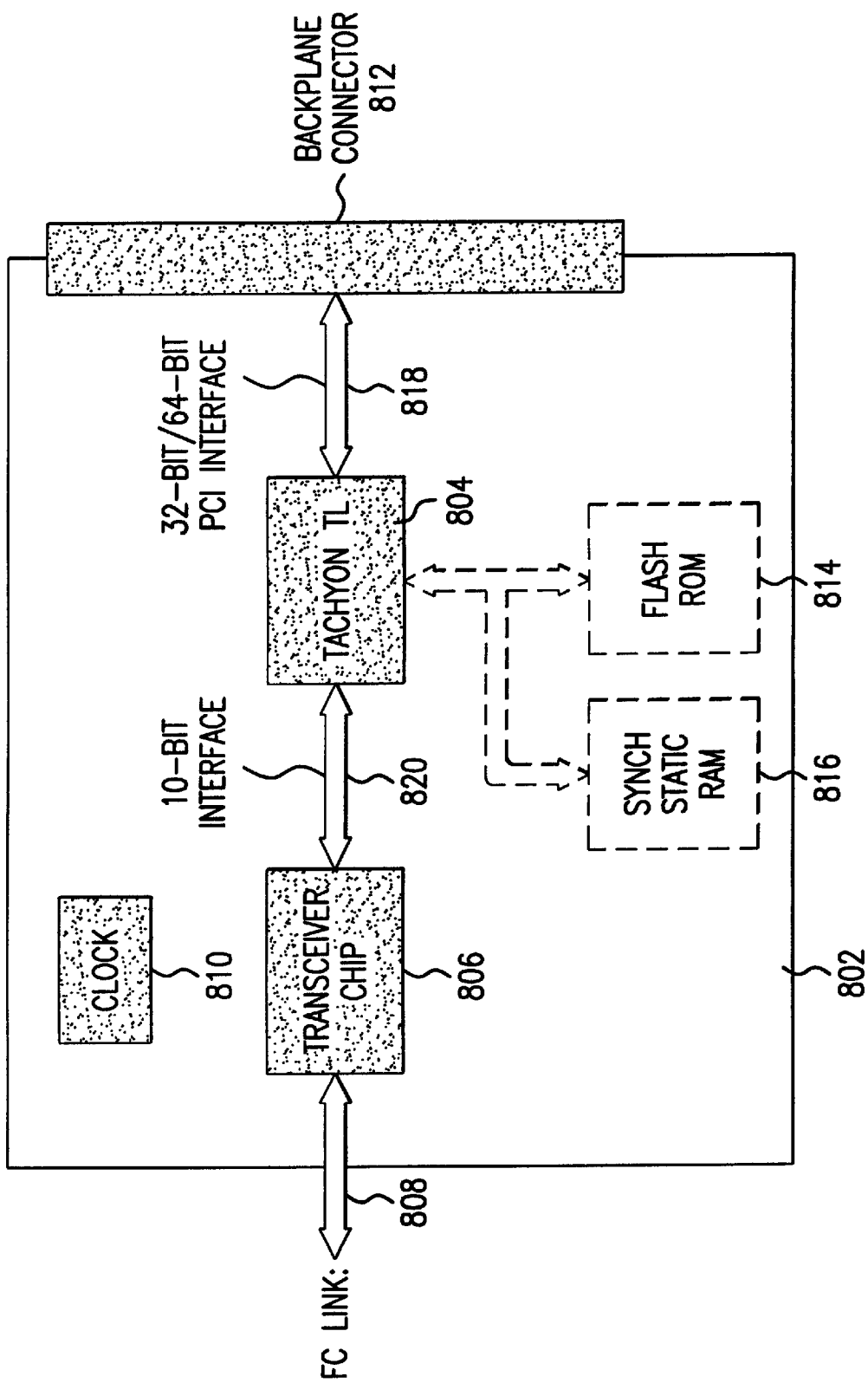
FIG. 8 shows a Tachyon TL FC Mass Storage Interface Controller incorporated into a typical FC/PCI host adapter.

FIG. 8 shows a TL incorporated into a typical FC/PCI host adapter. The FC/PCI host adapter 802 comprises a TL 804, a transceiver chip 806, an FC link 808, a clock 810, a backplane connector 812, and, optionally, a boot flash ROM 814, or a local synchronous static random access memory ("RAM") 816. The FC host adapter 802 communicates with the processor or processors of an FC node via the backplane connector 812 and a PCI bus within the FC node to which the processor or processors are coupled. The TL 804 is coupled to the backplane connector 812 via a PCI interface 818. The TL sends and receives FC frames to and from an FC arbitrated loop via a 10-bit interface 820 that couples the TL to the transceiver chip 806, which is, in turn, coupled to the FC arbitrated loop via the FC link 808. The clock 810 interfaces to the FC link. The FC host adapter 802 may serve, in terms of the previous discussion, as an NL_Port, and the FC host adapter 802, together with the computer system to which it is coupled via the backplane connector 812, compose an FC node that may be connected via the FC link 808 to an FC arbitrated loop topology.

Figure 9A:
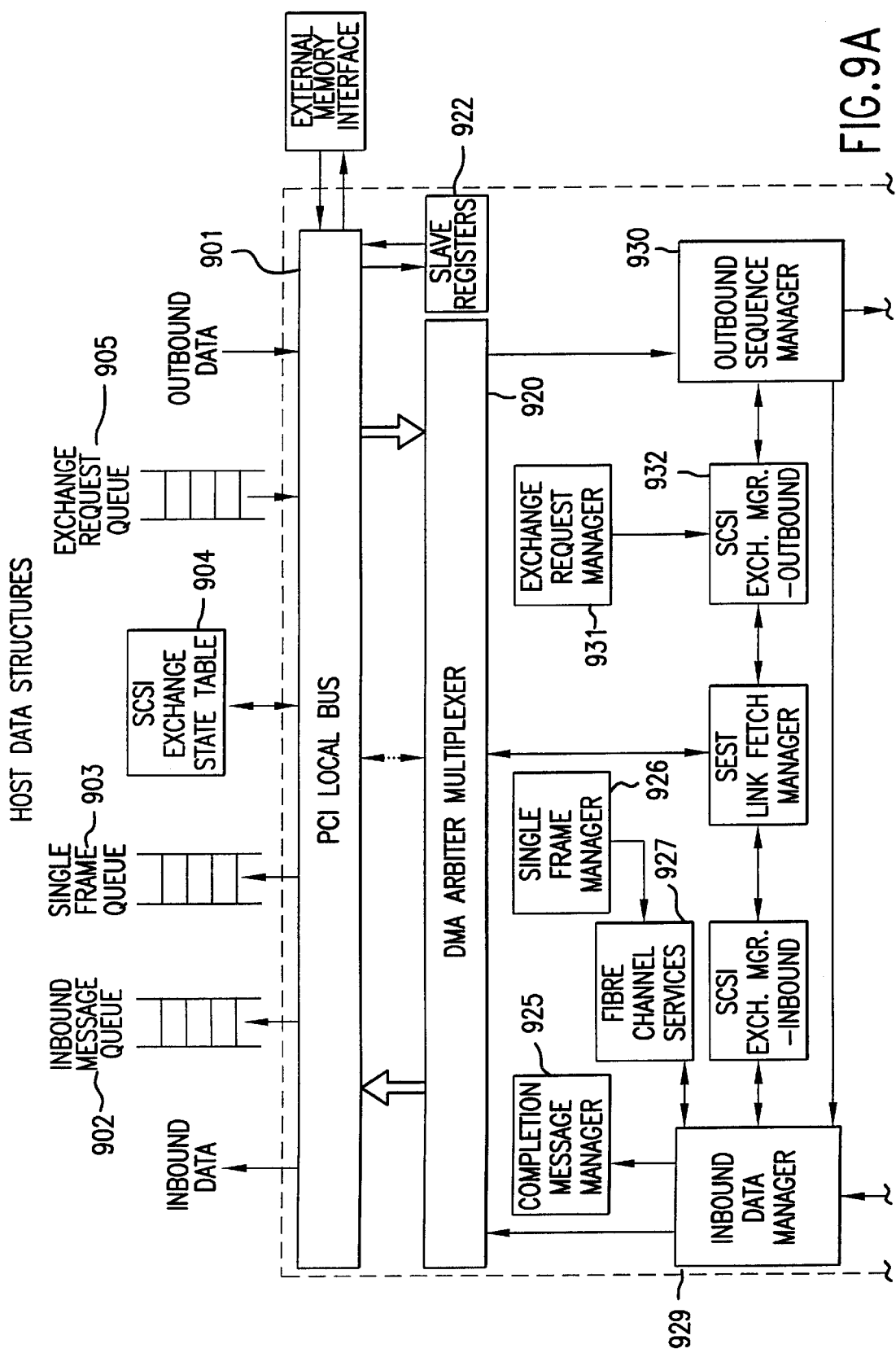
FIG. 9 shows a block diagram description of the TachLite FC Mass Storage Interface Controller and the memory-based data structure interface between the TachLite FC Mass Storage Interface Controller and the host.
Figure 9B:
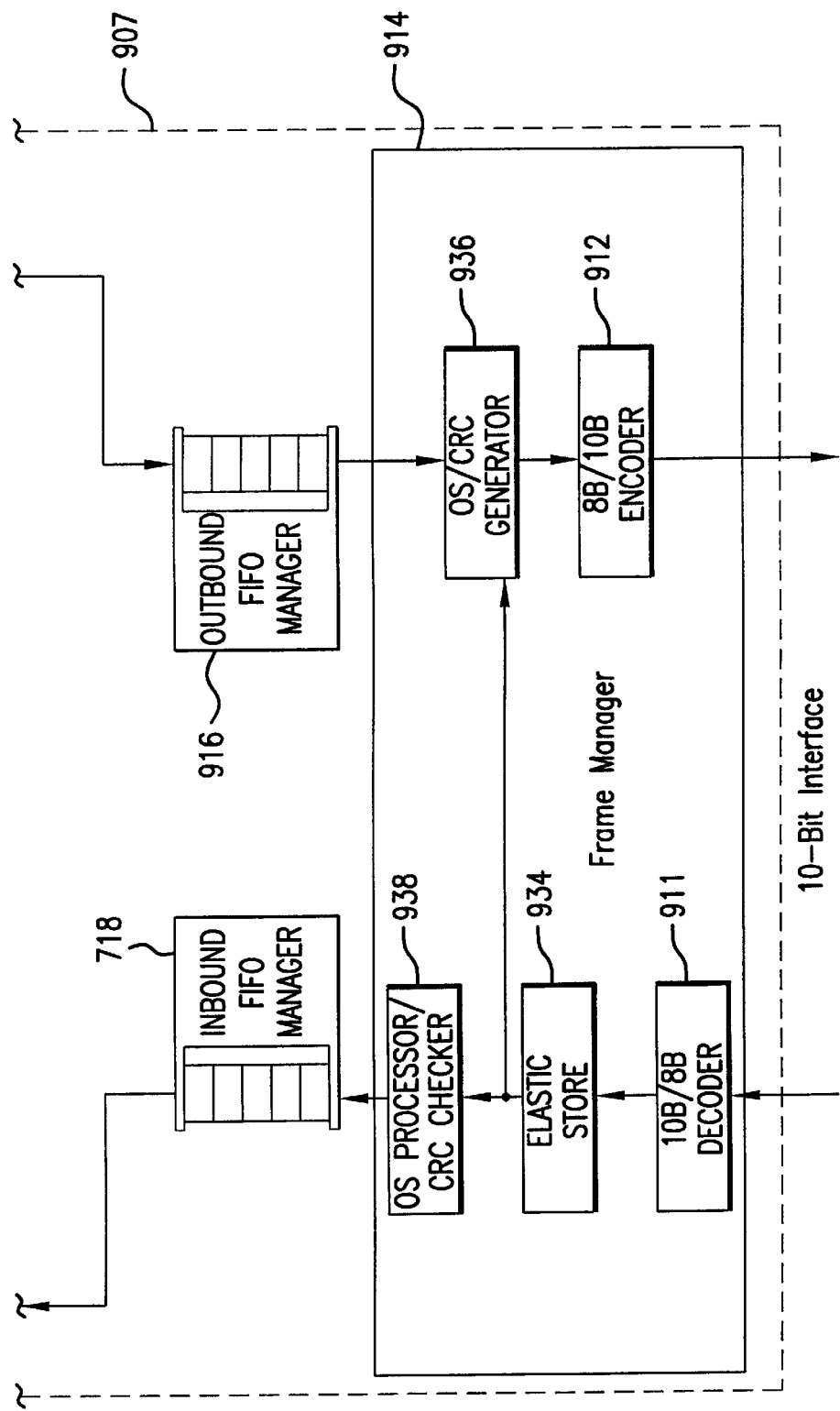

FIG. 9 shows a block diagram description of the TL and the memory-based data structure interface between the TL and the host to which the TL is interconnected by a PCI bus. The memory-based data structures 902–905 are maintained in a memory component of the FC node that is accessible to the TL 907 via the PCI bus 909. In FIG. 9, the TL 907 is represented as being combined with the backplane connector (812 in FIG. 8) and PCI bus 909. The TL interfaces with a transceiver chip (806 in FIG. 8) via a 10 bit/8 bit decoder 911, for receiving inbound frames from the transceiver chip (806 in FIG. 8) and via an 8 bit/10 bit encoder 912 for outbound frames transmitted by the TL to the transceiver chip. The 10 bit/8 bit decoder 911 and 8 bit/10 bit encoder 912 are both subcomponents of the frame manager 914 that receives FC frames for transmission to the transceiver chip (806 in FIG. 8) from the TL via the outbound FIFO manager 916 and that receives a stream of data bits from the transceiver chip (806 in FIG. 8) via the 10 bit/8 bit decoder 911, processes the received data bits into FC frames, and stores the FC frames into the inbound FIFO manager 918. The other frame manager components 934, 936, and 938 buffer received data when the lack of clock synchronization between the transmitter and receiver components of the transceiver chip prevent immediate processing of the received data, generate FCP CRCs, and check FCP CRCS, respectively, The DMA arbiter multiplexer 920 manages multiple internal DMA requests to the PCI local bus and the external memory interface. Internal block arbitration, as well as data path multiplexing, occurs in this block.

The processor or processors of the FC node control and exchange information with the TL by writing and reading various control registers 922 and by placing data into, and removing data from, the memory-based data structures 902–905. Internal components of the TL 924–932 read and write the control registers 922, receive data from, and place into, the memory based data structures 902–905, and exchange FC frames with the frame manager 914 via the inbound FIFO manager 918 and the outbound FIFO manager 916.

The inbound message queue ("IMQ") 902 contains completion messages that notify the host processor or processors of inbound and outbound transaction information and status information. The single frame queue ("SFQ") contains inbound unknown or unassisted FC frames that the TL 907 receives from the frame manager 914 and places into the SFQ. The SCSI exchange state table ("SEST") 904 is shared between the TL and the host and contains SEST entries that each corresponds to a current SCSI exchange (I/O operation). The exchange request queue ("ERQ") 905 contains I/O request blocks ("IRBs") that represent I/O requests sent by the host to the TL.

The completion message manager 925 manages the IMQ and provides queue entries to the inbound data manager 924 into which the inbound data manager places completion messages. The single frame manager 926 manages the SFQ in host memory and provides entries to the fibre channel services component 927 into which the fibre channel component services place inbound frames. The exchange request manager 931 fetches new entries from the ERQ and sends them to the SCSI exchange manger-outbound ("SEM-OUT") for processing. The inbound data manager 924 informs the inbound frame processors, i.e. the SCSI exchange manager-inbound ("SEM-IN") 928 and fibre channel services component 927, of new frames and routes the frames to their proper destination in the host. Also, the inbound data manager sends completion messages to the host via the IMQ. The fibre channel services component 927 manages the fibre channel frames that the SEM-IN 928 does not manage. The fibre channel services component places the frames in the SFQ. The SEM-IN 928 manages the phases of a SCSI exchange that receive a fibre channel sequence. The SEM-IN reads the SEST entries via the SEST link fetch manager 929 and either sends the inbound data to the proper host buffers or sends the request to the SEM-OUT 932 to send the next phases of fibre channel sequence. The SEST link fetch manager 929 is responsible for reading and writing SEST entries, depending upon requests from the SEM-IN 928 and SEM-OUT 932 components. The SEM-OUT 932 manages the phases of a SCSI exchange that require a fibre channel sequence to be sent. The SEM-OUT 932 reads the SEST entries via the SEST link fetch manager 929, builds the request to send those sequences, and sends the requests to the outbound sequence manager 930. The outbound sequence manager ("OSM") 930 processes requests from the SEM-OUT 932 to send fibre channel sequences from the host and retrieves fibre channel frame headers and payloads from the host to send to the remote node. The OSM segments the sequence into fibre channel frames of up to 1 KByte in size and queues them into the outbound FIFO manager 916.

Figure 10:
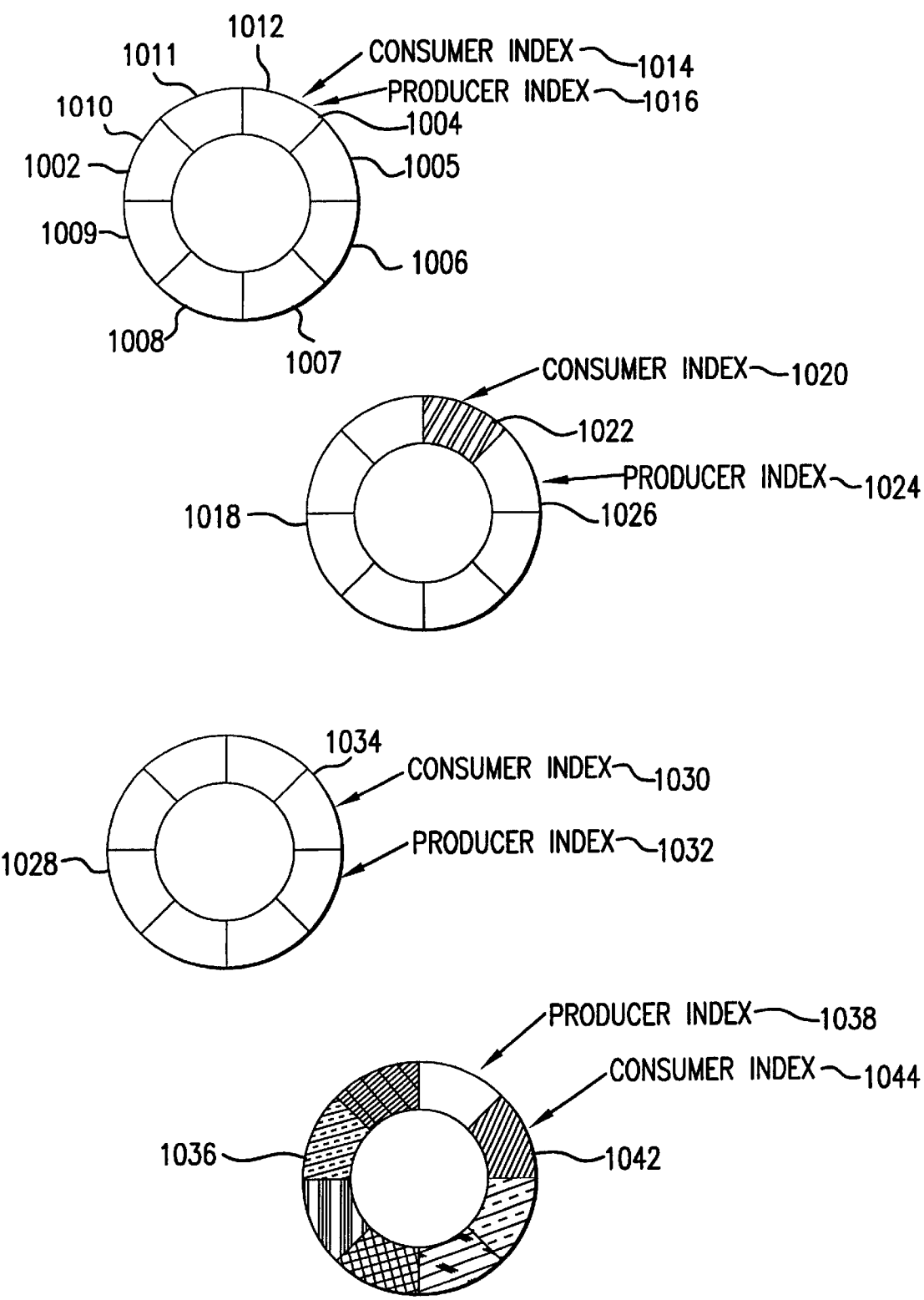
FIG. 10 shows the basic underlying circular queue data structure used in the TachLite Fibre Channel Mass Storage Interface Controller interface.

The IMQ 902, SFQ 903, and ERQ 905 are implemented as circular queues. FIG. 10 shows the basic underlying circular queue data structure used in the TL controller interface. A circular queue is a first-in-first-out ("FIFO") queue that is logically represented in a circular fashion, such as the depiction of the circular queue 1002 at the top of FIG. 10. Each radial section 1004–1012, or slot, of a circular queue contains space for a queue entry, essentially a record-like data structure containing one or more data fields. The circular queue 1002 in FIG. 10 is shown with 8 queue entry slots 1004–1012 although, in practice, a circular queue may have many tens or hundreds of queue entries. In addition to the queue entry slots, a circular queue is associated with two pointers: (1) a consumer index that points to the next queue entry that can be removed from the circular queue by a consumer of queue entries; and (2) a producer index that points to the next open slot within the circular queue in which a producer can place a queue entry to be added to the queue. In an empty circular queue 1402, in which all the queue entry slots are available for placement of data by a producer and in which none of the queue entry slots contain valid queue entries to be consumed by a consumer, both the consumer index 1014 and the producer index 1016 point to the same empty queue entry slot 1012.

When a producer adds a queue entry to an empty circular queue 1002, a circular queue with one valid queue entry 1018 is produced. The consumer index 1020 is not changed, as a result of which the consumer index points to the single valid queue entry 1022 in the circular queue 1018. After the producer inserts the queue entry 1022, the producer increments the producer index 1024 to point to the next available slot 1026 within the circular queue 1018 into which the producer can add a second queue entry. If the consumer now removes the single queue entry 1022, an empty circular queue 1028 is produced. When the consumer has removed the available queue entry 1022, the consumer increments the consumer index 1030. As in the previous depiction of an empty circular queue 1002, the empty circular queue 1028 produced by removing the single queue entry 1022 has both the consumer index 1030 and the producer index 1032 pointing to the same empty, available queue entry slot 1034. If a producer successively adds queue entries at a faster rate than a consumer can consume them, a full circular queue 1036 will eventually be produced. In a full circular queue 1036, the producer index 1038 points to a single empty queue entry slot within the circular queue that immediately precedes the first available valid queue entry 1042 pointed to by the consumer index 1044.

Figure 11A:
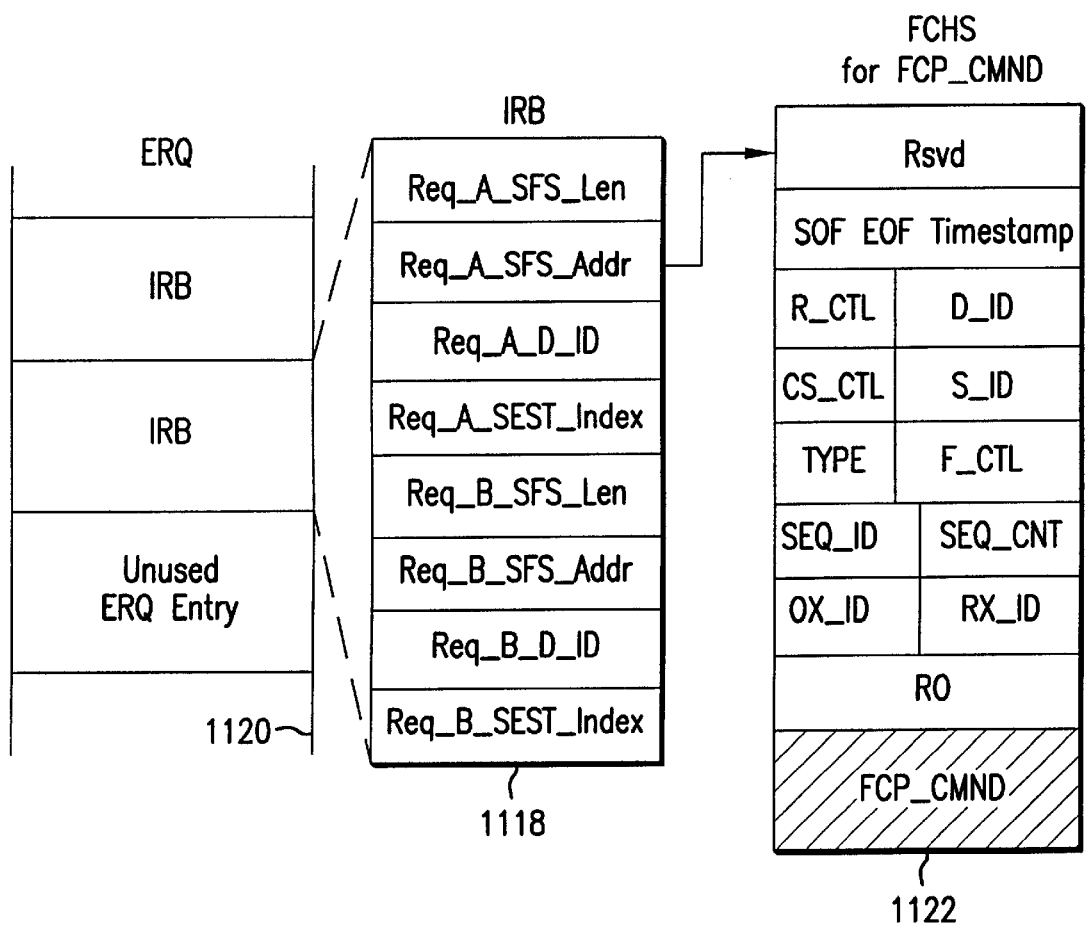
FIG. 11 shows a detailed view of the host memory data structures required to perform an initiated FC Protocol for SCSI write operation from four or more data buffers.
Figure 11B:
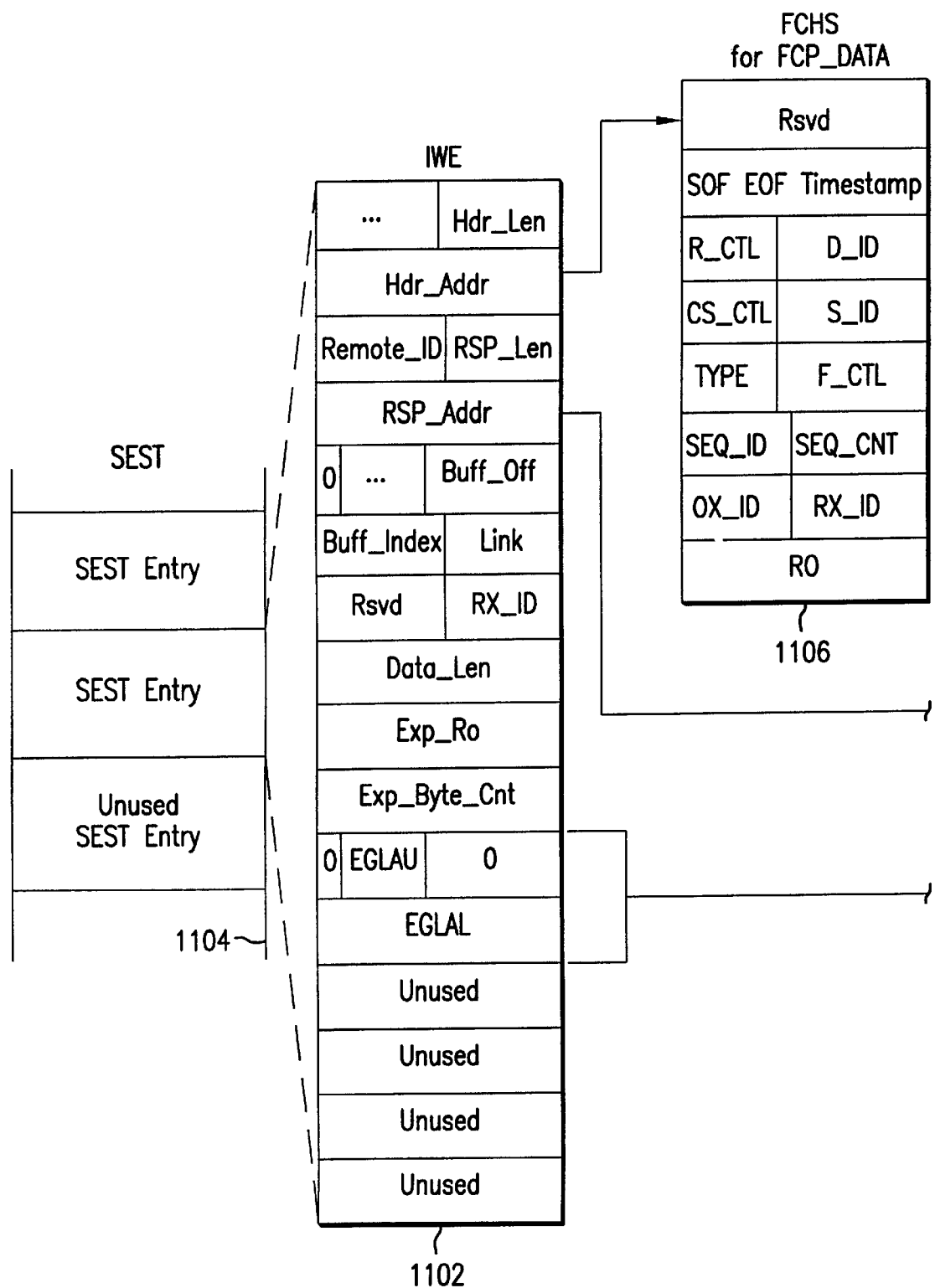
Figure 11C:
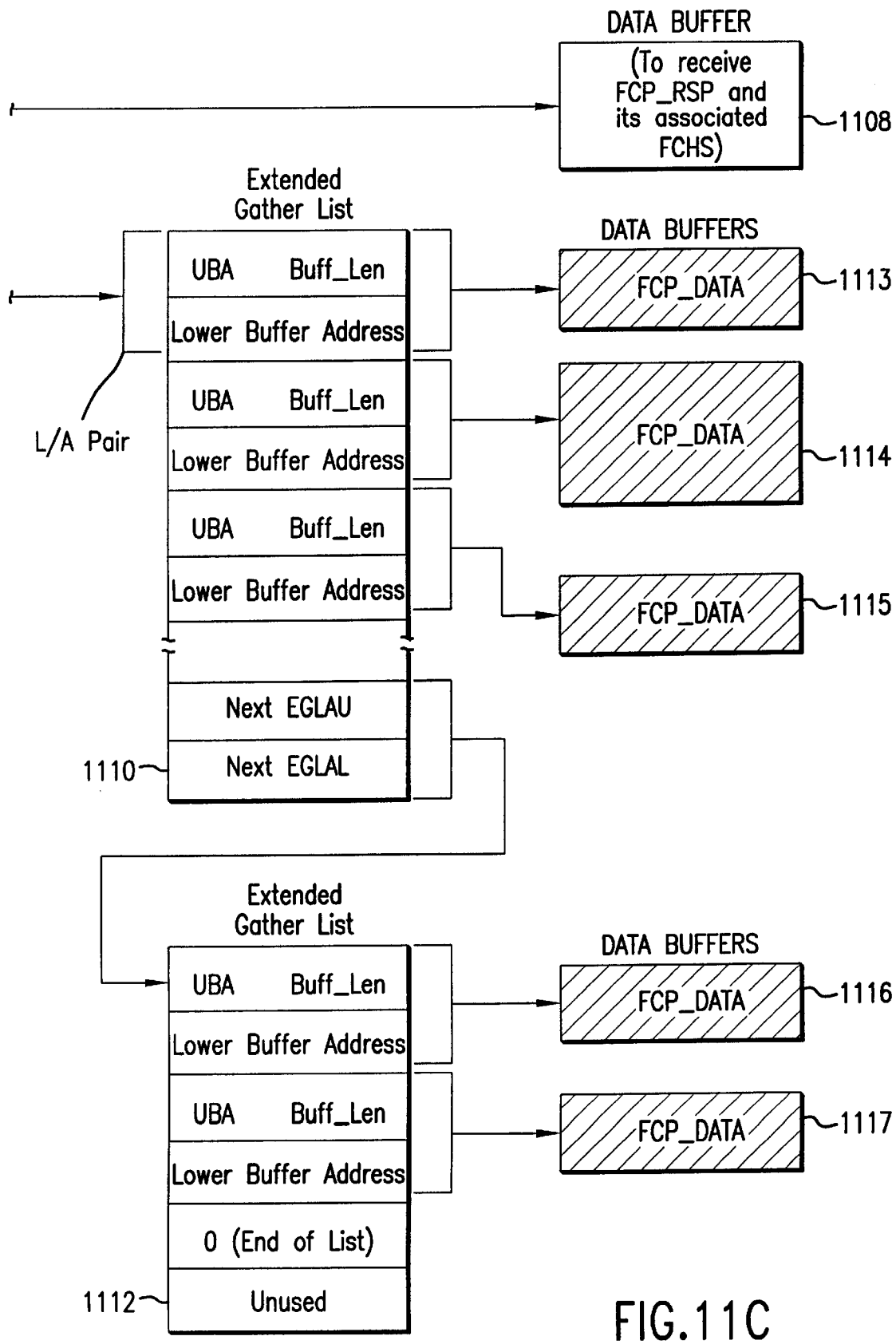

FIG. 11 shows a more detailed view of the host memory data structures required to perform an FCP write operation where the FC node in which a TL resides is the initiator of the FCP write operation and where the data payload that will include the data to be written requires 4 or more data buffers. The host prepares an initiator write entry ("IWE") 1102 within a SEST entry 1104 in the SEST (904 in FIG. 9). Associated with the IWE are: (1) a fibre channel header structure ("FCHS") 1106 that is used to send the FCP DATA sequence; (2) a data buffer 1108 that is used to receive the FCP_RSP frame from the SCSI target; and (3) one or more extended scatter gather list ("SGL") pages 1110 and 1112 that contain pointers to data buffers 1113–1117 in which the host places the data to be written to the SCSI target via the FCP_DATA sequence. The host then creates an I/O request block ("IRB") 1118 in an unused ERQ entry 1120 and associates the IRB with an FCHS 1122 that is used for the FCP_CMND sequence. The host then increments the ERQ producer index. The producer index increment is detected by the TL, and the TL then launches the FCP write operation. The TL uses the information and data stored within the IRB 1118 and RWE 1102, and the data structures associated with the IRB and RWE, to conduct the entire FCP write operation, including the FCP_CMND sequence, the FCP_XFER_RDY sequence, and the FCP_DATA sequence. The TL receives from the target a FCP_RSP sequence at the completion of the FCP write operation.

Figure 12A:
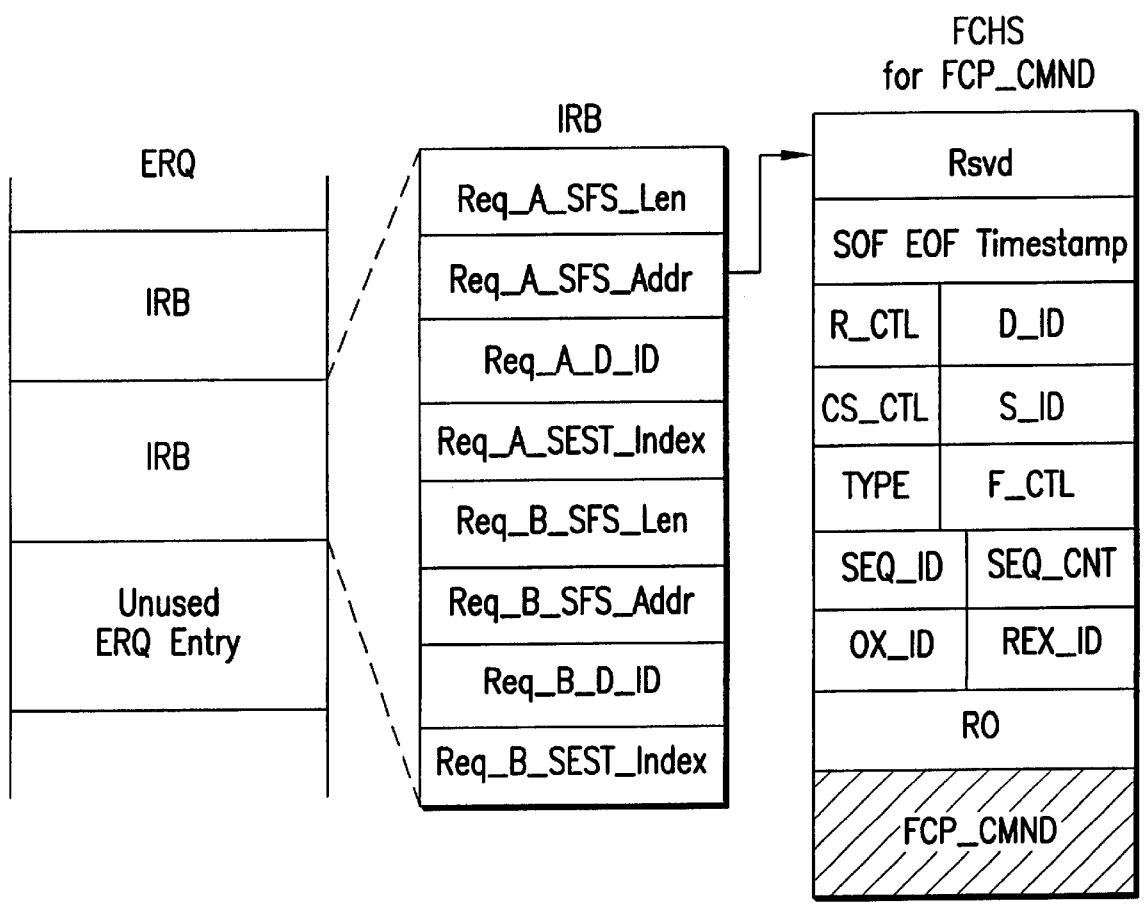
FIG. 12 shows the host memory data structures required to perform an initiated FC Protocol for SCSI write operation from three or less data buffers.
Figure 12B:
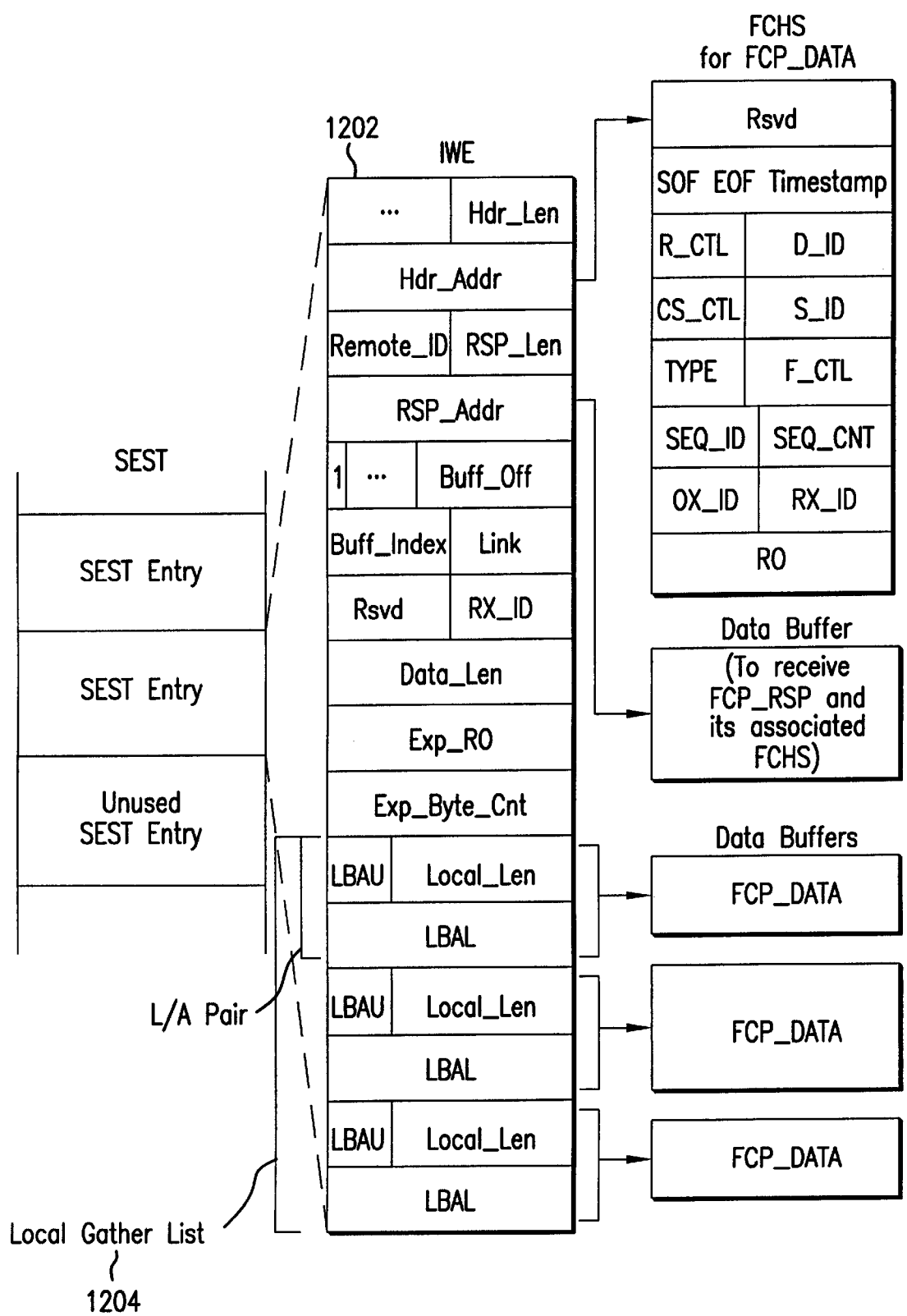

FIG. 12 shows the host memory data structures required to perform an FCP write operation where the FC node within which the TL resides is the initiator of the FCP write operation and the data payload of the FCP_DATA sequence can fit into three or fewer data buffers. The data structure shown in FIG. 12 are similar to those shown in FIG. 11 with the exception that, rather than having extended SGL pages (1110 and 1112 in FIG. 11) external from the IWE (1102 in FIG. 11), the IWE 1202 in FIG. 12 includes a local SGL 1204 that is included within the IWE 1202. Otherwise, the operations carried out by the TL in response to the incrementing of the ERQ producer index by the host are analogous to those carried out for the FCP write operation described above with reference to FIG. 11.

Figure 13A:
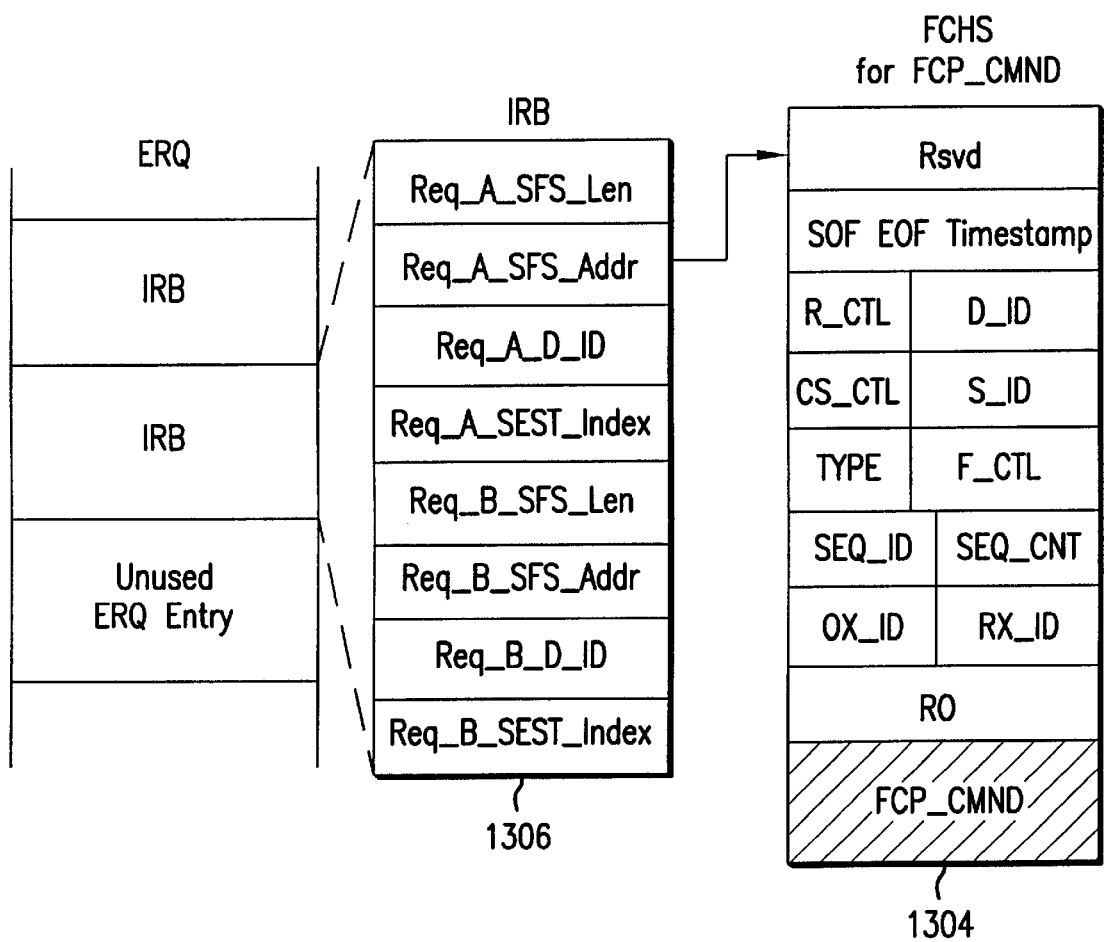
FIG. 13 shows the host memory data structures used to perform an initiated FC Protocol for SCSI read operation to more than three data buffers.
Figure 13B:
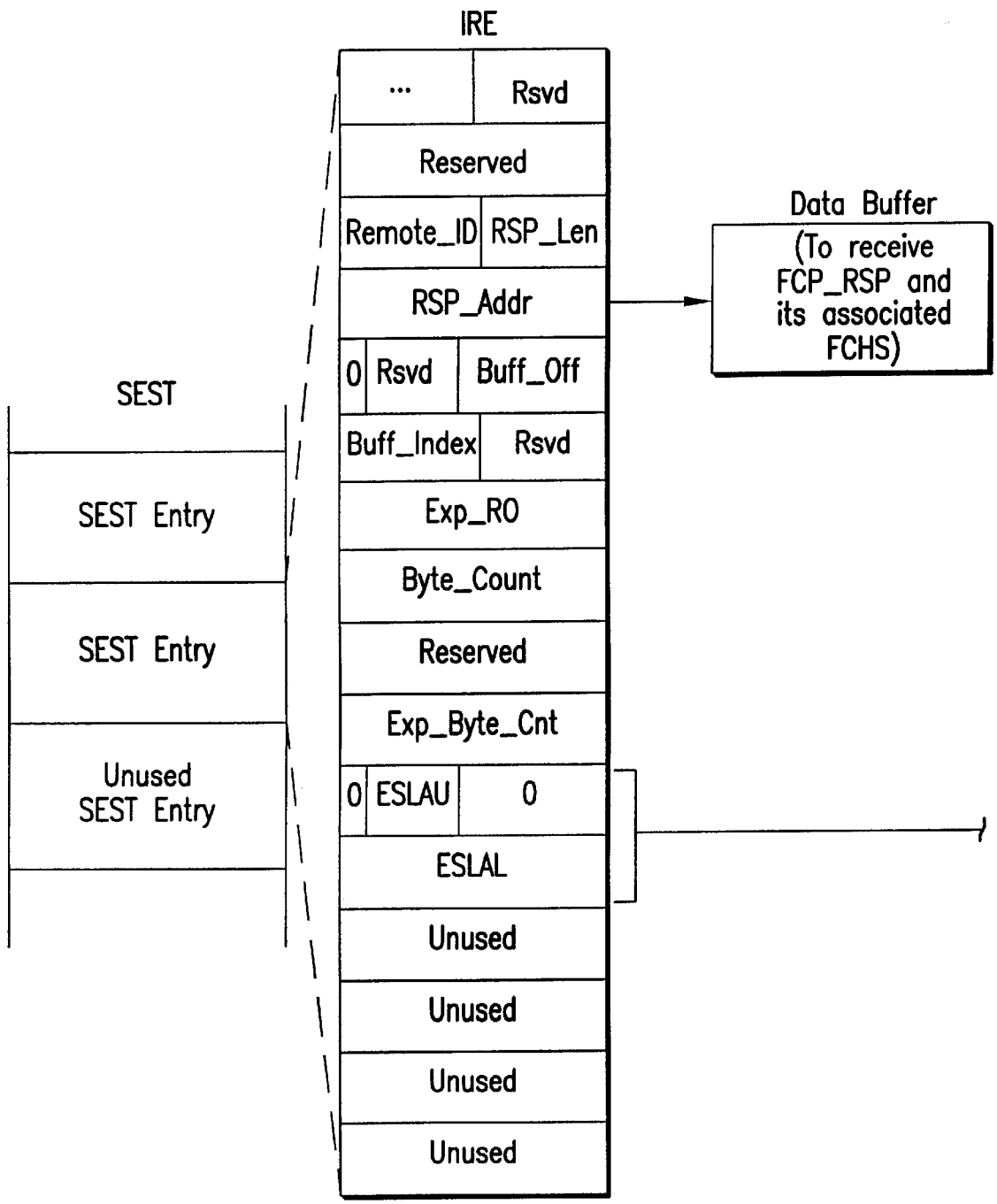
Figure 13C:
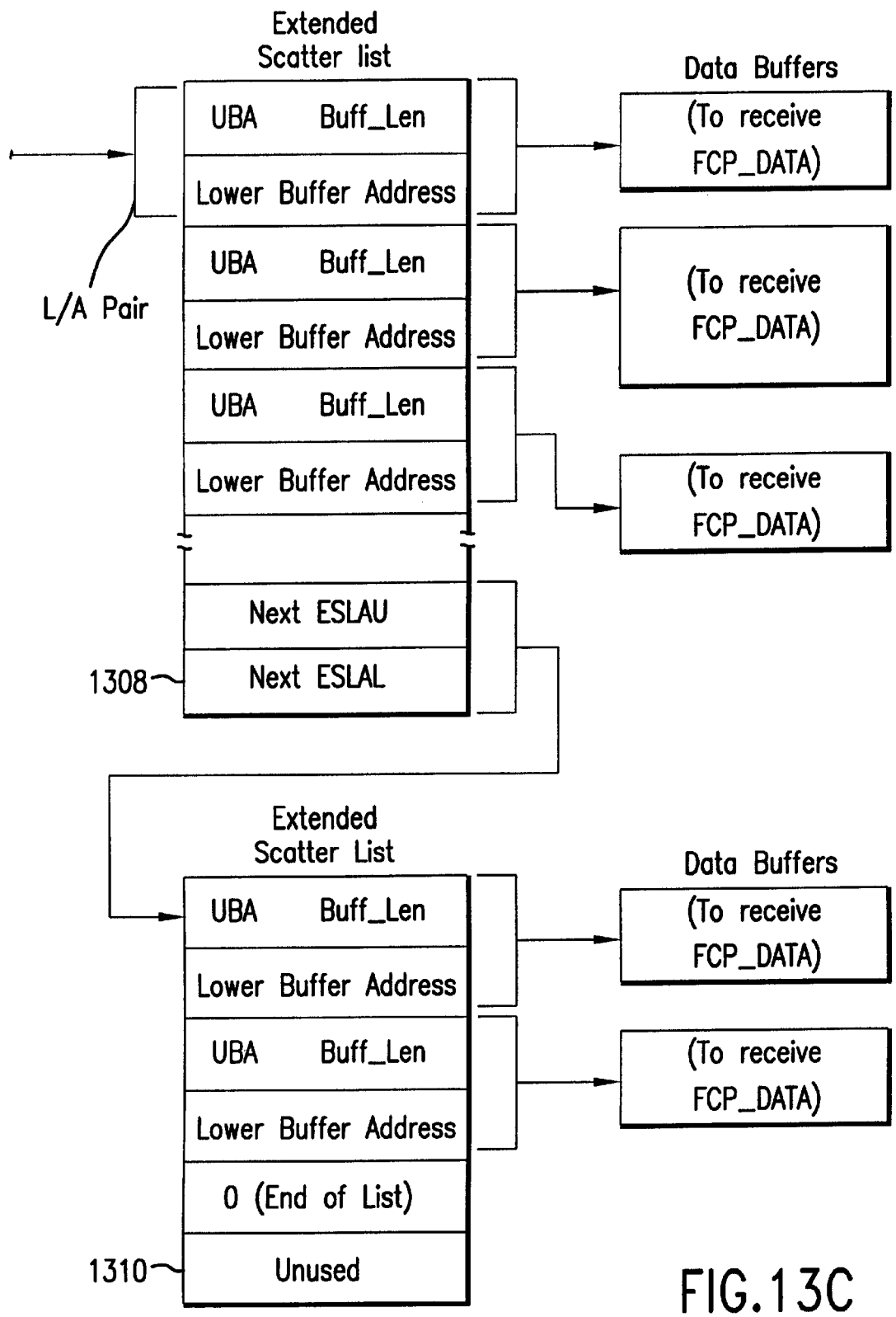

FIG. 13 shows the host memory data structures used to perform an FCP read operation where the FC node in which the TL resides is the initiator of the read operation and the data to be read will fill more than three data buffers. These data structures are similar to those shown in FIG. 11, with the following exceptions: (1) rather than an IWE (1102 in FIG. 11), the SEST entry created by the host contains an initiator read entry ("IRE"); (2) there is no FCHS for the FCP_DATA sequence (1106 in FIG. 11); and (3) the FCHS for the FCP_CMND sequence 1304 associated with the IRB 1306 contains a read command, rather than a write command as in the case of the FCHS (1122 in FIG. 11) for the write operation. As with the write operation, the host updates the ERQ producer index in order to initiate the read operation, and the TL uses the information stored in the data structures in FIG. 13 to conduct the FCP_CMND sequence and the FCP_DATA sequences, and receives the FCP_RSP sequence from the target SCSI device at the conclusion of the read operation.

Figure 14A:
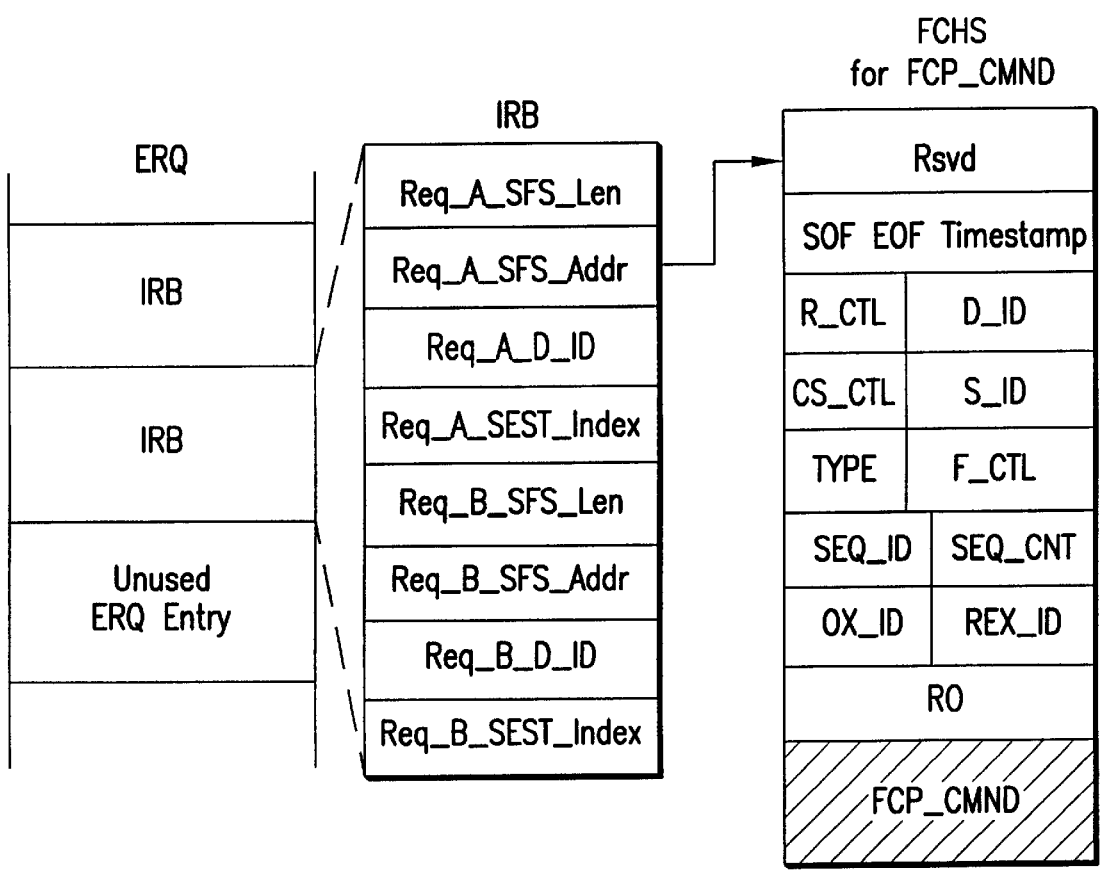
FIG. 14 shows the data structures required to perform an initiated FC Protocol for SCSI read operation to three or fewer data buffers.
Figure 14B:
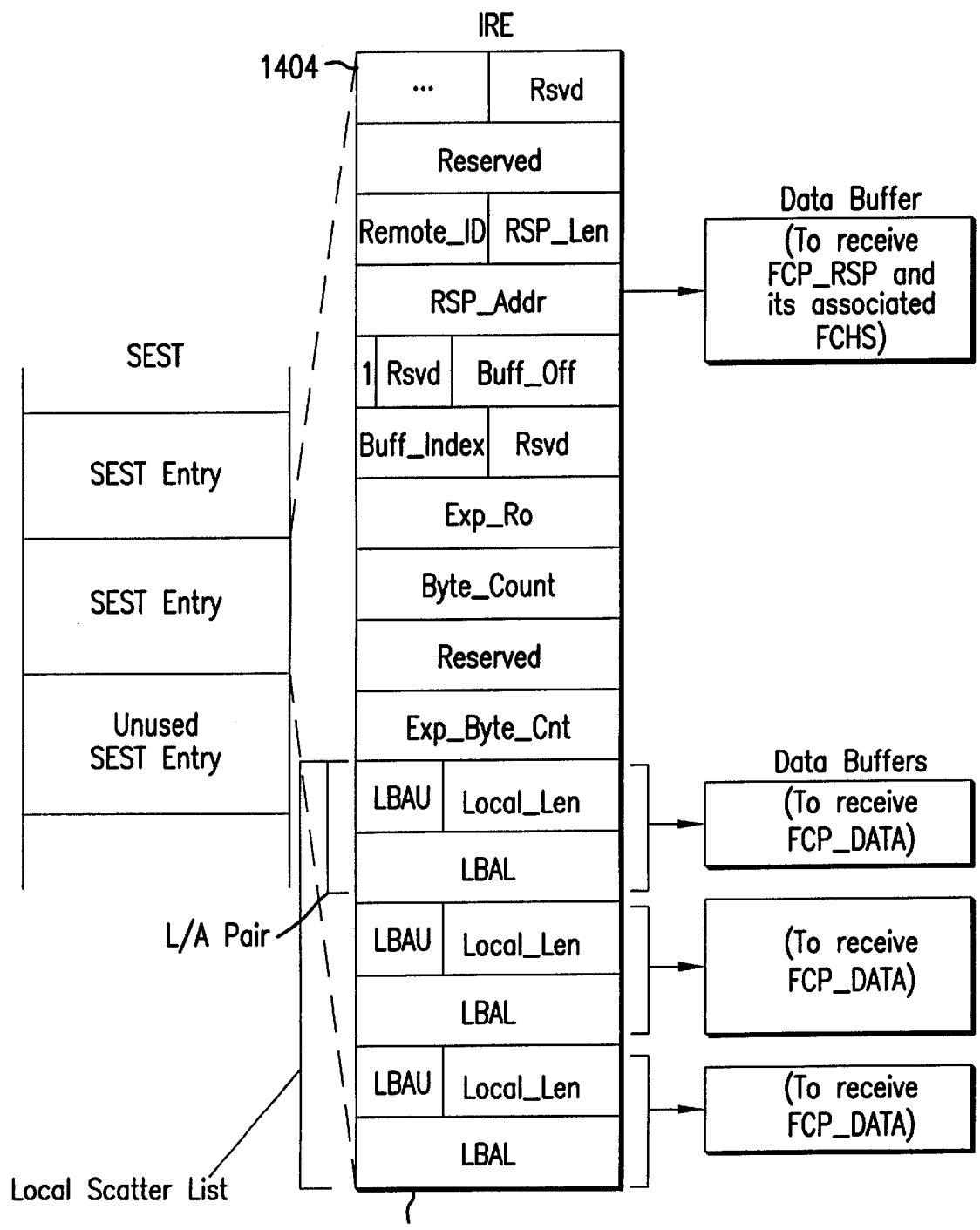

FIG. 14 shows the data structures required to perform the FCP read operation where the FC node in which the TL resides is the initiator of the operation and where the data to be received can fit into three or fewer data buffers. FIG. 14 bears the same relationship to FIG. 13 as FIG. 12 bears to FIG. 11. Instead of the external extended FCL pages (1308 and 1310 in FIG. 13), a local SGL 1402 is included within the IRE 1404. Otherwise, the operations conducted by the TL in order to complete the FCP read operation are identical with those discussed with reference to FIG. 13.

Figure 15A:
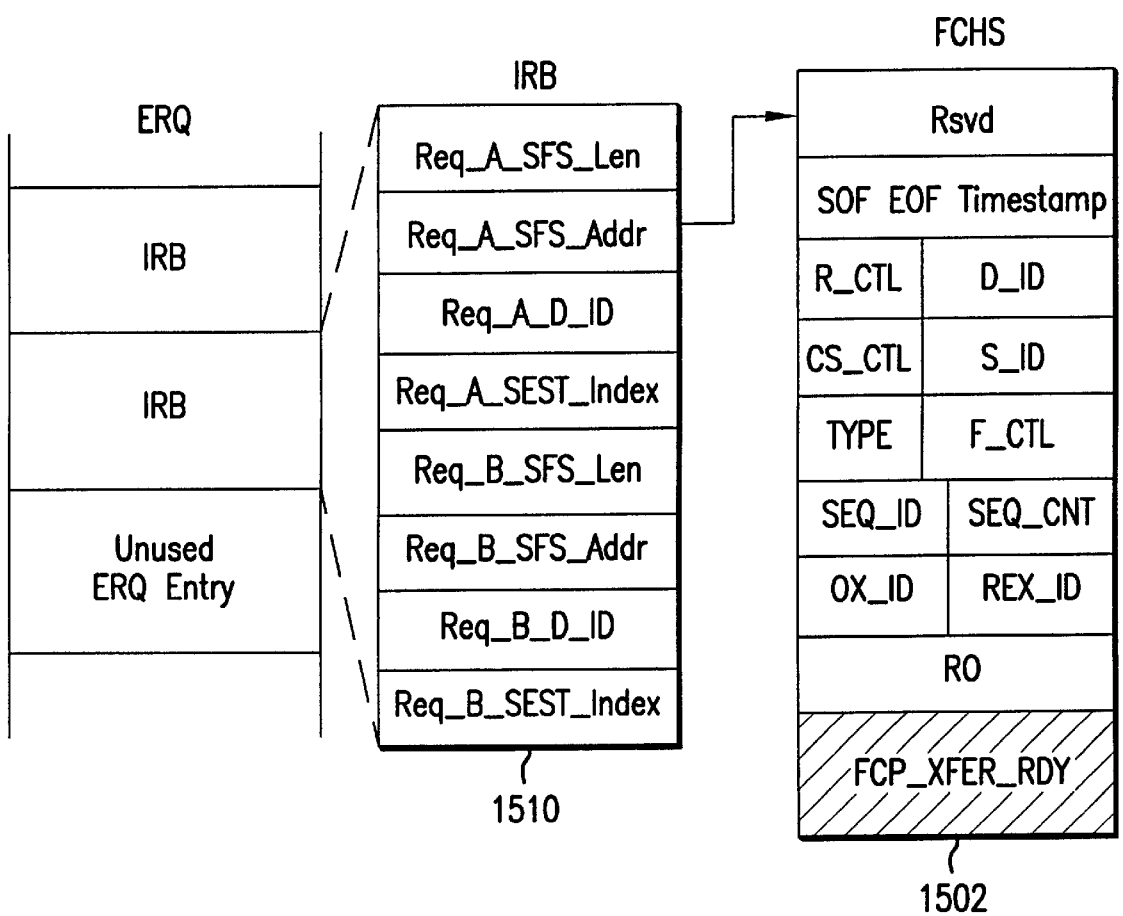
FIG. 15 shows the host memory data structures required for an FC node that is the target of an FC Protocol for a SCSI write operation initiated by another FC node to more than three data buffers.
Figure 15B:
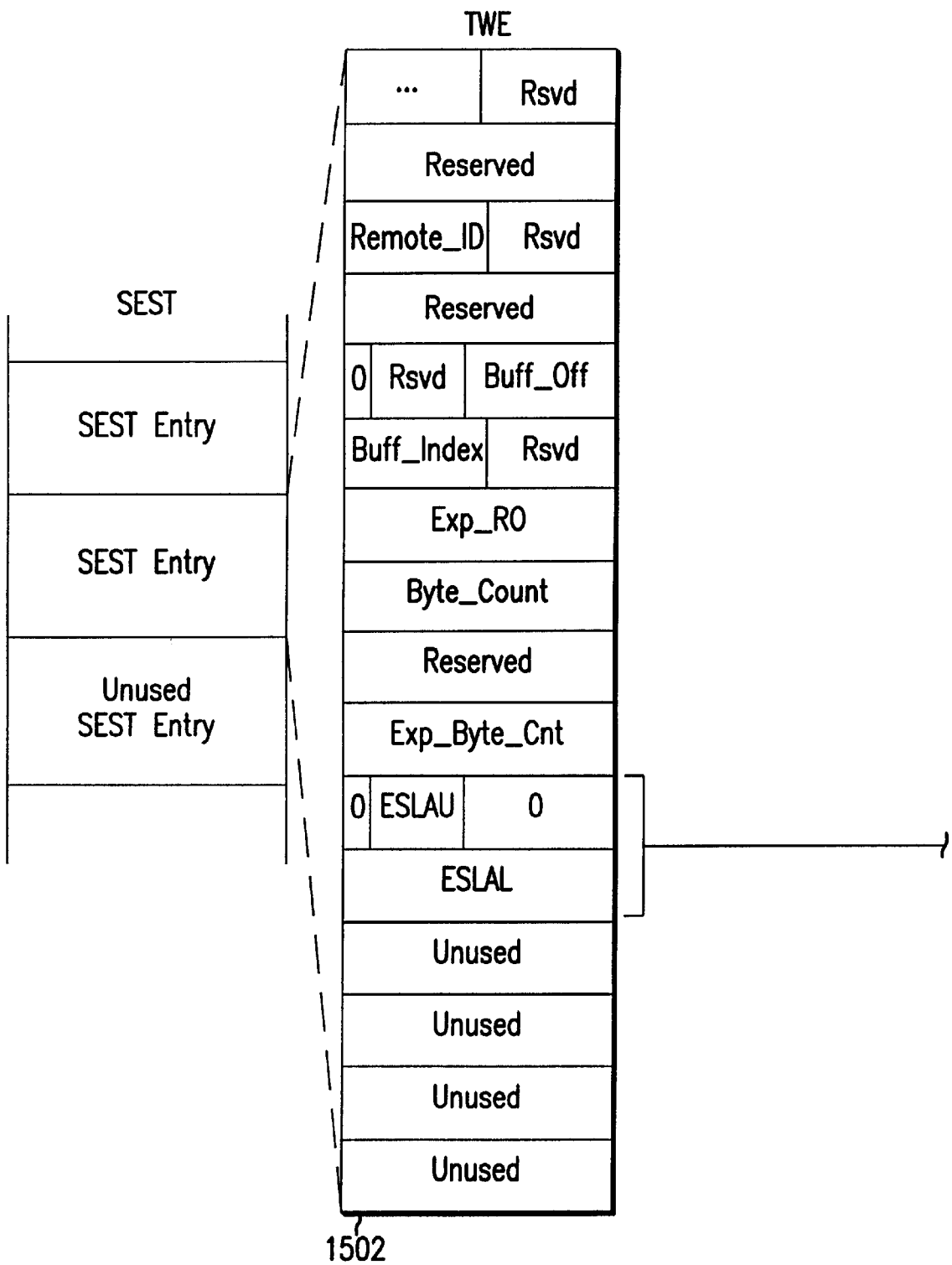
Figure 15C:
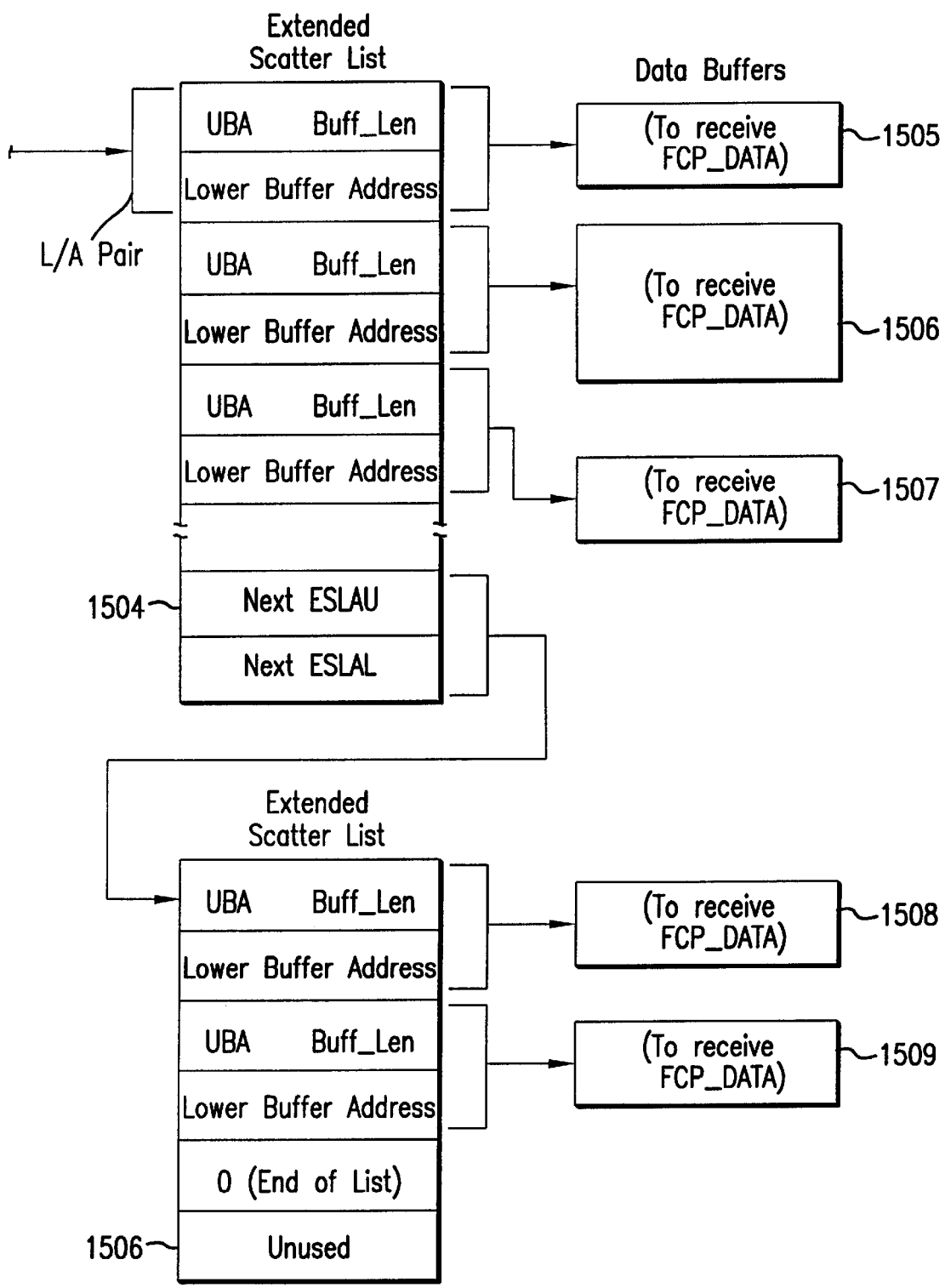

FIG. 15 shows the host memory data structures required for an FC node that is the target of a FCP write operation initiated by another FC node to carry out the indicated FCP write operation at the FC target node. When the TL in the FCP target node receives a FCP_CMND frame from the FC initiator node, the TL places it into the SFQ (903 in FIG. 9) and notifies the host via an inbound completion message. Upon receiving the inbound completion message, the host allocates and fills in the data structures shown in FIG. 13. These include the target write entry ("TWE") 1502 which is associated with one or more external extended SGL pages 1506 and 1506. These external extended SGL pages are, in turn, associated with data buffers 1505–1509 in which the data transferred from the FC initiator node will be placed after being extracted from the FCP_DATA sequence. The host also creates an IRB 1510 associated with an FCHS 1512 for the FCP_XFER_RDY sequence that will be transmitted back to the FC initiator node in order to elicit the FCP_DATA sequence. The host initiates sending of the FCP_XFER_RDY sequence and subsequent reception of the write data by updating the ERQ producer index register.

Figure 16A:
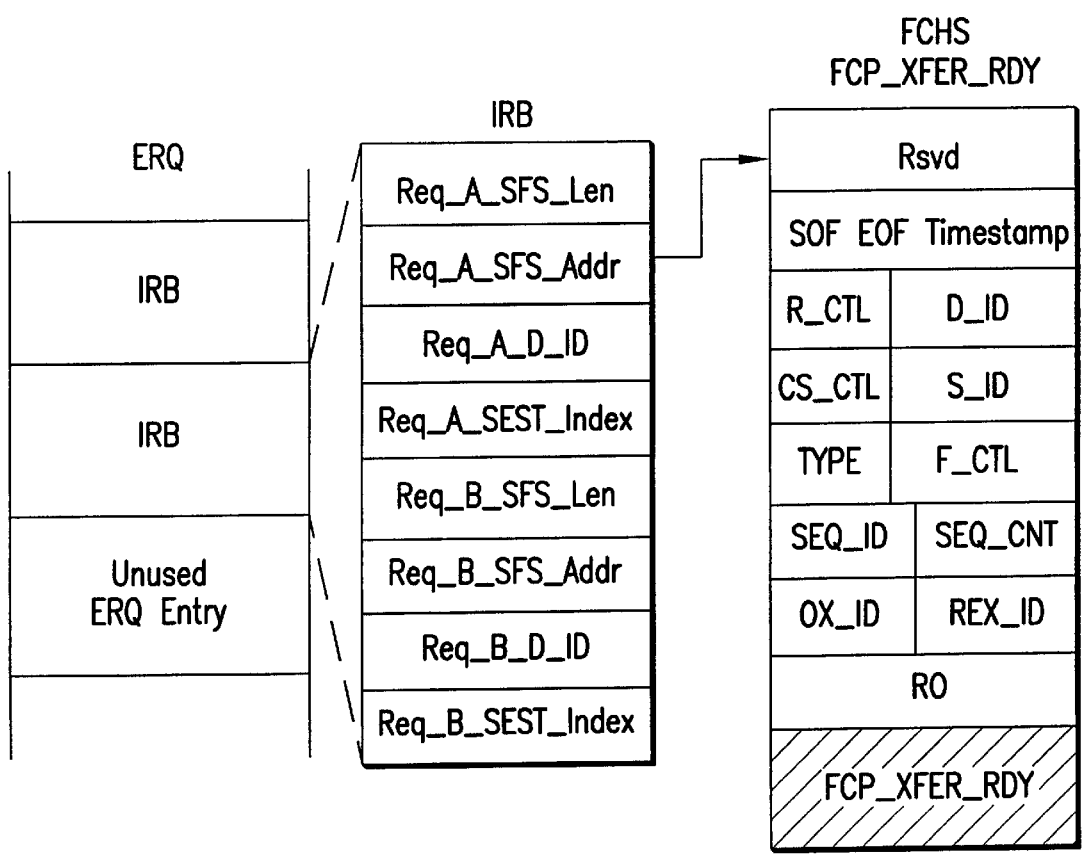
FIG. 16. shows the host memory data structures required for an FC node that is the target of an FC Protocol for a SCSI write operation initiated by another FC node to three or fewer data buffers.
Figure 16B:
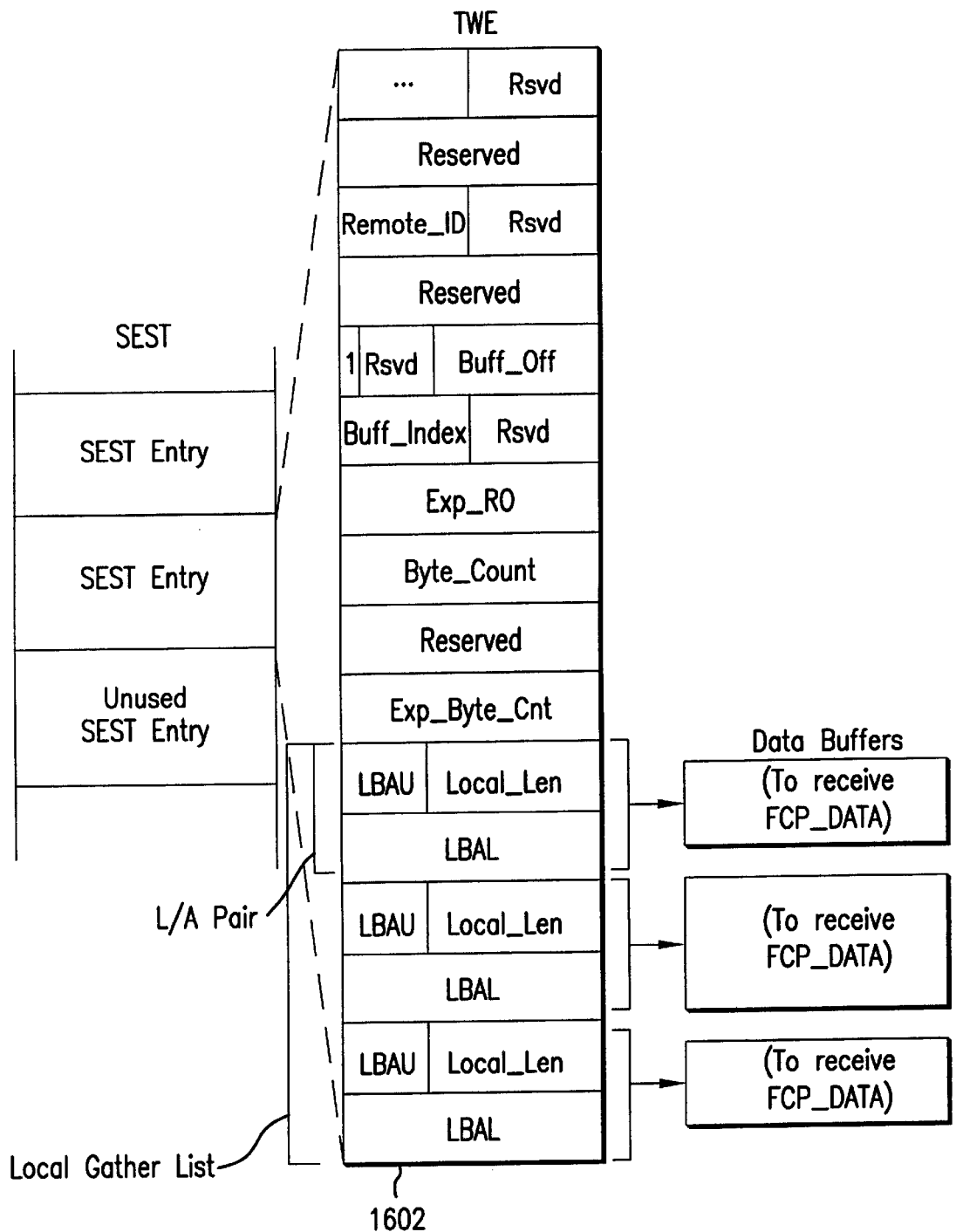

FIG. 16 bears the same relationship to FIG. 15 as FIG. 12 bears to FIG. 11 and FIG. 14 bears to FIG. 13 showing the host memory structures for a targeted FCP write operation employing a SGL. The only essential difference between FIGS. 15 and 16 are that the external extended SGL pages (1504 and 1506 in FIG. 15) are replaced by a local SGL 1602.

Figure 17A:
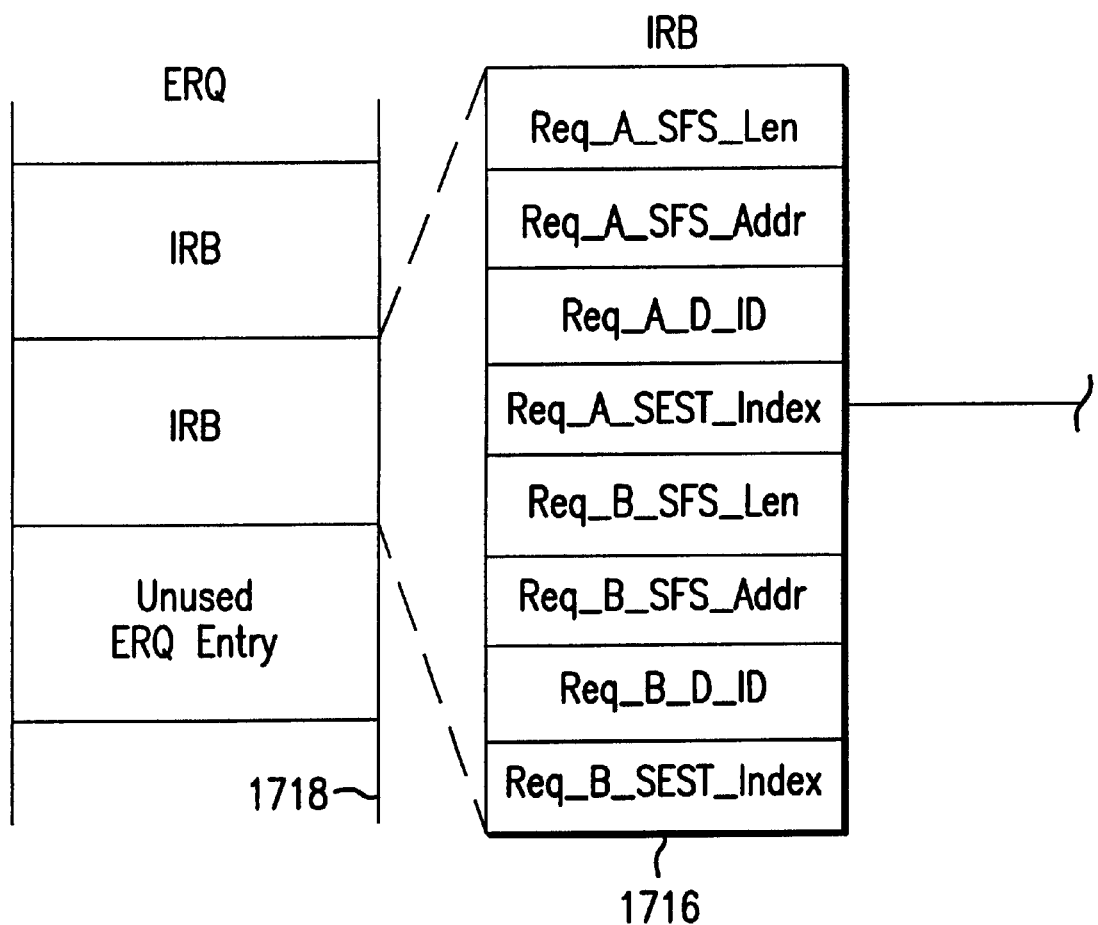
FIG. 17 shows the host memory data structures required for an FC target node to carry out a read operation initiated by an FC initiator node from more than three data buffers.
Figure 17B:
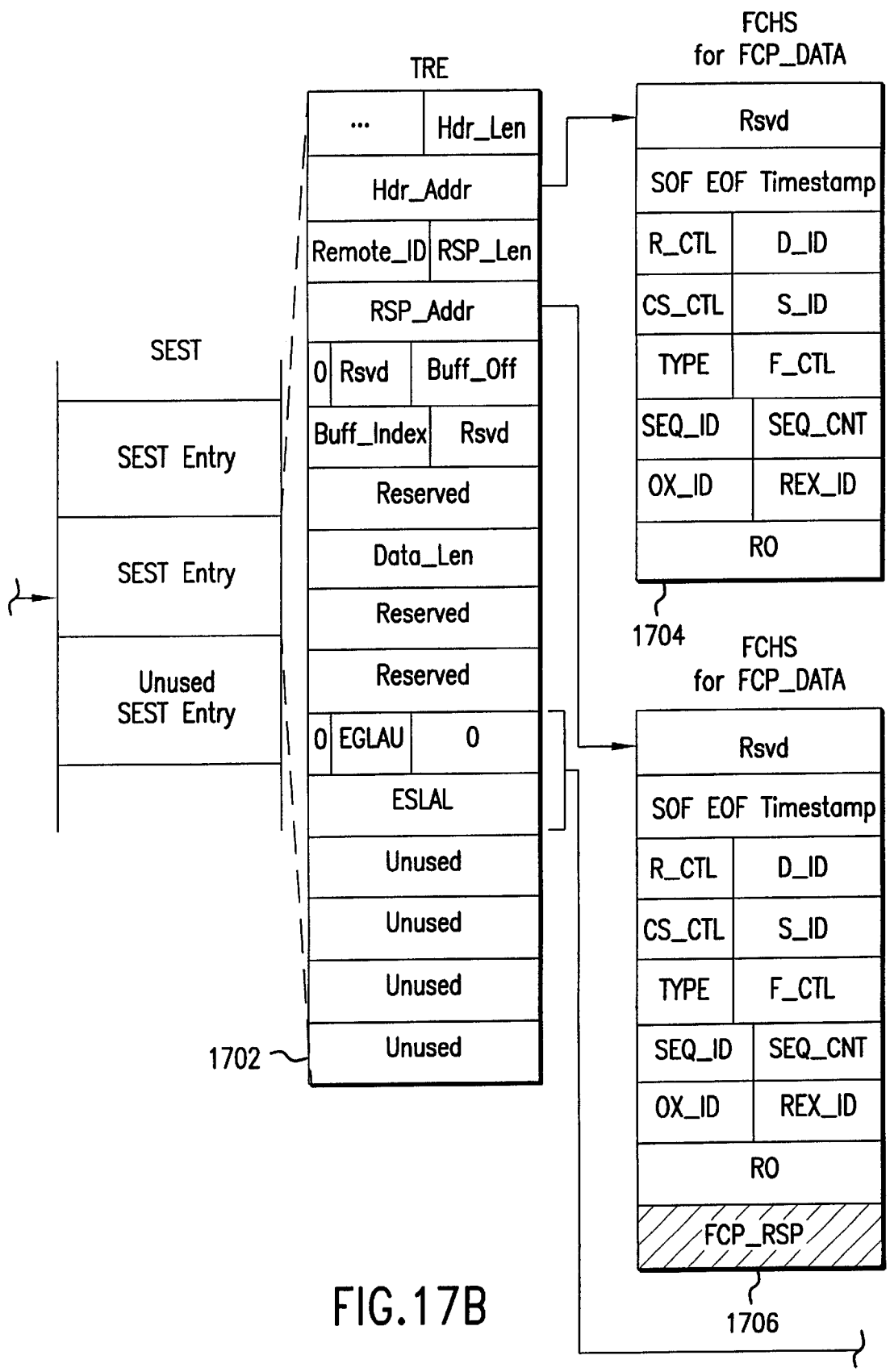
Figure 17C:
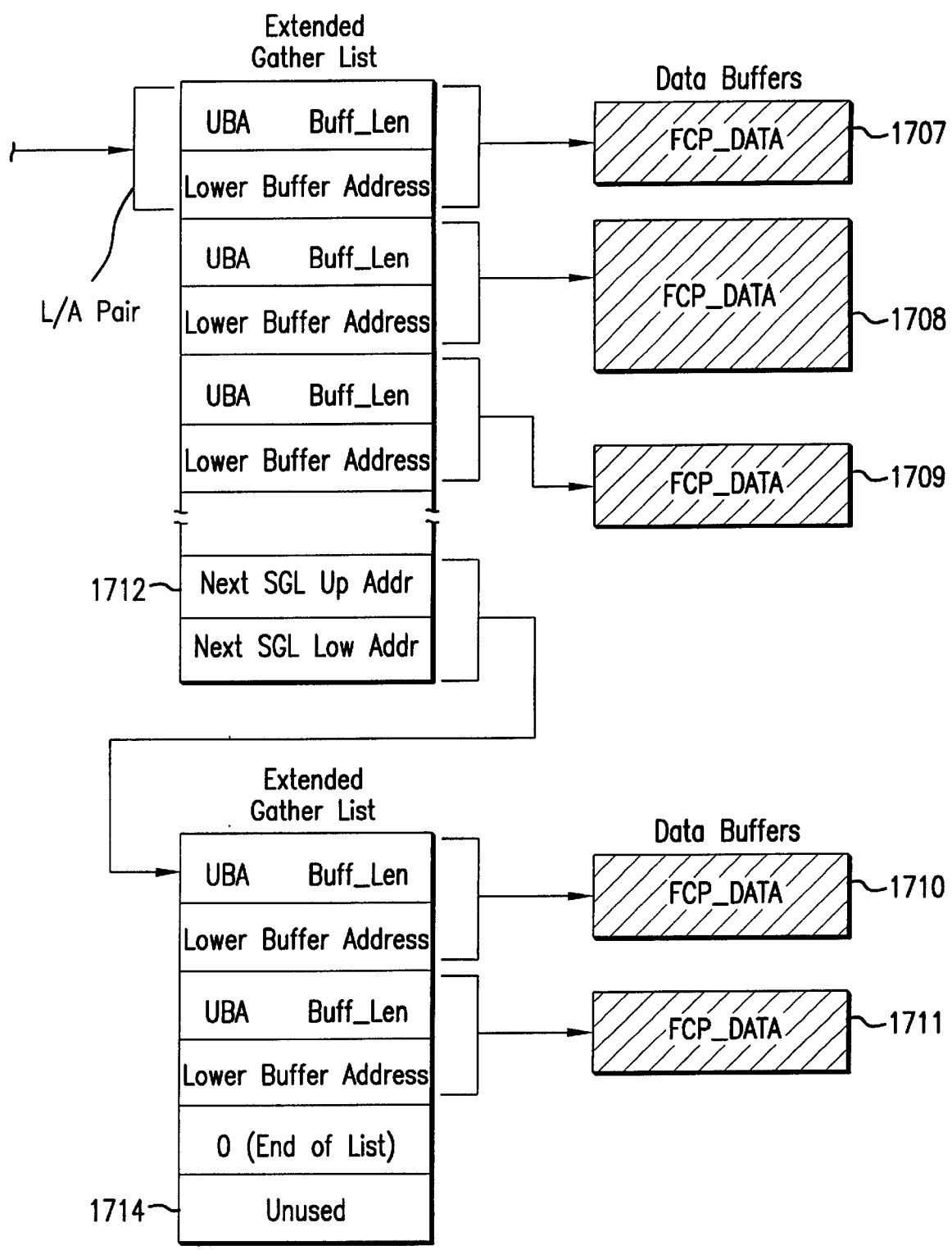

FIG. 17 shows the host memory data structures required for an FC target node to carry out a read operation initiated by an FC initiator node. These data structures are similar to the data structures required by an FC target node to respond to an FCP write operation, shown in FIG. 15, with the following exceptions: (1) there is no FCHS for a FCP_XFER_RDY operation (1512 in FIG. 15) since no FCP_

XFER_RDY sequence is involved; (2) the TWE (1502 in FIG. 15) is replaced in FIG. 17 with a target read entry ("TRE") 1702; and (3) an FCHS for an FCP_DATA sequence 1704 and an FCHS for an FCP_RSP sequence 1706 are both associated with the TRE 1702. When the TL receives an FCP_CMND frame from the FC initiator node, the TL places the FCP_CMND frame into the SFQ (903 in FIG. 9) and notifies the host via an inbound completion message. When the host is notified by the inbound completion message, it interprets the contents of the FCP_CMND frame and sets up the data structures in FIG. 17 in order to respond to the SCSI read command represented by the FCP_CMND frame. The host creates in an unused SEST entry a TRE 1702 data structure and associates with the TRE 1702 the FCHS for the FCP_DATA sequence 1704 and the FSHS for the FCP_RSP sequence 1706. The host also allocates a number of data buffers that the host fills via a SCSI read operation and that will be transferred in the subsequent FCP_DATA sequence back to the FC initiator node. These data buffers 1707–1711 are referenced by one or more external extended SGL pages 1712 and 1714. The host also creates an IRB 1716 in an unused ERQ entry 1718. By updating the ERQ producer index, the host initiates the return of data solicited by the FCP read operation, mediated by the TL, resulting in sending by the FC target node the FCP_DATA sequences containing the data read from the SCSI device and a final FCP_RSP sequence indicating completion of the read command.

Figure 18A:
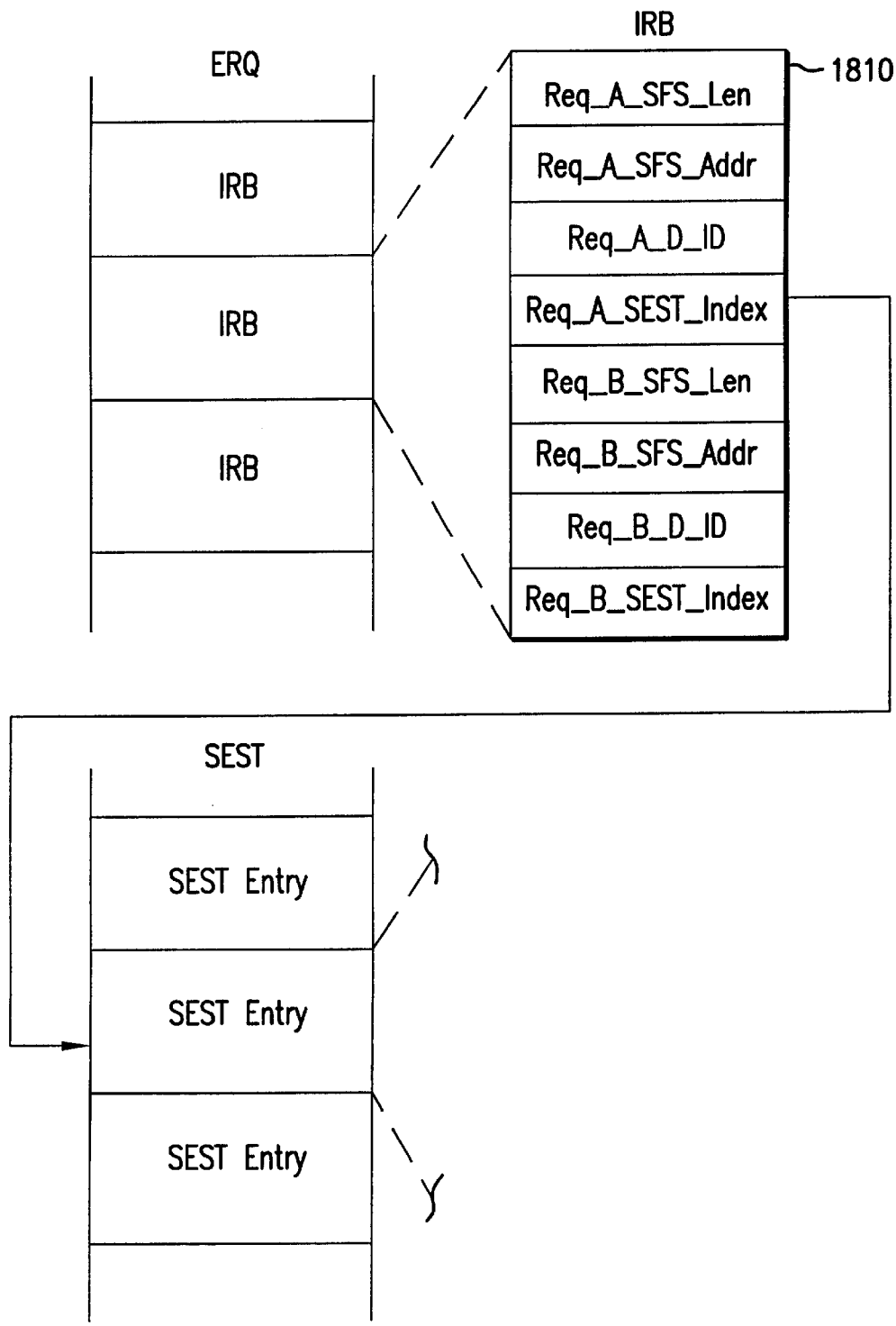
FIG. 18 shows the host memory data structures required for an FC target node to carry out a read operation initiated by an FC initiator node from three or less data buffers.
Figure 18B:
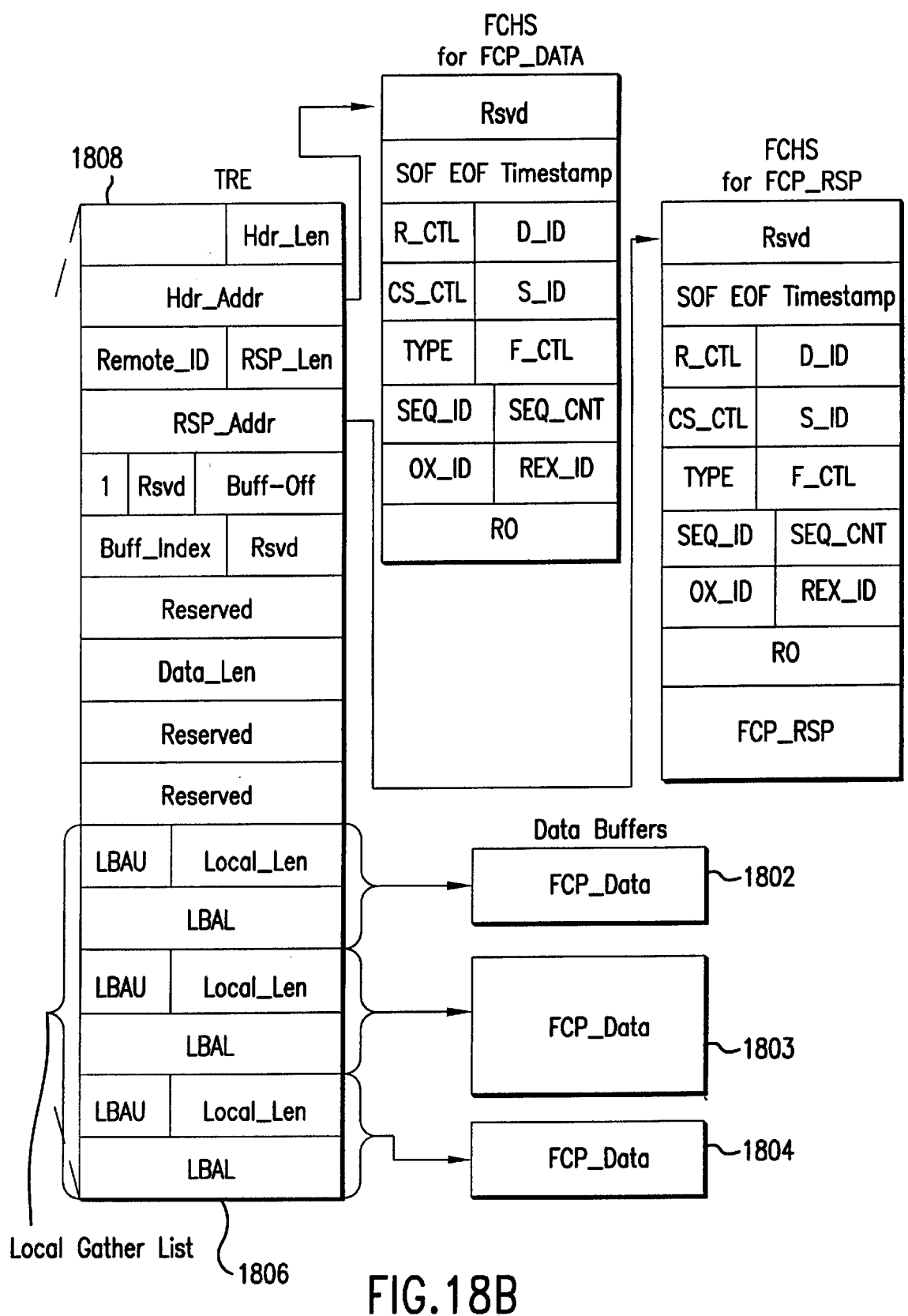

FIG. 18 bears the same relationship to FIG. 17 as FIGS. 12, 14 and 16 bear to FIGS. 11, 13 and 15, respectively. The operations carried out by the TL in order to respond to an FCP read request are the same as those discussed with reference to FIG. 17. The only difference in FIG. 18 is that the data buffers that contain the data read from the SCSI device 1802–1804 are referenced from a local SGL 1806 included within the TRE 1808.

Arbitrated Loop Initialization

As discussed above, the FC frame header contains fields that specify the source and destination fabric addresses of the FC frame. Both the D_ID and the S_ID are 3-byte quantities that specify a three-part fabric address for a particular FC port. These three parts include specification of an FC domain, an FC node address, and an FC port within the FC node. In an arbitrated loop topology, each of the 127 possible active nodes acquires, during loop initialization, an arbitrated loop physical address ("AL_PA"). The AL_PA is a 1-byte quantity that corresponds to the FC port specification within the D_ID and S_ID of the FC frame header. Because there are at most 127 active nodes interconnected by an arbitrated loop topology, the single byte AL_PA is sufficient to uniquely address each node within the arbitrated loop.

Figure 19:
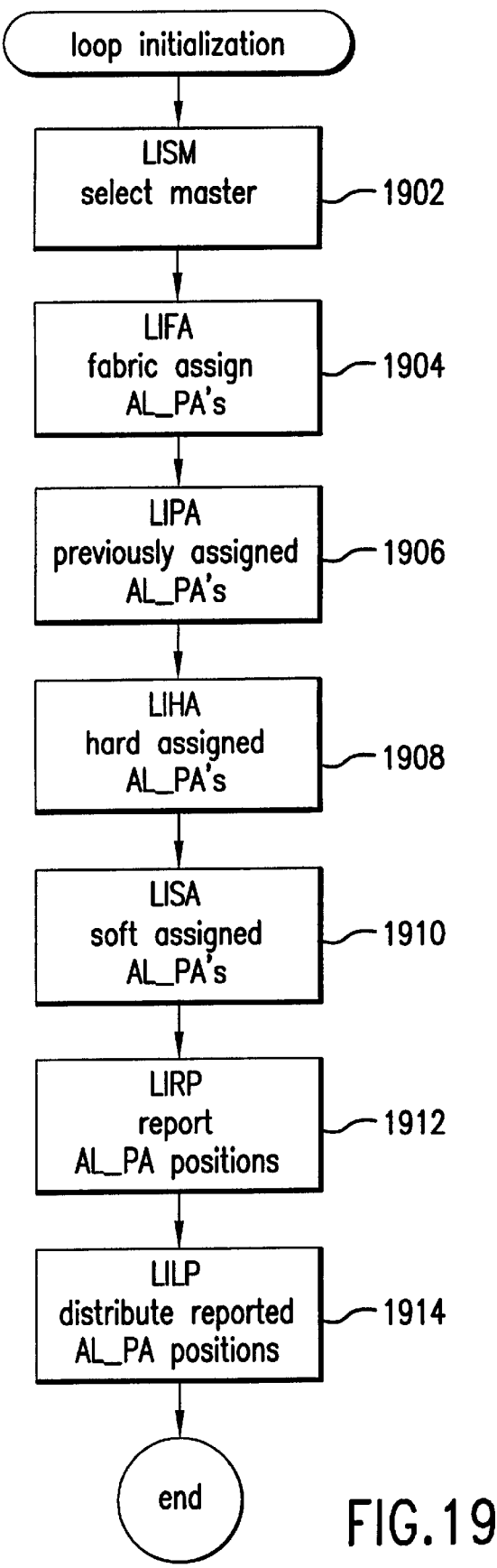
FIG. 19 shows a diagram of the seven phases of FC arbitrated loop initialization.

The loop initialization process may be undertaken by a node connected to an arbitrated loop topology for any of a variety of different reasons, including loop initialization following a power reset of the node, initialization upon start up of the first node of the arbitrated loop, subsequent inclusion of an FC node into an already operating arbitrated loop, and various error recovery operations. FC arbitrated loop initialization comprises seven distinct phases. FIG. 19 shows a diagram of the seven phases of FC arbitrated loop initialization. FIG. 20 shows the data payload of FC frames transmitted by FC nodes in an arbitrated loop topology during each of the seven phases of loop initialization shown in FIG. 19. The data payload for the FC frames used in each of the different phases of loop initialization comprises three different fields, shown as columns 2002–2004 in FIG. 20. The first field 2002 within each of the different data payload structures is the LI_ID field. The LI_ID field contains a 16-bit code corresponding to one of the seven phases of group initialization. The LI_FL field 2003 for each of the different data payload layouts shown in FIG. 20 contains various flags, including flags that specify whether the final two phases of loop initialization are supported by a particular FC port. The TL supports all seven phases of loop initialization. Finally, the data portion of the data payload of each of the data payload layouts 2004 contains data fields of varying lengths specific to each of the seven phases of loop initialization. In the following discussion, the seven phases of loop initialization will be described with references to both FIGS. 19 and 20.

In the first phase of loop initialization 1902, called "LISM," a loop initialization master is selected. This first phase of loop initialization follows flooding of the loop with loop initialization primitives ("LIPs"). All active nodes transmit an LISM FC arbitrated loop initialization frame 2006 that includes the transmitting node's 8-byte port name. Each FC port participating in loop initialization continues to transmit LISM FC arbitrated loop initialization frames and continues to forward any received LISM FC arbitrated loop initialization frames to subsequent FC nodes in the arbitrated loop until either the FC port detects an FC frame transmitted by another FC port having a lower combined port address, where a combined port address comprises the D_ID, S_ID, and 8-byte port name, in which case the other FC port will become the loop initialization master ("LIM"), or until the FC port receives back an FC arbitrated loop initialization frame that that FC port originally transmitted, in which case the FC port becomes the LIM. Thus, in general, the node having the lowest combined address that is participating in the FC arbitrated loop initialization process becomes the LIM. By definition, an FL_PORT will have the lowest combined address and will become LIM. At each of the loop initialization phases, loop initialization may fail for a variety of different reasons, requiring the entire loop initialization process to be restarted.

Once an LIM has been selected, loop initialization proceeds to the LIFA phase 1904, in which any node having a fabric assigned AL_PA can attempt to acquire that AL_PA. The LIM transmits an FC arbitrated loop initialization frame having a data payload formatted according to the data payload layout 2008 in FIG. 20. The data field of this data layout contains a 16-byte AL_PA bit map. The LIM sets the bit within the bit map corresponding to its fabric assigned AL_PA, if the LIM has a fabric assigned AL_PA. As this FC frame circulates through each FC port within the arbitrated loop, each FC node also sets a bit in the bit map to indicate that FC nodes fabric-assigned AL_PA, if that node has a fabric assigned AL_PA. If the data in the bit map has already been set by another FC node in the arbitrated loop, then the FC node must attempt to acquire an AL_PA during one of three subsequent group initialization phases. The fabric assigned AL_PAs provide a means for AL_PAs to be specified by an FC node connected to the arbitrated loop via an FL_Port.

In the LIPA loop initialization phase 1906, the LIM transmits an FC frame containing a data payload formatted according to the data layout 2010 in FIG. 20. The data field contains the AL_PA bit map returned to the LIM during the previous LIPA phase of loop initialization. During the LIPA phase 2010, the LIM and other FC nodes in the arbitrated loop that have not yet acquired an AL_PA may attempt to set bits within the bit map corresponding to a previously acquired AL_PA saved within the memory of the FC nodes. If an FC node receives the LIPA FC frame and detects that the bit within the bit map corresponding to that node's previously acquired AL_PA has not been set, the FC node can set that bit and thereby acquire that AL_PA.

The next two phases of loop initialization, LIHA 1908 and LISA 1910 are analogous to the above-discussed LIPA phase 1906. Both the LIHA phase 1908 and the LISA phase 1910 employ FC frames with data payloads 2012 and 2014 similar to the data layout for the LIPA phase 2010 and LIFA phase 2008. The bit map from the previous phase is recirculated by the LIM in both the LIHA 1908 and LISA 1910 phases, so that any FC port in the arbitrated loop that has not yet acquired an AL_PA may attempt to acquire either a hard assigned AL_PA contained in the port's memory, or, at last resort, may obtain an arbitrary, or soft, AL_PA not yet acquired by any of the other FC ports in the arbitrated loop topology. If an FC port is not able to acquire an AL_PA at the completion of the LISA phase 1910, then that FC port may not participate in the arbitrated loop. The FC-AL-2 standard contains various provisions to enable a nonparticipating node to attempt to join the arbitrated loop, including restarting the loop initialization process.

In the LIRP phase of loop initialization 1912, the LIM transmits an FC frame containing a data payload having the data layout 2016 in FIG. 20. The data field 2017 of this data layout 2016 contains a 128-byte AL PA position map. The LIM places the LIM's acquired AL_PA, if the LIM has acquired an AL_PA, into the first AL_PA position within the AL_PA position map, following an AL_PA count byte at byte 0 in the data field 2017, and each successive FC node that receives and retransmits the LIRP FC arbitrated loop initialization frame places that FC node's AL_PA in successive positions within the AL_PA position map. In the final loop initialization phase LILP 1914, the AL_PA position map is recirculated by the LIM through each FC port in the arbitrated loop topology so that the FC ports can acquire, and save in memory, the completed AL_PA position map. This AL_PA position map allows each FC port within the arbitrated loop to determine its position relative to the other FC ports within the arbitrated loop.

Additional TL Interface Description

Figure 21:
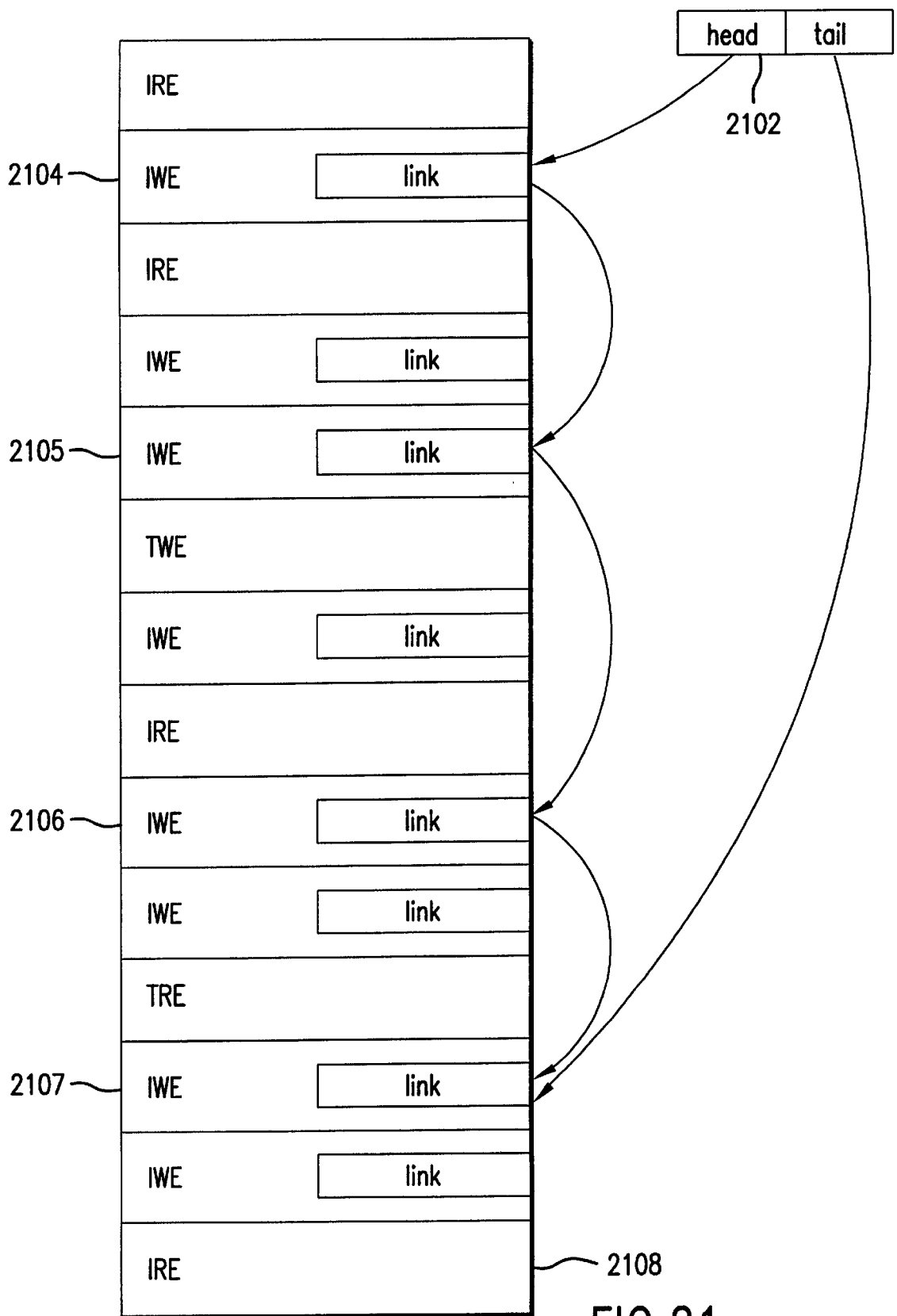
FIG. 21 shows a control register pair and ranking within SCSI exchange state table entries that together implement the FCP_XFER_RDY linked list within the TL.

FIG. 21 shows a control register pair and linked list of SCSI exchange state table entries that together implement the FCP_XFER_RDY linked list within the TL. When the TL receives an FCP_XFER_RDY frame back from an FC node to which the TL previously send an FCP_CMND frame representing a write command, the TL matches the FCP_XFER_RDY frame to a corresponding IWE (1124 in FIG. 11) within the SEST (904 in FIG. 9) and then links the matched IWE to a linked list of IWEs that contains all IWEs that are ready for TL processing, or, in other words, for which the TL can begin sending FCP_DATA sequences to the target of the write command. This linked list comprises an FCP_XFER_RDY head and tail register pair 2102 that contains pointers to the head IWE of the FCP_XFER_RDY linked list 2104 and the tail IWE of the FCP_XFER_RDY linked list 2107. The IWEs on the FCP_XFER_RDY linked list 2104–2107 within the SEST 2108 are linked together through link data fields (1126 in FIG. 11) into a singly-linked list from the first, or head, IWE 2104, to the final, or tail, IWE 2107. The FCP_XFER_RDY linked list implements a queue or pipe that ensures that the TL processes IWEs in the order that corresponding incoming FCP_XFER_RDY frames are matched to IWEs in the SEST 2108.

FIGS. 22A–B, 23A–B, and 24A–D show detailed illustrations of the TL control register, status register, and frame monitor status register. Certain bit flags and values within these control registers are involved in the deterministic and graceful shutdown of TL operation by the method of the present invention, to be discussed below. FIGS. 25, 26A–B and 27–29 show detailed illustrations of the frame manager completion message, the outbound completion message, the ERQ queue frozen completion message, the FCP assist frozen completion message, and the error idle completion message, that are sent from the TL to the host processor via the IMQ (902 in FIG. 9) at various stages of the deterministic and ordered shutdown of TL operation to be discussed below.

Implementation of the Present Invention

Figure 30:
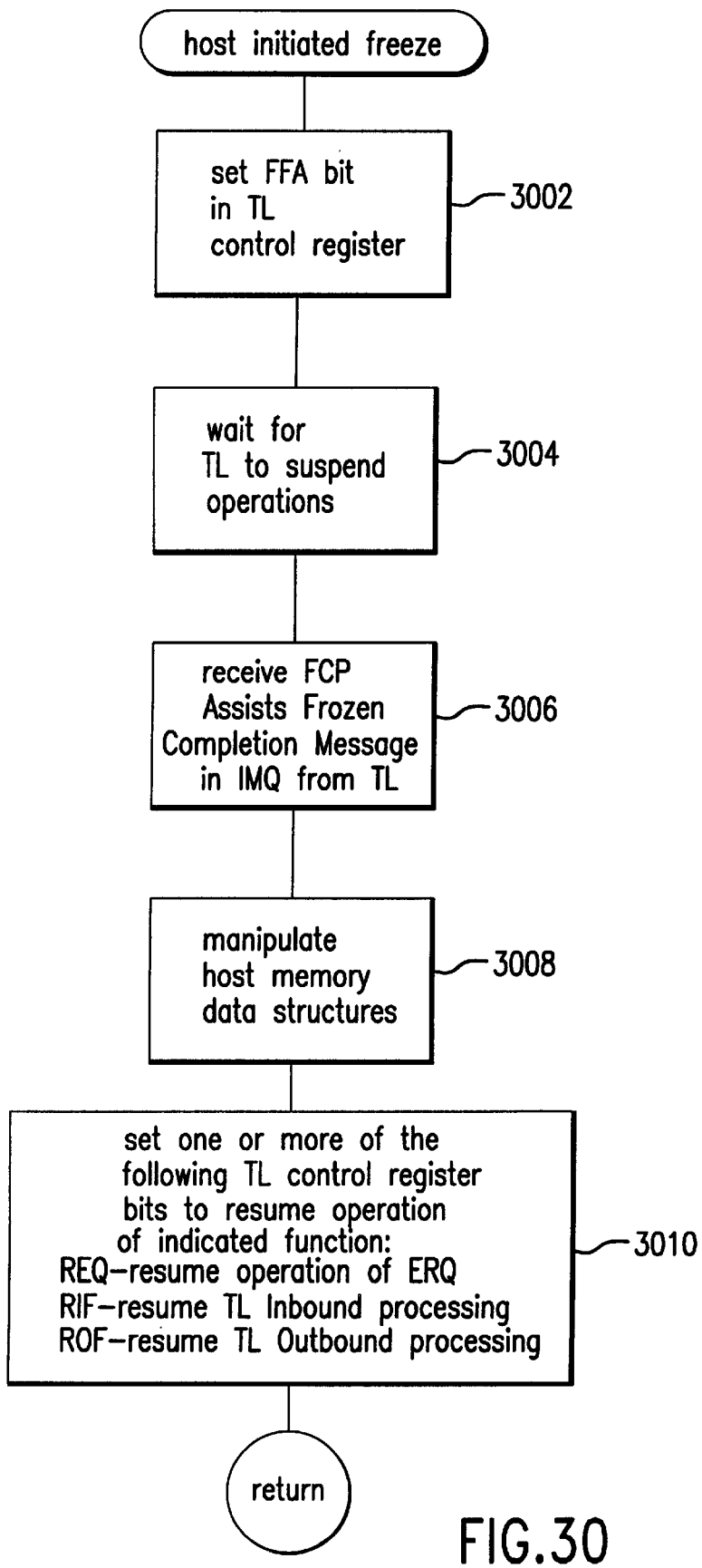
FIG. 30 illustrates the steps that a host processor undertakes to halt operation of the TL and later resume operation of the TL.
Figure 31:
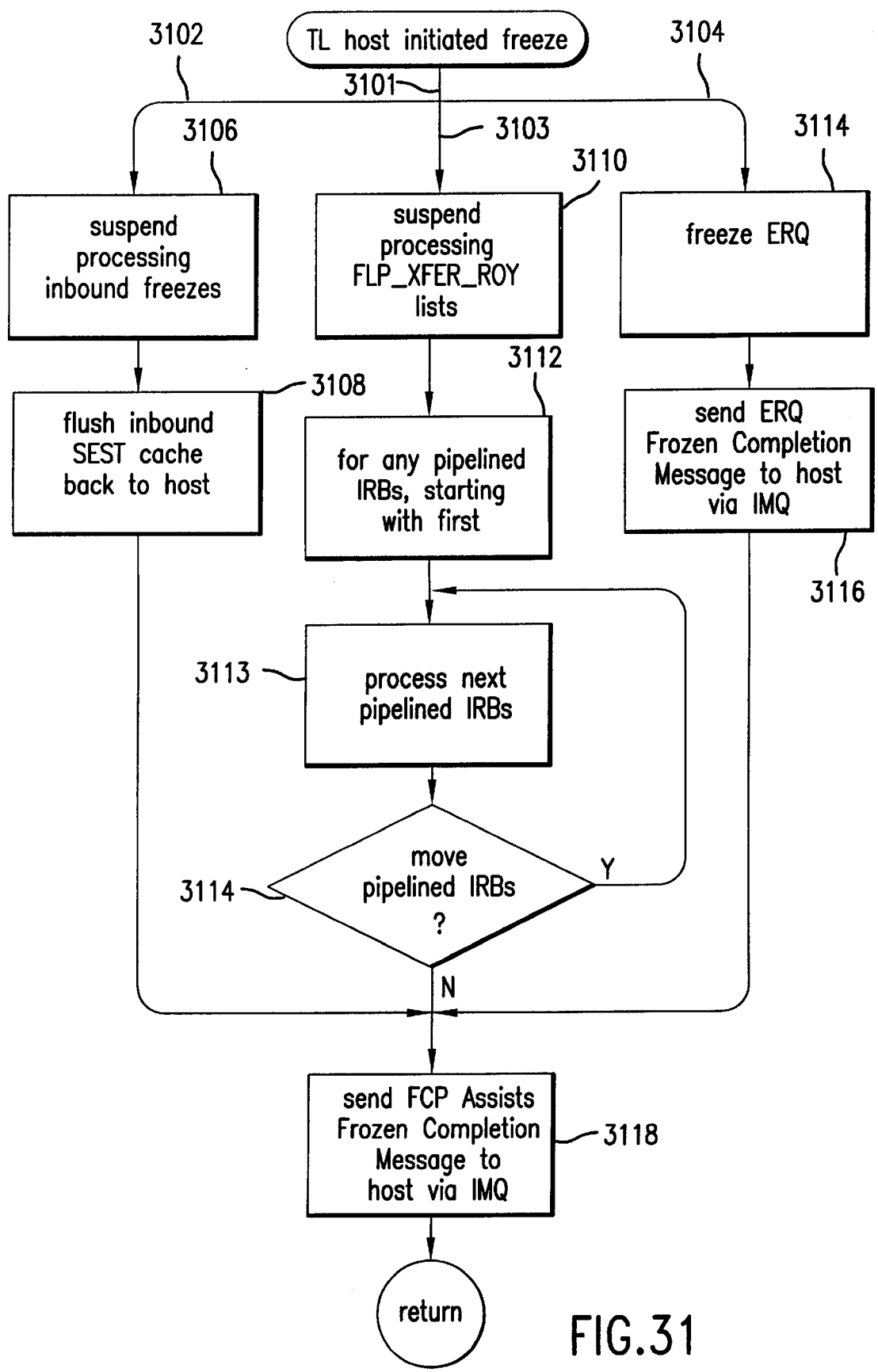
FIG. 31 shows the steps undertaken by the TL in response to halting of TL operation by the host processor.

FIGS. 30–31 are flow control diagrams that detail implementation of host processor-initiated halting of the TL operation. FIG. 30 illustrates the steps that a host processor undertakes to halt operation of the TL and later resume operation of the TL. FIG. 31 shows the steps undertaken by the TL in response to halting of TL operation by the host processor.

In FIG. 30, the host processor, in step 3002, sets the FFA flag (2202 in FIG. 22A) of the TL control register. By setting the FFA bit, the host processor signals the TL that the TL should suspend operation. In step 3004, the host waits for the TL to suspend operation. This waiting period ends when, in step 3006, the TL receives an FCP assists frozen completion message (2802 in FIG. 28) from the TL via the IMQ (902 in FIG. 9). In step 3008, the host processor has complete control of all the shared data structures (902–905 in FIG. 9) through which the host processor communicates with the TL. Moreover, the host processor may assume that, while it reads and manipulates these data structures, the TL will not interrupt the host processor and will not alter the TL's internal state. Also, the host processor may assume that the information contained within the shared data structures represents a complete picture of the state of the TL. There are no incomplete, cached commands or information within the TL that are not accessible, or exposed, to the host processor.

At this point, the host processor may add, delete, modify, and reorder entries within the shared data structures in order to accomplish various goals, such as aborting previously issued commands and reordering transmission of outbound FC sequences in order to prioritize outstanding tasks. The only requirement is that, prior to restarting the TL, the host processor must leave the shared data structures in a consistent state. When the host processor has finished manipulating the data structures, the host processor can, in step 3010, restart operation of the ERQ by setting the TL control register bit REQ (2204 in FIG. 22A), resume operation of inbound FC frame reception and processing by the TL by setting the TL control register flag RIF (2206 in FIG. 22A), and resume processing of outbound FC frames by the TL by setting the TL control register flag ROF (2208 in FIG. 22A). Any combination of between 1 and 3 of the three TL control register flags can be simultaneously set in a single operation.

The TL responds to setting of the FFA bit (2202 in FIG. 22A) by the host processor as illustrated in FIG. 31. The three-way branch 3101 indicates that the three branches 3102–3104 are carried out within the TL asynchronously, and different ordering of the operations carried out in one branch with respect to the operations carried out in the other two branches are possible. In step 3106, the TL suspends processing of all inbound FC frames, completing DMAing of any frame currently being processed. In step 3108, the TL flushes cached SEST entries used by the TL for processing inbound FC frames back to the SEST. In step 3110, the TL suspends processing of outbound data represented by IWEs within the FCP_XFER_RDY linked list illustrated in FIG. 21. In steps 3112–3114, the TL processes any pipelined entries in the IRB and SEST caches internal to the TL. In step 3114, the TL freezes the ERQ (905 in FIG. 9) and places an ERQ frozen completion message (2702 in FIG. 27) into the IMQ (902 in FIG. 9) in step 3116. In step 3118, the TL sends an FCP assist frozen completion message (2802 in FIG. 28) to the host processor via the IMQ (902 in FIG. 9). The this point, the TL is in a quiescent state, and all TL state information is accessible to, and controlled by, the host processor.

Figure 32:
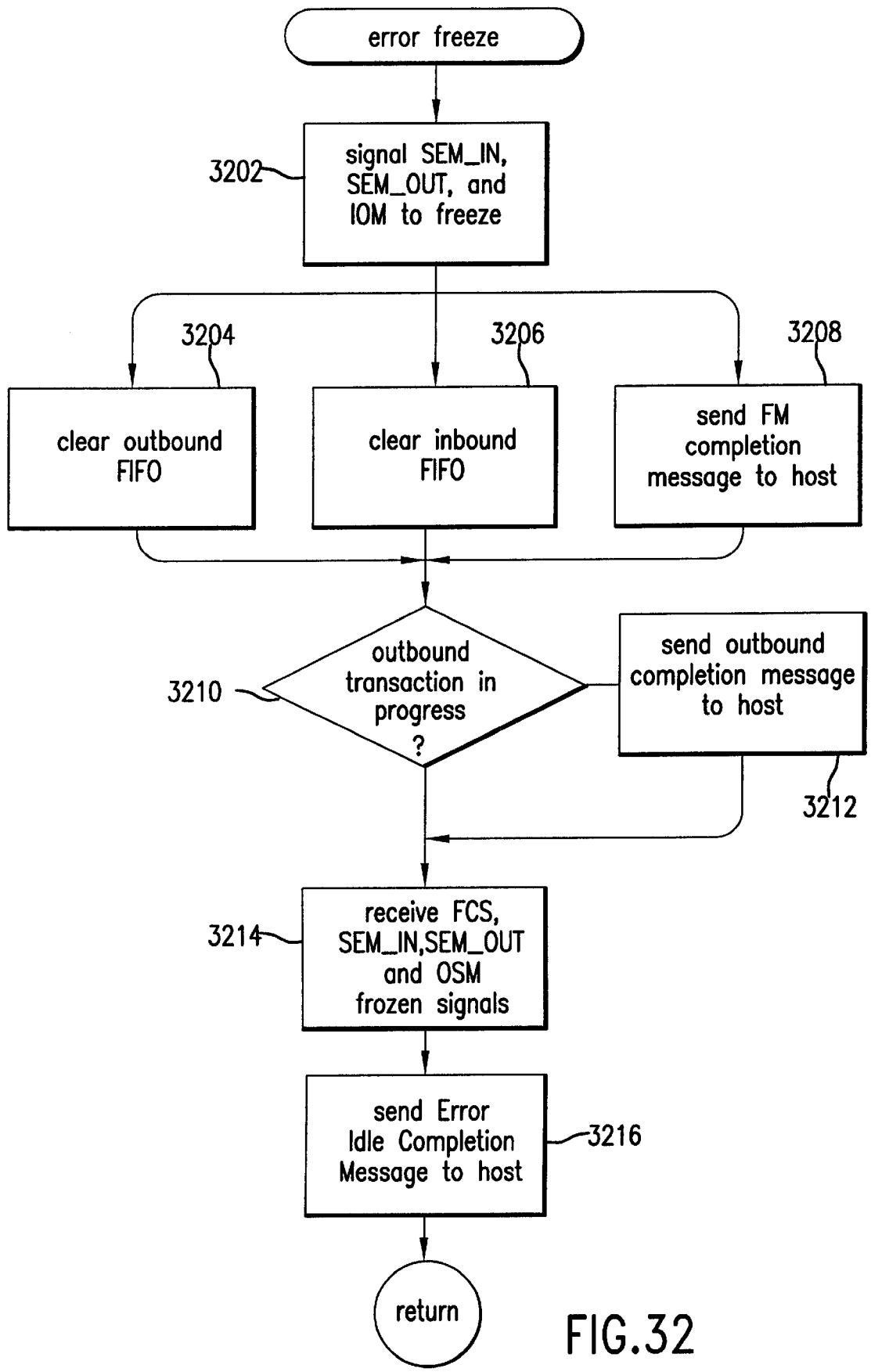
FIGS. 32–33 illustrate the steps taken by the TL to stop operation of the TL following detection by the TL of an error condition.
Figure 33:
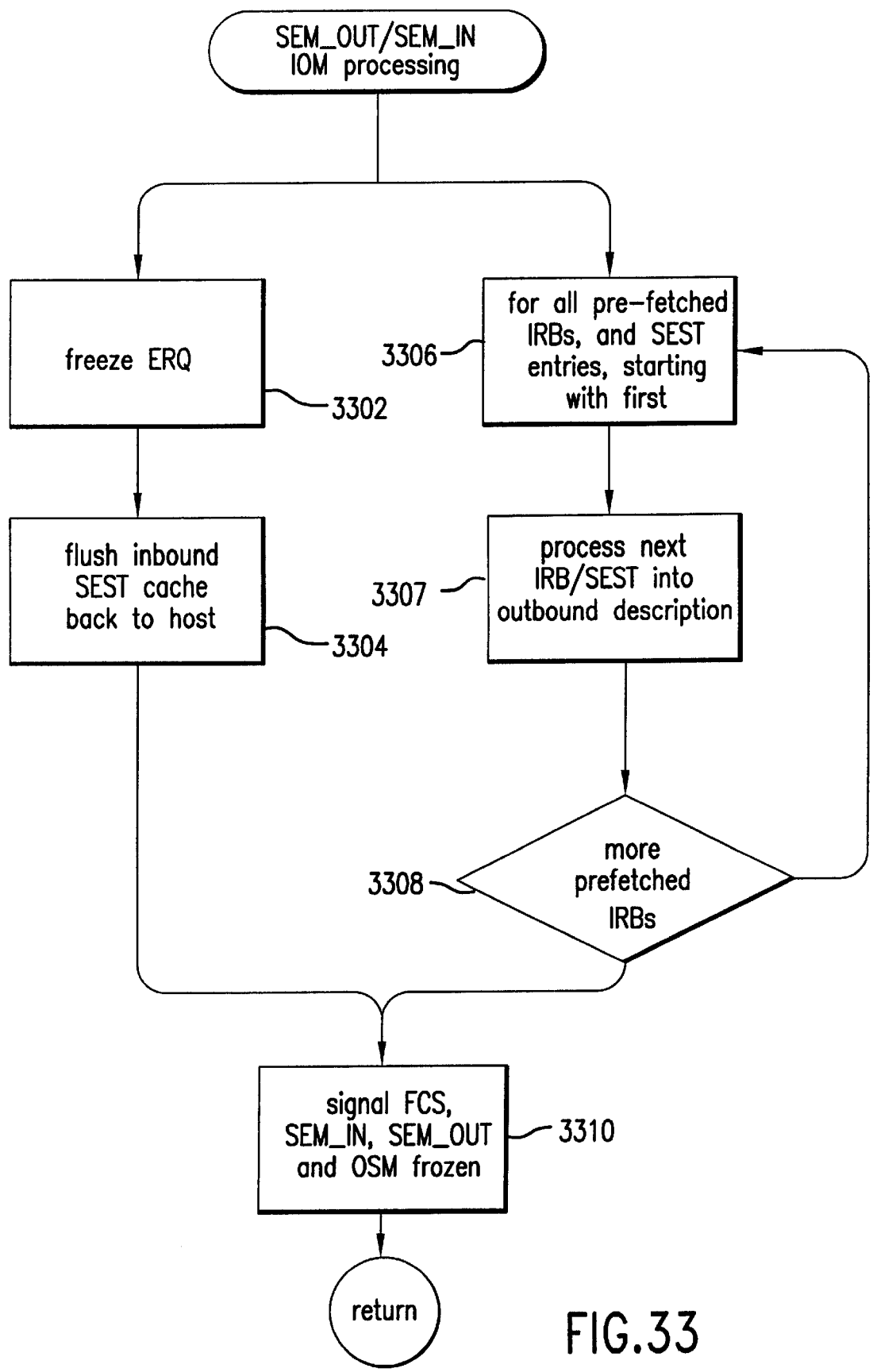

FIGS. 32–33 illustrate the steps taken by the TL to stop operation of the TL following detection by the TL of an error condition. It should be noted that, following cessation of TL operation, the host processor may resume operation of the TL by setting the REQ, RIF, and ROF flags in the TL control register as shown in step 3010 in FIG. 30. There are two different types of error conditions: (1) an FC link down event, in which case no further data transfer to and from the FC is possible while the FC link is down; and (2) non-link-down errors, after which data can still be transferred to and from the FC. In the following discussion, differences between the way in which link-down and non-link-down errors are handled will be described. In step 3202 in FIG. 32, the TL, having detected an error condition, signals the SEM_IN (928 in FIG. 9), the SEM_OUT (932 in FIG. 9), and the INBOUND_DATA_MANAGER ("IDM") (924 in FIG. 9) in order that these components freeze operation as soon as possible. In step 3204, asynchronously carried out along with steps 3206 and 3208, the TL clears the outbound FIFO (916 in FIG. 9). Any DMA operation in progress from the PCI bus is allowed to continue, although the data transferred into the DMA is not written into the outbound FIFO, since, during a link down condition, the outbound FIFO is cleared. In step 3206, carried out only in the case of a link-down error, the inbound FIFO (918 in FIG. 9) is cleared, suspending processing of the current FC frame at the boundary of a host memory buffer or the end of the frame. In the non-link-down error case, any active inbound data transfers to the host are allowed to complete to the point of a frame boundary. In the case of non-link-down errors, new inbound FC frames can be written to the inbound FIFO (918 in FIG. 9) by the frame manager (914 in FIG. 9), but are not processed until the TL is restarted. In step 3208, also carried out only in the case of a link-down error, the TL sends a frame manager completion message (2502 in FIG. 25) to the host via the IMQ (902 in FIG. 9). This FM completion message indicates to the host that the host needs to check the frame manager status register (2402 in FIG. 24A) in which, in the case of a link-down error, the LDN 2404 flag is set. In step 3210, the TL determines whether an outbound transaction was in progress, and, if so, sends an outbound completion message (FIG. 26A–B) to the host processor via the IMQ (902 in FIG. 9) to indicate that an error occurred in step 3212. In the case of a link-down error, the LKF bit (2602 in FIG. 26A) of the outbound completion message is set. Other bits are set in the outbound completion message to indicate the occurrence of a number of different possible non-link-down errors. Then, in step 3214, the TL waits to receive signals from the fibre channel services (927 in FIG. 9) component, the SEM_IN component (928 in FIG. 9), the SEM_OUT component (932 in FIG. 9), and the outbound sequence manager ("OSM") (930 in FIG. 9) that indicate that these four internal components of the TL have frozen operation. Finally, the OSM generates an error idle completion message (2702 in FIG. 27) and sends the error idle completion message to the host processor via the IMQ (902 in FIG. 9) in step 3216. Upon receipt of the error idle completion message, the host processor may undertake error recovery operations that include modification of the shared data structures. In the case of a link-down error, the FC link may come back up and then go down again while the first link-down error is being processed. In such cases, the TL remembers the second link-down and sends a second error idle completion message to the host processor after the host processor restarts the TL.

FIG. 33 illustrates the steps undertaken by the SEM_OUT, SEM_IN, and IDM components of the TL after receiving the signal from the TL in step 3202. In step 3302, the sem_out component freezes the ERQ and sends an ERQ frozen completion message (2702 in FIG. 27) to the host processor via the IMQ (902 in FIG. 9). In step 3304, the TL flushes cached SEST entries used by the TL for processing inbound FC frames back to the SEST. In steps 3306–3308, the SEM_OUT (932 in FIG. 9) proceeds to process all prefetched IRBs and SEST entries resident in caches within the TL. In the case of a link-down error, or in the case of a non-link-down error in which an outbound sequence is addressed to an FC node for which an error was reported, the TL, in step 3307, sends corresponding outbound descriptor blocks (FIGS. 26A–B) to the OSM which, in turn, sends an outbound completion message (FIGS. 26A–B) with the abort sequence notification ("ASN") flag 2604 set for each of outbound descriptor blocks to the host processor via the IMQ (902 in FIG. 9). These outbound completion messages inform the host processor that the corresponding sequences were aborted while another sequence was being processed. With this information, the host processor can later repost the corresponding IRB and SEST entries for processing by the TL without modifying them, since the TL was not executing them when TL operation was halted. In the case of non-link-down errors, the TL, in step 307, completes transmission of the FCP sequences represented by the cached IRBs. Finally, the FCS, SEM_IN, SEM_OUT, and OSM components transmit signals indicating that they have frozen operations in step 3310.

Although the present invention has been described in terms of a particular embodiment, it is not intended that the invention be limited to this embodiment. Modifications within the spirit of the invention will be apparent to those skilled in the art. For example, various of the steps carried out by the TL during operation cessation may be conducted by the TL in parallel, or the other of the steps may be rearranged. The state machines and circuitry within the TL that are responsible for the deterministic operation cessation may be specified in any number of different high-level specification languages into any almost limitless number of different lowlevel state machines that implement the steps described above. Different types of messages may be sent from the interface controller to the host processor at different times during cessation of interface control operation in order to inform the host processor of the state shutdown of various components. The method of the present invention may be implemented in interface controllers for any number of different communications networks and that implement any number of different protocols on top of those communications networks.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description; they are not intended to be exhaustive or to limit the invention to the precise forms disclosed, obviously many modifications and variations are possible in view of the above teachings. The embodiments were chosen and described in order to best explain the principles of the invention and its practical applications and to thereby enable others skilled in the art to best utilize the invention and various embodiments with various modifications as are suited to the particular use contemplated. It is intended that the scope of the invention be defined by the following claims and their equivalents.

What is claimed is:

1. A method for halting operation of an interface controller within a network communications port in response to a signal from a host processor, a host processor together with the network communications port composing a network communications node in which the host processor communicates with the interface controller via shared data structures and control registers, the method comprising:

receiving the signal by the host processor;

suspending processing of data being transferred to the interface controller from the communications network;

suspending processing of data being transferred from the host processor to the communications network;

flushing cached information from the shared data structures from the interface controller back to the shared data structures;

processing outgoing data transfer operations pipelined within the interface controller; and sending an indication to the host processor that the operation of the interface controller has halted, that the shared data structures contain the complete state information of the interface controller and information about current data transfer operations, and that the host processor will now have access to the shared data structures without additional interrupts or messages from the interface controller.

2. The method of claim 1 wherein suspending processing of data being transferred to the interface controller from the communications network further includes completing transfer of any data associated with an incoming data operation to host memory and suspending processing of any additional incoming data operations.

3. The method of claim 1 wherein processing outgoing data transfer operations pipelined within the interface controller further includes completing the transfer of data specified by the pipelined outgoing data transfer operations.

4. The method of claim 1 wherein sending an indication to the host processor that the operation of the interface controller has halted further includes placing the message into the shared data structures and interrupting the host processor to indicate that the message has been placed into the shared data structures.

5. A method for halting operation of an interface controller within a network communications port in response to detection of an error by the interface controller, a host processor together with the network communications port composing a network communications node in which the host processor communicates with the interface controller via shared data structures and control registers, the method comprising:

suspending processing of data being transferred to the interface controller from the communications network;

suspending processing of data being transferred from the host processor to the communications network;

flushing cached information from the shared data structures from the interface controller back to the shared data structures;

processing outgoing data transfer operations pipelined within the interface controller; and sending an indication to the host processor that the operation of the interface controller has halted, that the shared data structures contain the complete state information of the interface controller and information about current data transfer operations, and that the host processor will now have access to the shared data structures without additional interrupts or messages from the interface controller.

6. The method of claim 5 wherein suspending processing of data being transferred to the interface controller from the communications network further includes:

when the detected error condition is not a link-down error, completing transfer of any data associated with an incoming data operation to a particular host memory buffer and suspending processing of any additional data, and when the detected error condition is a link-down error, flushing all data from an incoming data queue.

7. The method of claim 5 wherein processing outgoing data transfer operations pipelined within the interface controller further includes:

when the detected error condition is not a link-down error, completing the transfer of data specified by the pipelined outgoing data transfer operations, and when the detected error condition is a link-down error, sending a message to the host processor for each pipelined outgoing data transfer operation indicating that the pipelined outgoing data transfer operations were not completed and not interrupted during transfer by error processing.

8. The method of claim 5 wherein processing outgoing data transfer operations pipelined within the interface controller further includes:

when the detected error condition is a link-down error and an outgoing data transfer operation is currently being transferred and when the detected error condition is not a link-down error but transfer of an outgoing data transfer operation currently being transferred cannot be completed, sending a message to the host processor indicating that the data transfer operation was interrupted during transfer.

9. The method of claim 5 wherein sending an indication to the host processor that the operation of the interface controller has halted further includes placing the message into the shared data structures and interrupting the host processor to indicate that the message has been placed into the shared data structures.

10. An interface controller within a network communications port, a host processor together with the network communications port composing a network communications node in which the host processor communicates with the interface controller via shared data structures and control registers, the interface controller comprising:

an error-detecting component that detects errors that occur during operation of the interface controller;

a shut-down detecting component that detects a signal from the host processor indicating that the interface controller needs to halt operation;

a shut-down component that halts operation of the interface controller, that ensures that the shared data structures contain the complete state information of the interface controller and information about current data transfer operations, and ensures that the host processor will have access to the shared data structures without additional interrupts or messages from the interface controller following shut-down; and a shut-down reporting component that sends an indication to the host processor that the operation of the interface controller has halted.

11. The interface controller of claim 10 wherein the shut-down component:

suspends processing of data being transferred to the interface controller from the communications network;

suspending processing of data being transferred from the host processor to the communications network;

flushes cached information from the shared data structures from the interface controller back to the shared data structures; and processes outgoing data transfer operations pipelined within the interface controller.

* * * * *